(12) United States Patent
Wright et al.

(10) Patent No.: US 12,279,013 B2
(45) Date of Patent: Apr. 15, 2025

(54) MANAGING CONTENT QUALITY AND RELATED CHARACTERISTICS OF A MEDIA PLAYBACK SYSTEM

(71) Applicant: Sonos, Inc., Santa Barbara, CA (US)

(72) Inventors: Brandon Wright, Santa Barbara, CA (US); Ryan Edward Kitson, Tillamook, OR (US); Won So, Boston, MA (US); Ted Lin, Ayer, MA (US); Jeffrey M. Peters, Cambridge, MA (US); Michael Sheldon, San Francisco, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/560,063

(22) PCT Filed: May 10, 2022

(86) PCT No.: PCT/US2022/028592
§ 371 (c)(1),
(2) Date: Nov. 9, 2023

(87) PCT Pub. No.: WO2022/240874
PCT Pub. Date: Nov. 17, 2022

(65) Prior Publication Data
US 2024/0251128 A1 Jul. 25, 2024

Related U.S. Application Data

(60) Provisional application No. 63/330,865, filed on Apr. 14, 2022, provisional application No. 63/279,492, (Continued)

(51) Int. Cl.
*H04N 21/442* (2011.01)
*H04N 21/43* (2011.01)
(Continued)

(52) U.S. Cl.
CPC . *H04N 21/44227* (2013.01); *H04N 21/43076* (2020.08); *H04N 21/431* (2013.01);
(Continued)

(58) Field of Classification Search
CPC ....... H04N 21/23439; H04N 21/43076; H04N 21/431; H04N 21/43615; H04N 21/43637;
(Continued)

(56) References Cited

U.S. PATENT DOCUMENTS 4,570,232 A * 2/1986 Shikano .................. G10L 15/12
704/241
5,440,644 A 8/1995 Farinelli et al.
(Continued)

FOREIGN PATENT DOCUMENTS

EP 1389853 A1 2/2004
WO 200153994 7/2001
(Continued)

OTHER PUBLICATIONS

PCT International Searching Authority, International Search Report and Written Opinion mailed on Sep. 30, 2022, issued in connection with International Application No. PCT/US2022/028592, 19 pages.
(Continued)

*Primary Examiner* — Michael B. Pierorazio

(57) ABSTRACT

An example first playback device is configured to: while the first playback device is in a synchrony group with a second playback device, play back a first version of audio content in synchrony with the second playback device; in response to identifying that a quality of a connection between the
(Continued)

second playback device and a network device is below a threshold criterion, cause the second playback device to play back a second version of the audio content in synchrony with the first version of the audio content playing back by the first playback device; and in response to detecting a change in the quality of the connection between the second playback device and the network device such that the quality of the connection meets the threshold criterion, cause the second playback device to play back the first version of the audio content in synchrony with the first playback device.

20 Claims, 25 Drawing Sheets

Related U.S. Application Data filed on Nov. 15, 2021, provisional application No. 63/250,558, filed on Sep. 30, 2021, provisional application No. 63/186,796, filed on May 10, 2021.

(51) Int. Cl.
| | |
|---|---|
| *H04N 21/431* | (2011.01) |
| *H04N 21/436* | (2011.01) |
| *H04N 21/4363* | (2011.01) |
| *H04N 21/4402* | (2011.01) |
| *H04N 21/4425* | (2011.01) |
| *H04N 21/4722* | (2011.01) |
| *H04N 21/81* | (2011.01) |

(52) U.S. Cl.
CPC .. *H04N 21/43615* (2013.01); *H04N 21/43637* (2013.01); *H04N 21/44029* (2013.01); *H04N 21/4425* (2013.01); *H04N 21/4722* (2013.01); *H04N 21/8113* (2013.01)

(58) Field of Classification Search
CPC ....... H04N 21/44029; H04N 21/44209; H04N 21/44227; H04N 21/4425; H04N 21/4722; H04N 21/8113
See application file for complete search history.

(56) References Cited

U.S. PATENT DOCUMENTS

| | | | | |
|---|---|---|---|---|
| 5,598,557 A * | 1/1997 | Doner | ............... | G06F 16/3346 |
| | | | | 707/999.005 |
| 5,761,320 A | 6/1998 | Farinelli et al. | | |
| 5,923,902 A | 7/1999 | Inagaki | | |
| 6,032,202 A | 2/2000 | Lea et al. | | |
| 6,085,160 A * | 7/2000 | D'hoore | ............... | G10L 15/005 |
| | | | | 704/277 |
| 6,186,834 B1 * | 2/2001 | Arnett | ............... | H01R 13/6467 |
| | | | | 439/676 |
| 6,188,987 B1 * | 2/2001 | Fielder | ............... | H04N 21/4342 |
| | | | | 704/229 |
| 6,256,554 B1 | 7/2001 | DiLorenzo | | |
| 6,404,811 B1 | 6/2002 | Cvetko et al. | | |
| 6,442,518 B1 * | 8/2002 | Van Thong | ............... | G10L 15/26 |
| | | | | 704/235 |
| 6,469,633 B1 | 10/2002 | Wachter | | |
| 6,473,778 B1 * | 10/2002 | Gibbon | ............... | G06F 40/103 |
| | | | | 715/201 |
| 6,522,886 B1 | 2/2003 | Youngs et al. | | |
| 6,611,537 B1 | 8/2003 | Edens et al. | | |
| 6,631,410 B1 | 10/2003 | Kowalski et al. | | |
| 6,757,517 B2 | 6/2004 | Chang | | |
| 6,778,869 B2 | 8/2004 | Champion | | |
| 7,047,191 B2 * | 5/2006 | Lange | ............... | G10L 15/26 |
| | | | | 704/235 |
| 7,065,524 B1 * | 6/2006 | Lee | ............... | G16H 50/50 |
| | | | | 706/45 |
| 7,092,888 B1 * | 8/2006 | McCarthy | ............... | G10L 15/1822 |
| | | | | 704/277 |
| 7,130,608 B2 | 10/2006 | Hollstrom et al. | | |
| 7,130,616 B2 | 10/2006 | Janik | | |
| 7,143,939 B2 | 12/2006 | Henzerling | | |
| 7,236,773 B2 | 6/2007 | Thomas | | |
| 7,295,548 B2 | 11/2007 | Blank et al. | | |
| 7,391,791 B2 | 6/2008 | Balassanian et al. | | |
| 7,483,538 B2 | 1/2009 | McCarty et al. | | |
| 7,509,385 B1 * | 3/2009 | Rittmeyer | ............... | G06Q 10/107 |
| | | | | 715/224 |
| 7,571,014 B1 | 8/2009 | Lambourne et al. | | |
| 7,630,501 B2 | 12/2009 | Blank et al. | | |
| 7,643,894 B2 | 1/2010 | Braithwaite et al. | | |
| 7,657,910 B1 | 2/2010 | McAulay et al. | | |
| 7,729,917 B2 * | 6/2010 | Miyamoto | ............... | G10L 15/22 |
| | | | | 704/275 |
| 7,739,253 B1 * | 6/2010 | Yanovsky | ............... | G06F 16/9535 |
| | | | | 707/706 |
| 7,801,910 B2 * | 9/2010 | Houh | ............... | G06F 16/583 |
| | | | | 707/765 |
| 7,853,341 B2 | 12/2010 | McCarty et al. | | |
| 7,962,331 B2 * | 6/2011 | Miller | ............... | G10L 15/193 |
| | | | | 704/235 |
| 7,987,294 B2 | 7/2011 | Bryce et al. | | |
| 8,014,423 B2 | 9/2011 | Thaler et al. | | |
| 8,045,952 B2 | 10/2011 | Qureshey et al. | | |
| 8,103,009 B2 | 1/2012 | McCarty et al. | | |
| 8,121,432 B2 * | 2/2012 | Dorai | ............... | G06F 16/7844 |
| | | | | 382/276 |
| 8,131,545 B1 * | 3/2012 | Moreno | ............... | G10L 15/04 |
| | | | | 704/235 |
| 8,234,395 B2 | 7/2012 | Millington | | |
| 8,423,363 B2 * | 4/2013 | Gupta | ............... | G10L 15/22 |
| | | | | 704/251 |
| 8,483,853 B1 | 7/2013 | Lambourne | | |
| 8,572,488 B2 * | 10/2013 | Phillips | ............... | G06F 3/0482 |
| | | | | 715/716 |
| 8,942,252 B2 | 1/2015 | Balassanian et al. | | |
| 10,433,058 B1 | 10/2019 | Torgerson et al. | | |
| 11,785,278 B1 * | 10/2023 | Stone | ............... | H04N 21/8547 |
| | | | | 348/564 |
| 2001/0042107 A1 | 11/2001 | Palm | | |
| 2002/0022453 A1 | 2/2002 | Balog et al. | | |
| 2002/0026442 A1 | 2/2002 | Lipscomb et al. | | |
| 2002/0055950 A1 * | 5/2002 | Witteman | ............... | G06F 16/40 |
| | | | | 707/E17.009 |
| 2002/0093591 A1 * | 7/2002 | Gong | ............... | H04N 21/2368 |
| | | | | 348/E7.063 |
| 2002/0124097 A1 | 9/2002 | Isely et al. | | |
| 2003/0025832 A1 * | 2/2003 | Swart | ............... | H04N 21/4828 |
| | | | | 348/E7.071 |
| 2003/0061028 A1 * | 3/2003 | Dey | ............... | G06F 16/40 |
| | | | | 704/9 |
| 2003/0157951 A1 | 8/2003 | Hasty, Jr. | | |
| 2003/0169366 A1 * | 9/2003 | Lenzi | ............... | H04N 7/10 |
| | | | | 348/461 |
| 2003/0206717 A1 * | 11/2003 | Yogeshwar | ............... | G11B 27/10 |
| | | | | 386/328 |
| 2004/0024478 A1 | 2/2004 | Hans et al. | | |
| 2004/0096110 A1 * | 5/2004 | Yogeshwar | ............... | G06F 16/51 |
| | | | | 707/E17.031 |
| 2005/0227614 A1 * | 10/2005 | Hosking | ............... | H04N 7/165 |
| | | | | 455/3.06 |
| 2006/0015339 A1 * | 1/2006 | Charlesworth | ............... | G10L 15/187 |
| | | | | 704/E15.02 |
| 2006/0248073 A1 * | 11/2006 | Jones | ............... | G06F 16/3328 |
| | | | | 707/999.005 |
| 2007/0011012 A1 * | 1/2007 | Yurick | ............... | G10L 15/26 |
| | | | | 704/277 |
| 2007/0124147 A1 * | 5/2007 | Gopinath | ............... | G10L 15/19 |
| | | | | 704/E15.021 |
| 2007/0124756 A1 * | 5/2007 | Covell | ............... | G06F 16/635 |
| | | | | 348/E7.071 |

(56) References Cited

U.S. PATENT DOCUMENTS

| | | | |
|---|---|---|---|
| 2007/0124788 A1* | 5/2007 | Wittkoter | H04N 7/165 348/E7.071 |
| 2007/0142944 A1 | 6/2007 | Goldberg et al. | |
| 2007/0214164 A1* | 9/2007 | MacLennan | G06F 16/90 |
| 2008/0066138 A1* | 3/2008 | Bishop | G06F 40/58 725/137 |
| 2008/0166106 A1* | 7/2008 | Ozawa | H04N 21/8113 386/245 |
| 2008/0232763 A1* | 9/2008 | Brady | H04N 21/44209 375/E7.076 |
| 2008/0255844 A1* | 10/2008 | Wu | G10L 15/193 704/E15.022 |
| 2008/0266449 A1* | 10/2008 | Rathod | H04N 21/8133 348/E7.001 |
| 2008/0270134 A1* | 10/2008 | Miyamoto | H04N 7/0885 348/E7.001 |
| 2009/0171662 A1* | 7/2009 | Huang | G10L 15/1822 704/E15.041 |
| 2010/0091187 A1* | 4/2010 | Topiwalla | H04N 21/4355 348/E7.003 |
| 2010/0299448 A1* | 11/2010 | Cuoq | H04N 21/6375 709/234 |
| 2011/0022386 A1* | 1/2011 | Gatzke | G10L 15/26 704/235 |
| 2011/0040559 A1* | 2/2011 | Kim | G10L 21/055 704/271 |
| 2012/0101817 A1* | 4/2012 | Mocenigo | G10L 15/063 704/E15.001 |
| 2012/0253799 A1* | 10/2012 | Bangalore | G10L 15/183 704/E15.001 |
| 2016/0007054 A1* | 1/2016 | Polumbus | G11B 27/10 725/116 |
| 2016/0234549 A1* | 8/2016 | Ducloux | H04N 21/4424 |
| 2018/0109819 A1* | 4/2018 | Lu | H04N 21/2387 |
| 2020/0100041 A1* | 3/2020 | Kadri | G06F 3/165 |
| 2021/0037281 A1* | 2/2021 | Xian | H04N 21/43637 |

FOREIGN PATENT DOCUMENTS

| | | |
|---|---|---|
| WO | 2003093950 A2 | 11/2003 |
| WO | 2020247811 A1 | 12/2020 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Sep. 30, 2022, issued in connection with International Application No. PCT/US2022/028592, filed on May 10, 2022, 19 pages.
International Bureau, International Search Report and Written Opinion mailed on Dec. 5, 2022, issued in connection with International Application No. PCT/US2022/028592, filed on May 10, 2022, 20 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

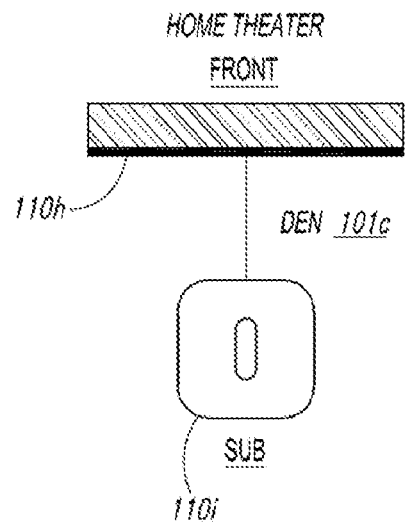
FIG. 1J
FIG. 1K
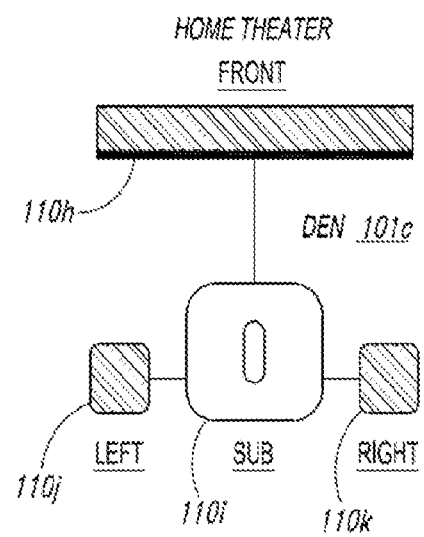
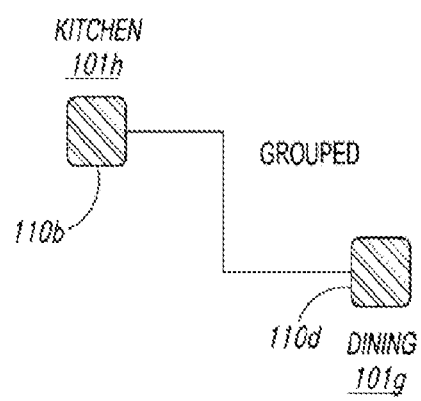
FIG. 1L
FIG. 1M

MANAGING CONTENT QUALITY AND RELATED CHARACTERISTICS OF A MEDIA PLAYBACK SYSTEM

CROSS-REFERENCE TO RELATED APPLICATIONS

This application is a national stage application under 35 U.S.C. § 371 of International Application No. PCT/US2022/028592, filed May 10, 2022, which claims priority to: (i) U.S. Provisional Application No. 63/186,796, filed May 10, 2021, and titled "Dynamic Modification for Content Quality Enhancement," (ii) U.S. Provisional Application No. 63/250,558, filed Sep. 30, 2021, and titled "Content Quality Enhancement for Heterogeneous Playback Groups," (iii) U.S. Provisional Application No. 63/279,492, filed Nov. 15, 2021, and titled "User Interface for Managing Content Quality and Related Characteristics of a Media Playback System," and (iv) U.S. Provisional Application No. 63/330,865, filed Apr. 14, 2022, and titled "Dynamic Transcoding for Enhancing Audio Playback," the contents of each of which are incorporated by reference herein in their entirety.

FIELD OF THE DISCLOSURE

This disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, titled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

Given the ever-growing interest in digital media, there continues to be a need to develop consumer-accessible technologies to further enhance the listening experience.

BRIEF DESCRIPTION OF THE DRAWINGS

FIGS. 1J through 1M are schematic diagrams of example corresponding media playback system zones.

DETAILED DESCRIPTION

I. Overview

Figure 1A:
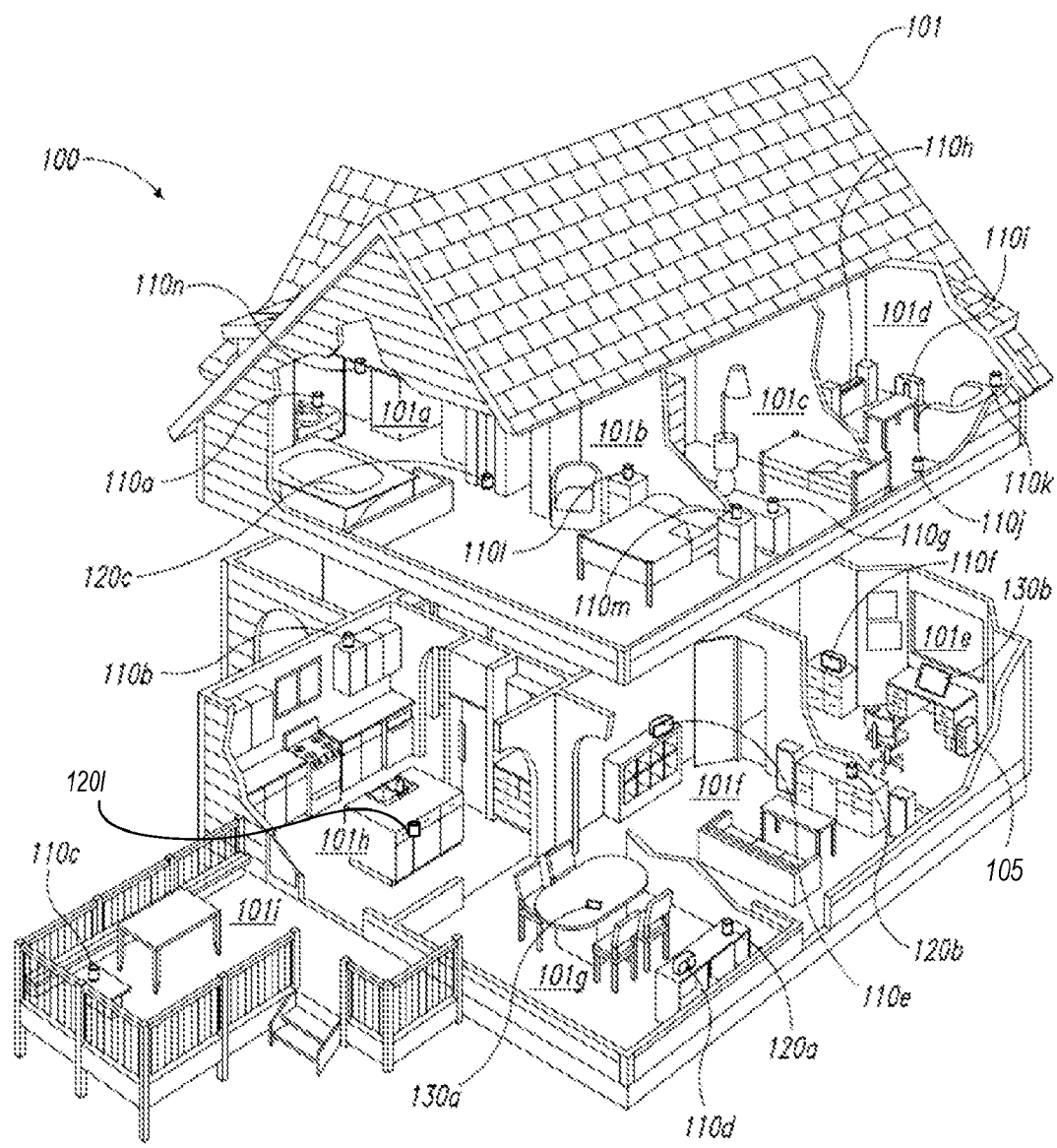
FIG. 1A is a partial cutaway view of an environment having a media playback system configured in accordance with aspects of the disclosed technology.

When engaged in a media playback experience, users expect media devices to provide media content (e.g., stream from cloud servers) in a seamless and continuous manner. In some instances, changes in the network connection quality between the media devices and the cloud servers can cause sudden stops and starts in media playback as the media device runs out of buffered media content to play back, which can lead to a less than ideal user experience. For example, a portable user device (e.g., smartphone) may have a fluctuating connection with a remote media content server (e.g., a video streaming service) while streaming media content. As a result, during certain times when the connection is weak (e.g., while driving through a tunnel), the quality of the network connection between the user device and the remote media content servers may be insufficient to support uninterrupted streaming of high-quality media content.

Users also expect media devices to provide high quality media content to the extent possible. In instances where multiple playback devices are grouped for synchronous playback, the quality of the media content that is played back by the grouped playback devices may be impacted by the individual capabilities of the playback devices. For example, high-resolution audio formats offer increased audio fidelity and dynamic range compared to standard resolution audio formats, and playback of high resolution audio content thus results in a more desirable and satisfying user experience. Playing back high resolution audio, however, may require sophisticated playback capabilities (e.g., increased processing power, DRM-capability, prolonged battery life) that may not be available to certain playback devices (e.g., older playback devices, portable playback devices, etc.). As a result, when playback devices having less sophisticated capabilities are grouped with playback devices having more sophisticated capabilities for synchronous playback of high resolution audio content, the less-capable playback devices may be unable to play back the audio content, which may result in at least the less-capable devices (and perhaps also the other playback devices in the group) not participating in synchronous group playback, thereby leading to an undesirable and unsatisfactory user experience.

To address such challenges, SONOS, Inc. has been continually developing new technology to intelligently enhance the reliability of audio content playback on playback devices. For example, SONOS, Inc. developed technology to support conditional enhancement of audio content based on the capability of a playback device that is to play back the audio content and/or the quality of the network connection between the playback device and the content source. Such functionality, among others, is disclosed in U.S. Pat. No. 10,873,820, titled "Conditional Content Enhancement," which is hereby incorporated by reference in its entirety.

SONOS, Inc. has appreciated that conventional adaptive streaming techniques do not sufficiently address challenges presented by high-definition (HD) audio streaming in modern networks (e.g., typical household networks such as Wireless Local Area Networks (WLANs)). With increasing trends towards higher Internet connection speeds (e.g., increased availability of Fiber Internet for households with download speeds exceeding 1,000 Megabits per second (Mbps), availability of smartphones that are 5G capable with download speeds exceeding 600 Mbps), the connection quality between the streaming device and cloud servers is less frequently the only factor impacting the reliability of playback. A new (and growing) problem area involves limitations in local network bandwidth (e.g., instead of only wide area network bandwidth). In the context of a household, there is an increasing amount of traffic that passes through the local networking equipment of the household (e.g., access point(s), router(s), etc.) to accommodate the ever increasing number of devices connected to the network (e.g., Internet-of-Things (IoT) devices, tablets, smartphones, cars for software updates, etc.).

Such bandwidth requirements are exacerbated in scenarios involving playback of higher quality audio streams (e.g., HD audio) and/or multiple playback devices that are grouped for synchronous playback within a local network. In such instances with multiple grouped players, the given audio content may need to pass through local networking equipment multiple times. For example, a first playback device (e.g., group coordinator) in a synchrony group with two other playback devices may receive audio content from a cloud server (via a router) and transmit that audio content to each of the two other playback devices (via the router). In this example, that audio content may be transmitted through the router three times: (1) from the cloud server to the first playback device; (2) from the first playback device to the second playback device; and (3) from the first playback device to the third playback device. Congestion from such local network traffic may result in delayed arrival of audio packets to one or more playback devices (i.e., arrival of an audio packet at a playback device after a time it was scheduled to be played by the playback device), which in turn may cause the one or more playback devices to be dropped from the synchrony group, thereby contributing to a diminished user listening experience.

In instances where two or more playback devices are grouped for synchronous playback media content, the quality of the media content that is played back by the grouped playback devices may be impacted by various factors. For example, playing back high resolution audio may require sophisticated device playback capabilities (e.g., increased processing power, DRM-capability, prolonged battery life) that may not be available to certain playback devices (e.g., relatively older playback devices, portable playback devices, etc.). As a result, when playback devices having less sophisticated capabilities are grouped with playback devices having more sophisticated capabilities for synchronous playback of high resolution media content, the less-capable playback devices may be unable to play back the media content, which may result in at least the less-capable devices (and perhaps also the other playback devices in the group) being unable to participate in synchronous group playback, thereby leading to an unsatisfactory user experience.

As another example, changes in the network connection quality between the playback devices and the cloud servers can cause sudden stops and starts in media content playback as the playback device runs out of buffered media content to play back. For example, a portable playback device (e.g., smartphone) may have a fluctuating connection with a remote media content server (e.g., a media content streaming service) while streaming media content. As a result, during certain times when the connection is weak (e.g., while driving through a tunnel or walking farther away from a local access point), the quality of the network connection between the playback device and the remote media content server may be insufficient to support uninterrupted streaming of high-quality media content, which can lead to a less than ideal user experience.

Building upon previous innovation, SONOS, Inc. has developed new technology for improving playback reliability and supporting higher quality audio content for playback. Further, SONOS, Inc. has appreciated that some modern users prefer to be informed about and involved in managing media playback experiences. Therefore, SONOS, Inc. has also developed new technology for providing users with real-time visibility regarding media playback system characteristics related to media content quality and facilitating user-management of those characteristics. In one aspect, the technology disclosed herein relates to dynamic modification of the quality of audio streamed between playback devices within a networked media playback system based on a variety of factors including: (1) network characteristics (e.g., local network characteristics), (2) playback device characteristics (e.g., a playback device's capability to render content, etc.), and (3) characteristics of a group of playback devices that are grouped for synchronous audio playback (e.g., the number of playback devices in the group). As a result, the quality of the audio stream may be dynamically modified based on these (and other) factors to ensure reliable playback of audio in a wide variety of operating conditions, including heterogeneous playback group configurations (synchronous playback groups comprising playback devices with different playback capabilities). In another aspect, the technology disclosed herein relates to providing a user interface that facilitates user interaction with a media playback system and devices of the media playback system.

Example techniques disclosed herein involve adaptively enhancing an audio experience based on (i) a capability of one or more playback devices that may play back audio content, (ii) the number of playback devices that are grouped for synchronous playback of audio content or (ii) a network quality of a local wireless area network over which one or more playback devices are configured to communicate. Example techniques disclosed herein further involve transcoding a first version of audio content into one or more additional versions of the audio content based on identified characteristics that may affect audio playback, such as one or more of (i) playback device characteristics, (ii) playback group characteristics, or (iii) network characteristics. Further, example techniques disclosed herein involve implementing an additional layer of encryption for audio content that is distributed among playback devices within a networked media playback system.

For instance, one or more playback devices may be grouped for synchronous playback of given audio content within a local media playback network. A given one of the playback devices may act as a "group coordinator" and the other playback devices may act as "group members." The group coordinator may evaluate one or more characteristics relating to playback device characteristics, playback group characteristics, and/or network characteristics. Based on the evaluation, the group coordinator may determine that a first other playback device and a second other playback device of the playback group each have different device and/or network characteristics. The group coordinator may cause each of the first other playback device and the second other playback device of the playback group to play back, in synchrony, a given version of the given audio content based on their respective characteristics.

Accordingly, in one aspect, disclosed herein is a first playback device including at least one processor, a non-transitory computer-readable medium, and program instructions stored on the non-transitory computer-readable medium that are executable by the at least one processor such that the first playback device is configured to: (i) identify a first version and a second version of audio content; (ii) identify a first connection quality between a second playback device and a network device and a second connection quality between a third playback device and the network device, wherein the second playback device and the third playback device are members of a synchrony group with the first playback device for playback of audio content; (iii) determine that the first connection quality meets a threshold criteria and the second connection quality does not meet the threshold criteria; (iv) play back one of the first version or the second version of the audio content; (v) based on the determination that the first connection quality meets the threshold criteria and the second connection quality does not meet the threshold criteria: (1) cause the second playback device to play back the first version of the audio content in synchrony with the playback of the one of the first version or the second version of the audio content by the first playback device, and (2) cause the third playback device to play back the second version of the audio content in synchrony with the playback of the one of the first version or the second version of the audio content by the first playback device; (vi) while the third playback device is playing back the second version of the audio content, detect a change in the second connection quality between the third playback device and the network device; and (vii) based on the detected change in the second connection quality, cause the third playback device to transition from playing back the second version of the audio content to playing back the first version of the audio content in synchrony with the playback of the one of the first version or the second version of the audio content by the first playback device.

In another aspect, disclosed herein is a non-transitory computer-readable medium. The non-transitory computer-readable medium is provisioned with program instructions that, when executed by at least one processor, cause a first playback device to: (i) identify a first version and a second version of audio content; (ii) identify a first connection quality between a second playback device and a network device and a second connection quality between a third playback device and the network device, wherein the second playback device and the third playback device are members of a synchrony group with the first playback device for playback of audio content; (iii) determine that the first connection quality meets a threshold criteria and the second connection quality does not meet the threshold criteria; (iv) play back one of the first version or the second version of the audio content; (v) based on the determination that the first connection quality meets the threshold criteria and the second connection quality does not meet the threshold criteria: (1) cause the second playback device to play back the first version of the audio content in synchrony with the playback of the one of the first version or the second version of the audio content by the first playback device, and (2) cause the third playback device to play back the second version of the audio content in synchrony with the playback of the one of the first version or the second version of the audio content by the first playback device; (vi) while the third playback device is playing back the second version of the audio content, detect a change in the second connection quality between the third playback device and the network device; and (vii) based on the detected change in the second connection quality, cause the third playback device to transition from playing back the second version of the audio content to playing back the first version of the audio content in synchrony with the playback of the one of the first version or the second version of the audio content by the first playback device.

In yet another aspect, disclosed herein is a method carried out by a first playback device that involves: (i) identifying a first version and a second version of audio content; (ii) identifying a first connection quality between a second playback device and a network device and a second connection quality between a third playback device and the network device, wherein the second playback device and the third playback device are members of a synchrony group with the first playback device for playback of audio content; (iii) determining that the first connection quality meets a threshold criteria and the second connection quality does not meet the at least one threshold criteria; (iv) playing back one of the first version or the second version of the audio content; (v) based on determining that the first connection quality meets the threshold criteria and the second connection quality does not meet the threshold criteria: (1) causing the second playback device to play back the first version of the audio content in synchrony with the playback of the one of the first version or the second version of the audio content by the first playback device, and (2) causing the third playback device to play back the second version of the audio content in synchrony with the playback of the one of the first version or the second version of the audio content by the first playback device; (vi) while the third playback device is playing back the second version of the audio content, detecting a change in the second connection quality between the third playback device and the network device; and (vii) based on the detected change in the second connection quality, causing the third playback device to transition from playing back the second version of the audio content to playing back the first version of the audio content in synchrony with the playback of the one of the first version or the second version of the audio content by the first playback device.

In still another aspect, disclosed herein is a first playback device including at least one processor, a non-transitory computer-readable medium, and program instructions stored on the non-transitory computer-readable medium that are executable by the at least one processor such that the first playback device is configured to: (i) identify a first version and a second version of audio content; (ii) identify a connection quality between a second playback device and a network device, wherein the second playback device is a member of a synchrony group with the first playback device for playback of audio content; (iii) determine that the connection quality does not meet a threshold criteria; (iv) play back the first version of the audio content; (v) based on the determination that the connection quality does not meet the threshold criteria, cause the second playback device to play back the second version of the audio content in synchrony with the playback of the first version of the audio content by the first playback device; (vi) while the second playback device is playing back the second version of the audio content, detect a change in the connection quality of the connection between the second playback device and the network device; and (vii) based on the detected change in the connection quality, cause the second playback device to transition from playing back the second version of the audio content to playing back the first version of the audio content in synchrony with the playback of the first version of the audio content by the first playback device.

Further yet, in another aspect, disclosed herein is a first playback device including at least one processor, a non-transitory computer-readable medium, and program instructions stored on the non-transitory computer-readable medium that are executable by the at least one processor such that the first playback device is configured to: (i) operate as part of a synchrony group that comprises the first playback device and a second playback device; (ii) obtain a first version of audio content that is encoded according to a first encoding format; (iii) determine that the first version of the audio content is unsuitable for playback by the second playback device; (iv) based on the determination, (1) decode the first version of the audio content and (2) re-encode a second version of the audio content according to a second encoding format; (v) transmit the second version of the audio content to the second playback device for playback; (vi) cause the second playback device to play back the second version of the audio content; and (vii) play back the first version of the audio content in synchrony with the playback of the second version of the audio content by the second playback device.

Still further, in another aspect, disclosed herein is a non-transitory computer-readable medium. The non-transitory computer-readable medium is provisioned with program instructions that, when executed by at least one processor, cause a first playback device to: (i) operate as part of a synchrony group that comprises the first playback device and a second playback device; (ii) obtain a first version of audio content that is encoded according to a first encoding format; (iii) determine that the first version of the audio content is unsuitable for playback by the second playback device; (iv) based on the determination, (1) decode the first version of the audio content and (2) re-encode a second version of the audio content according to a second encoding format; (v) transmit the second version of the audio content to the second playback device for playback; (vi) cause the second playback device to play back the second version of the audio content; and (vii) play back the first version of the audio content in synchrony with the playback of the second version of the audio content by the second playback device.

Further yet, in another aspect, disclosed herein is a method carried out by a first playback device that involves: (i) operating as part of a synchrony group that comprises the first playback device and a second playback device; (ii) obtaining a first version of audio content that is encoded according to a first encoding format; (iii) determining that the first version of the audio content is unsuitable for playback by the second playback device; (iv) based on the determination, (1) decoding the first version of the audio content and (2) re-encoding a second version of the audio content according to a second encoding format; (v) transmitting the second version of the audio content to the second playback device for playback; (vi) causing the second playback device to play back the second version of the audio content; and (vii) playing back the first version of the audio content in synchrony with the playback of the second version of the audio content by the second playback device.

Further yet, in another aspect, disclosed herein is a first playback device including at least one processor, a non-transitory computer-readable medium, and program instructions stored on the non-transitory computer-readable medium that are executable by the at least one processor such that the first playback device is configured to: (i) play back a first version of given audio content obtained from a cloud-based media content service, wherein the first version of the given audio content corresponds to a first playback capability of the first playback device; (ii) while playing back the first version of the given audio content, receive an indication of a command for a second playback device to join the first playback device as part of a synchrony group for synchronous playback of audio content; (iii) obtain, based on a determination of a second playback capability of the second playback device, a second version of the given audio content from the cloud-based media content service, wherein the second version of the given audio content corresponds to the second playback capability; (iv) transition from playing back the first version of the given audio content to playing back the second version of the given audio content; and (v) coordinate with the second playback device to play back the second version of the given audio content in synchrony.

Further, in another aspect, disclosed herein is a non-transitory computer-readable medium. The non-transitory computer-readable medium is provisioned with program instructions that, when executed by at least one processor, cause a first playback device to: (i) play back a first version of given audio content obtained from a cloud-based media content service, wherein the first version of the given audio content corresponds to a first playback capability of the first playback device; (ii) while playing back the first version of the given audio content, receive an indication of a command for a second playback device to join the first playback device as part of a synchrony group for synchronous playback of audio content; (iii) obtain, based on a determination of a second playback capability of the second playback device, a second version of the given audio content from the cloud-based media content service, wherein the second version of the given audio content corresponds to the second playback capability; (iv) transition from playing back the first version of the given audio content to playing back the second version of the given audio content; and (v) coordinate with the second playback device to play back the second version of the given audio content in synchrony.

Still further, in another aspect, disclosed herein is a method carried out by a first playback device that involves: (i) playing back a first version of given audio content obtained from a cloud-based media content service, wherein the first version of the given audio content corresponds to a first playback capability of the first playback device; (ii) while playing back the first version of the given audio content, receiving an indication of a command for a second playback device to join the first playback device as part of a synchrony group for synchronous playback of audio content; (iii) obtaining, based on a determination of a second playback capability of the second playback device, a second version of the given audio content from the cloud-based media content service, wherein the second version of the given audio content corresponds to the second playback capability; (iv) transitioning from playing back the first version of the given audio content to playing back the second version of the given audio content; and (v) coordinating with the second playback device to play back the second version of the given audio content in synchrony.

Further, in another aspect, disclosed herein is a computing device including a user interface, at least one processor, a non-transitory computer-readable medium, and program instructions stored on the non-transitory computer-readable medium that are executable by the at least one processor such that the computing device is configured to: (1) display, via the user interface, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determine that the quality level of the current version of the media content being played back does not match the highest-available quality level and thereby cause the content quality indicator to represent the second state; (3) receive, via the user interface, an input indicating a request to access a set of information about the quality level of the current version of the media content being played back; and (4) based on the input indicating the request, display, via the user interface, the set of information, wherein the set of information includes at least one factor contributing to the quality level of the current version of the media content being played back.

In another aspect, disclosed herein is a non-transitory computer-readable medium. The non-transitory computer-readable medium is provisioned with program instructions that, when executed by at least one processor, cause computing device to: (1) display, via the user interface, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determine that the quality level of the current version of the media content being played back does not match the highest-available quality level and thereby cause the content quality indicator to represent the second state; (3) receive, via the user interface, an input indicating a request to access a set of information about the quality level of the current version of the media content being played back; and (4) based on the input indicating the request, display, via the user interface, the set of information, wherein the set of information includes at least one factor contributing to the quality level of the current version of the media content being played back.

In yet another aspect, disclosed herein is a method carried out by a first playback device that involves: (1) displaying, via the user interface, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determining that the quality level of the current version of the media content being played back does not match the highest-available quality level and thereby cause the content quality indicator to represent the second state; (3) receiving, via the user interface, an input indicating a request to access a set of information about the quality level of the current version of the media content being played back; and (4) based on the input indicating the request, displaying, via the user interface, the set of information, wherein the set of information includes at least one factor contributing to the quality level of the current version of the media content being played back.

It will be understood by one of ordinary skill in the art that this disclosure includes numerous other embodiments. It will be understood by one of ordinary skill in the art that this disclosure includes numerous other examples. While some examples described herein may refer to functions performed by given actors such as "users" and/or other entities, it should be understood that this description is for purposes of explanation only. The claims should not be interpreted to require action by any such example actor unless explicitly required by the language of the claims themselves.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

II. Suitable Operating Environment a. Suitable Media Playback System

Figure 1B:
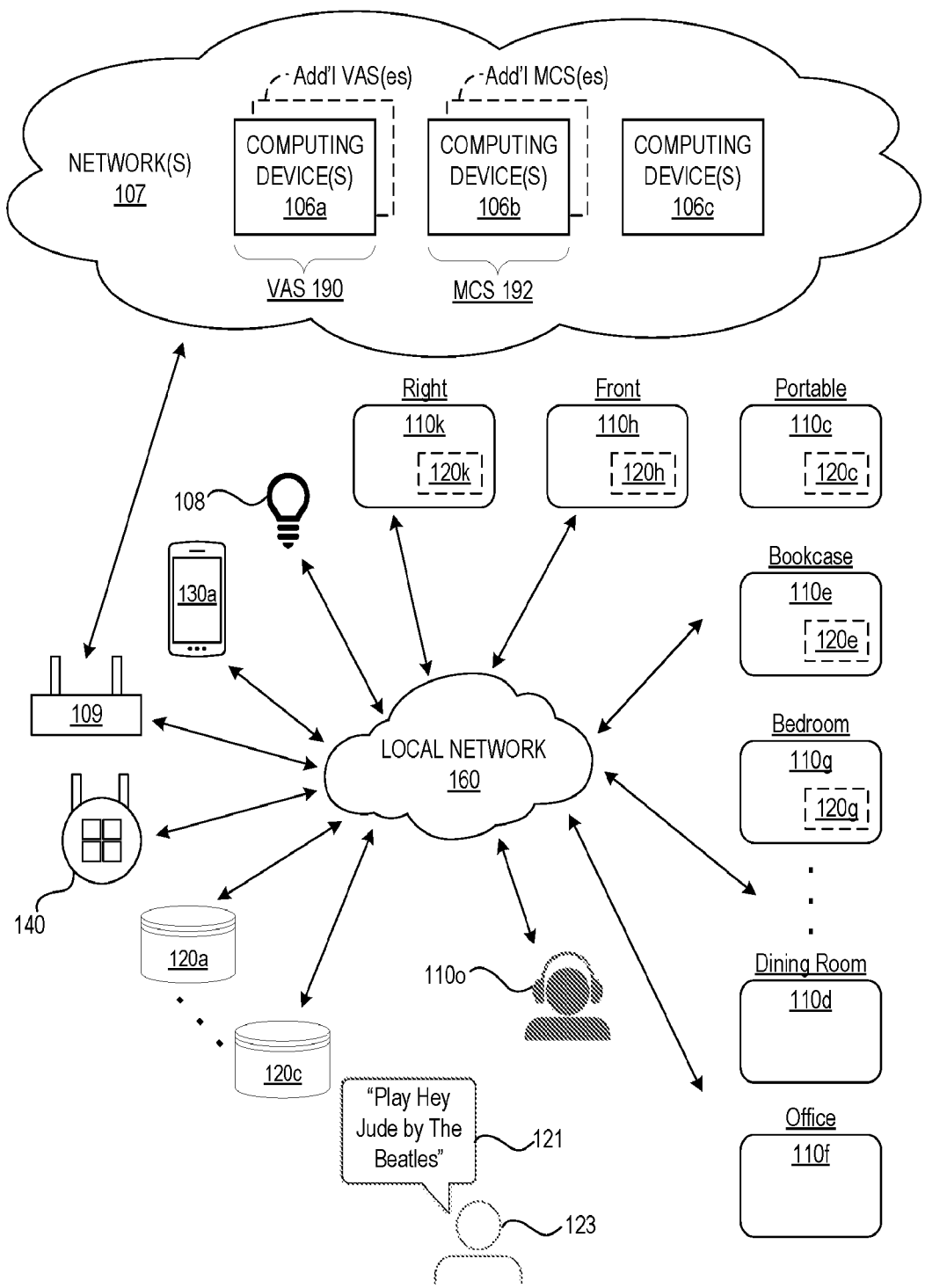
FIG. 1B is a schematic diagram of the media playback system of FIG. 1A and one or more networks.

FIGS. 1A and 1B illustrate an example configuration of a media playback system ("MPS") 100 in which one or more embodiments disclosed herein may be implemented. Referring first to FIG. 1A, a partial cutaway view of MPS 100 distributed in an environment 101 (e.g., a house) is shown. The MPS 100 as shown is associated with an example home environment having a plurality of rooms and spaces. The MPS 100 comprises one or more playback devices 110 (identified individually as playback devices 110a-o), one or more network microphone devices ("NMDs") 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the MPS 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the MPS 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the MPS 100 is configured to play back audio from a first playback device (e.g., the playback device 110a) in synchrony with a second playback device (e.g., the playback device 110b). Interactions between the playback devices 110, NMDs 120, and/or control devices 130 of the MPS 100 configured in accordance with the various embodiments of the disclosure are described in greater detail below with respect to FIGS. 1B-1N.

In the illustrated embodiment of FIG. 1A, the environment 101 comprises a household having several rooms, spaces, and/or playback zones, including (clockwise from upper left) a Master Bathroom 101a, a Master Bedroom 101b, a Second Bedroom 101c, a Family Room or Den 101d, an Office 101e, a Living Room 101f, a Dining Room 101g, a Kitchen 101h, and an outdoor Patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The MPS 100 can comprise one or more playback zones, some of which may correspond to the rooms in the environment 101. The MPS 100 can be established with one or more playback zones, after which additional zones may be added and/or removed to form, for example, the configuration shown in FIG. 1A. Each zone may be given a name according to a different room or space such as the Office 101e, Master Bathroom 101a, Master Bedroom 101b, the Second Bedroom 101c, Kitchen 101h, Dining Room 101g, Living Room 101f, and/or the Patio 101i. In some aspects, a single playback zone may include multiple rooms or spaces. In certain aspects, a single room or space may include multiple playback zones.

In the illustrated embodiment of FIG. 1A, the Master Bathroom 101a, the Second Bedroom 101c, the Office 101e, the Living Room 101f, the Dining Room 101g, the Kitchen 101h, and the outdoor Patio 101i each include one playback device 110, and the Master Bedroom 101b and the Den 101d include a plurality of playback devices 110. In the Master Bedroom 101b, the playback devices 110l and 110m may be configured, for example, to play back audio content in synchrony as individual ones of playback devices 110, as a bonded playback zone, as a consolidated playback device, and/or any combination thereof. Similarly, in the Den 101d, the playback devices 110h-j can be configured, for instance, to play back audio content in synchrony as individual ones of playback devices 110, as one or more bonded playback devices, and/or as one or more consolidated playback devices.

Referring to FIG. 1B, the home environment may include additional and/or other computing devices, including local network devices, such as one or more smart illumination devices 108 (FIG. 1B), a smart thermostat 140 (FIG. 1B), and a local computing device 105 (FIG. 1A). Numerous other examples of local network devices (not shown) are also possible, such as doorbells, cameras, smoke alarms, televisions, gaming consoles, garage door openers, etc. In embodiments described below, one or more of the various playback devices 110 may be configured as portable playback devices, while others may be configured as stationary playback devices. For example, the headphones 110o (FIG. 1B) are a portable playback device, while the playback device 110e on the bookcase may be a stationary device. As another example, the playback device 110c on the Patio 101i may be a battery-powered device, which may allow it to be transported to various areas within the environment 101, and outside of the environment 101, when it is not plugged in to a wall outlet or the like.

With reference still to FIG. 1B, the various playback, network microphone, and controller devices and/or other network devices of the MPS 100 may be coupled to one another via point-to-point connections and/or over other connections, which may be wired and/or wireless, via a local network 160 that may include a network router 109. For example, the playback device 110j in the Den 101d (FIG. 1A), which may be designated as the "Left" device, may have a point-to-point connection with the playback device 110k, which is also in the Den 101d and may be designated as the "Right" device. In a related embodiment, the Left playback device 110j may communicate with other network devices, such as the playback device 110h, which may be designated as the "Front" device, via a point-to-point connection and/or other connections via the local network 160.

The local network 160 may be, for example, a network that interconnects one or more devices within a limited area (e.g., a residence, an office building, a car, an individual's workspace, etc.). The local network 160 may include, for example, one or more local area networks (LANs) such as a wireless local area network (WLAN) (e.g., a WIFI network, a Z-Wave network, etc.) and/or one or more personal area networks (PANs) (e.g. a BLUETOOTH network, a wireless USB network, a ZigBee network, an IRDA network, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WIFI" can refer to several different communication protocols including, for example, Institute of Electrical and Electronics Engineers (IEEE) 802.11a, 802.11b, 802.11g, 802.12, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, 6 GHZ, and/or another suitable frequency.

The MPS 100 is configured to receive media content from the local network 160. The received media content can comprise, for example, a Uniform Resource Identifier (URI) and/or a Uniform Resource Locator (URL). For instance, in some examples, the MPS 100 can stream, download, or otherwise obtain data from a URI or a URL corresponding to the received media content.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the environment 101 (FIG. 1A).

In some implementations, the various playback devices 110, NMDs 120, and/or control devices 130 may be communicatively coupled to at least one remote computing device associated with a voice assistant service ("VAS") and/or at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to any number of different VASes and/or MCSes. In some embodiments, the various playback devices 110, NMDs 120, and/or control devices 130 may transmit data associated with a received voice input to a VAS configured to (i) process the received voice input data and (ii) transmit a corresponding command to the MPS 100. In some aspects, for example, the computing devices 106a may comprise one or more modules and/or servers of a VAS. In some implementations, VASes may be operated by one or more of SONOS®, AMAZON®, GOOGLE® APPLE®, MICROSOFT®, NUANCE®, or other voice assistant providers. In some implementations, MCSes may be operated by one or more of SPOTIFY, PANDORA, AMAZON MUSIC, YOUTUBE MUSIC, APPLE MUSIC, GOOGLE PLAY, or other media content services.

In some embodiments, the local network 160 comprises a dedicated communication network that the MPS 100 uses to transmit messages between individual devices and/or to transmit media content to and from MCSes. In certain embodiments, the local network 160 is configured to be accessible only to devices in the MPS 100, thereby reducing interference and competition with other household devices. In other embodiments, however, the local network 160 comprises an existing household communication network (e.g., a household WIFI network). In some embodiments, the MPS 100 is implemented without the local network 160, and the various devices comprising the MPS 100 can communicate with each other, for example, via one or more direct connections, PANs, telecommunication networks (e.g., an LTE network or a 5G network, etc.), and/or other suitable communication links.

In some embodiments, audio content sources may be regularly added and/or removed from the MPS 100. In some embodiments, for example, the MPS 100 performs an indexing of media items when one or more media content sources are updated, added to, and/or removed from the MPS 100. The MPS 100 can scan identifiable media items in some or all folders and/or directories accessible to the various playback devices and generate or update a media content database comprising metadata (e.g., title, artist, album, track length) and other associated information (e.g., URIs, URLs) for each identifiable media item found. In some embodiments, for example, the media content database is stored on one or more of the various playback devices, network microphone devices, and/or control devices of MPS 100.

As further shown in FIG. 1B, the remote computing devices 106 further include remote computing device(s) 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 110 may take the form of or include an on-board (e.g., integrated) network microphone device configured to detect sound, including voice utterances from a user. For example, the playback devices 110c-110h, and 110k include or are otherwise equipped with corresponding NMDs 120c-120h, and 120k, respectively. A playback device that includes or is equipped with an NMD may be referred to herein interchangeably as a playback device or an NMD unless indicated otherwise in the description. In some cases, one or more of the NMDs 120 may be a stand-alone device. For example, the NMD 1201 (FIG. 1A) may be a stand-alone device. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 110 and 120 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 110e because it is physically situated on a bookcase. Similarly, the NMD 1201 may be assigned the named "Island" because it is physically situated on an island countertop in the Kitchen 101h (FIG. 1A). Some playback devices may be assigned names according to a zone or room, such as the playback devices 110g, 110d, and 110f, which are named "Bedroom," "Dining Room," and "Office," respectively. Further, certain playback devices may have functionally descriptive names. For example, the playback devices 110k and 110h are assigned the names "Right" and "Front," respectively, because these two devices are configured to provide specific audio channels during media playback in the zone of the Den 101d (FIG. 1A). The playback device 110c in the Patio 101i may be named "Portable" because it is battery-powered and/or readily transportable to different areas of the environment 101. Other naming conventions are possible.

As discussed above, an NMD may detect and process sound from its environment, including audio output played by itself, played by other devices in the environment 101, and/or sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word (also referred to herein as an activation word) associated with a particular VAS.

In the illustrated example of FIG. 1B, the NMDs 120 are configured to interact with the VAS 190 over the local network 160 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 105, 110, 120, and 130 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. Pat. No. 10,499,146, issued Nov. 13, 2019 and titled "Voice Control of a Media Playback System," which is herein incorporated by reference in its entirety.

Upon receiving the stream of sound data, the VAS 190 may determine if there is voice input in the streamed data from the NMD, and if so the VAS 190 may also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude" performed by The Beatles. After these determinations, the VAS 190 may transmit a command to a particular MCS 192 to retrieve content (i.e., the song "Hey Jude" by The Beatles), and that MCS 192, in turn, provides (e.g., streams) this content directly to the NIPS 100 or indirectly via the VAS 190. In some implementations, the VAS 190 may transmit to the NIPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 110e in the environment 101 (FIG. 1A) is in relatively close proximity to the NMD-equipped Living Room playback device 120b, and both devices 110e and 120b may at least sometimes detect the same sound. In such cases, this may require arbitration as to which device is ultimately responsible for providing detected-sound data to the remote VAS. Examples of arbitrating between NMDs may be found, for example, in previously referenced U.S. Pat. No. 10,499,146.

In certain implementations, an NMD may be assigned to, or otherwise associated with, a designated or default playback device that may not include an NMD. For example, the Island NMD 1201 in the Kitchen 101h (FIG. 1A) may be assigned to the Dining Room playback device 110d, which is in relatively close proximity to the Island NMD 1201. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Pat. No. 10,499,146.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback devices 110, network microphone devices 120, and/or control devices 130. For example, the technologies herein may be utilized within an environment having a single playback device 110 and/or a single NMD 120. In some examples of such cases, the local network 160 (FIG. 1B) may be eliminated and the single playback device 110 and/or the single NMD 120 may communicate directly with the remote computing devices 106a-c. In some embodiments, a telecommunication network (e.g., an LTE network, a 5G network, etc.) may communicate with the various playback devices 110, network microphone devices 120, and/or control devices 130 independent of the local network 160.

b. Suitable Playback Devices

Figure 1C:
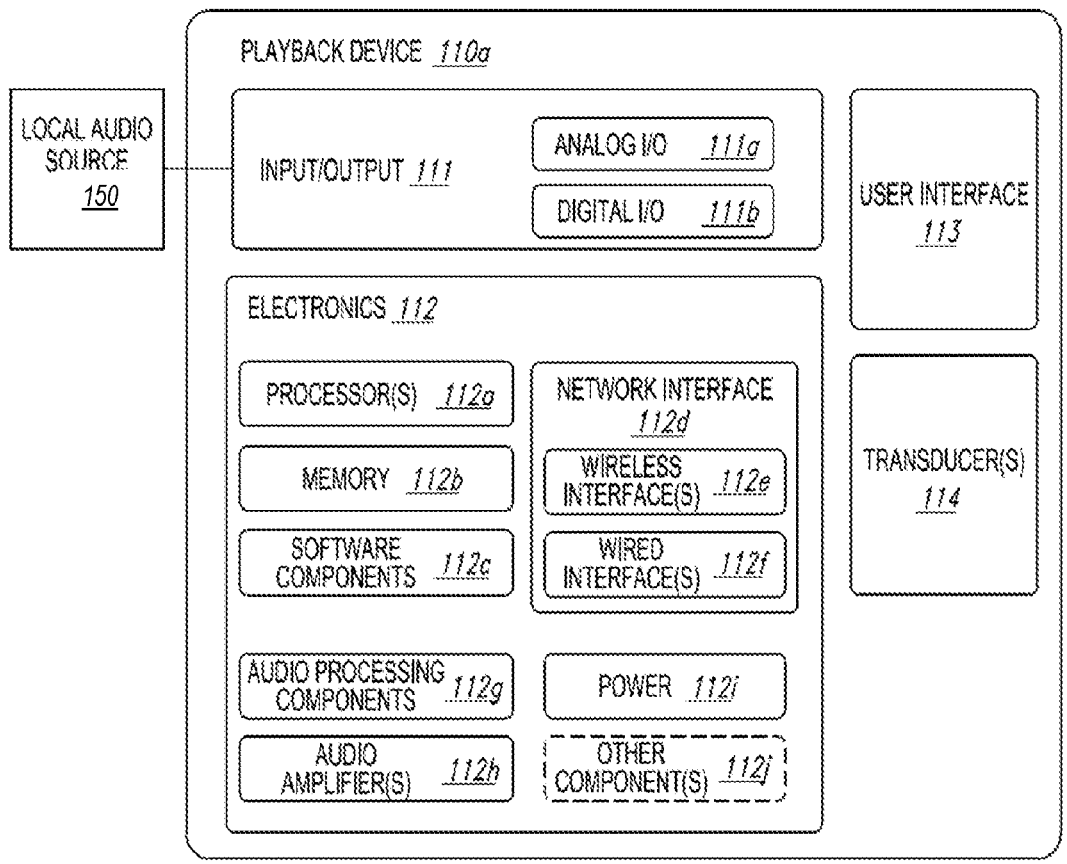
FIGS. 1C through 1E are block diagrams of example playback devices.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WIFI, BLUETOOTH, or another suitable communication protocol. In certain embodiments, the analog I/O 111a and the digital I/O 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 150 via the input/output 111 (e.g., a cable, a wire, a PAN, a BLUETOOTH connection, an ad hoc wired or wireless communication network, and/or another suitable communication link). The local audio source 150 can comprise, for example, a mobile device (e.g., a smartphone, a tablet, a laptop computer) or another suitable audio component (e.g., a television, a desktop computer, an amplifier, a phonograph, a DVD player, a Blu-ray player, a game console, a memory storing digital media files). In some aspects, the local audio source 150 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 150. In other embodiments, however, the media playback system omits the local audio source 150 altogether. In some embodiments, the playback device 110a does not include an input/output 111 and receives all audio content via the local network 160.

The playback device 110a further comprises electronics 112, a user interface 113 (e.g., one or more buttons, knobs, dials, touch-sensitive surfaces, displays, touchscreens), and one or more transducers 114 (e.g., a driver), referred to hereinafter as "the transducers 114." The electronics 112 is configured to receive audio from an audio source (e.g., the local audio source 150) via the input/output 111, one or more of the computing devices 106a-c via the local network 160 (FIG. 1B), amplify the received audio, and output the amplified audio for playback via one or more of the transducers 114. In some embodiments, the playback device 110a optionally includes one or more microphones (e.g., a single microphone, a plurality of microphones, a microphone array) (hereinafter referred to as "the microphones"). In certain embodiments, for example, the playback device 110a having one or more of the optional microphones can operate as an NMD configured to receive voice input from a user and correspondingly perform one or more operations based on the received voice input, which will be discussed in more detail further below with respect to FIGS. 1F and 1G.

In the illustrated embodiment of FIG. 1C, the electronics 112 comprise one or more processors 112a (referred to hereinafter as "the processors 112a"), memory 112b, software components 112c, a network interface 112d, one or more audio processing components 112g, one or more audio amplifiers 112h (referred to hereinafter as "the amplifiers 112h"), and power components 112i (e.g., one or more power supplies, power cables, power receptacles, batteries, induction coils, Power-over Ethernet (POE) interfaces, and/or other suitable sources of electric power).

In some embodiments, the electronics 112 optionally include one or more other components 112j (e.g., one or more sensors, video displays, touchscreens, battery charging bases). In some embodiments, the playback device 110a and electronics 112 may further include one or more voice processing components that are operably coupled to one or more microphones, and other components as described below with reference to FIGS. 1F and 1G.

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices and/or zones can be found, for example, in U.S. Pat. No. 8,234,395 entitled "System and method for synchronizing operations among a plurality of independently clocked digital data processing devices," which is herein incorporated by reference in its entirety.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the MPS 100. In some aspects, for example, the state data is shared during predetermined intervals of time (e.g., every 5 seconds, every 10 seconds, every 60 seconds) among at least a portion of the devices of the MPS 100, so that one or more of the devices have the most recent data associated with the MPS 100.

The network interface 112d is configured to facilitate a transmission of data between the playback device 110a and one or more other devices on a data network. The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the local network 160 (FIG. 1B) in accordance with a suitable wireless communication protocol (e.g., WIFI, BLUETOOTH, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

In some implementations, the power components 112i of the playback device 110a may additionally include an internal power source (e.g., one or more batteries) configured to power the playback device 110a without a physical connection to an external power source. When equipped with the internal power source, the playback device 110a may operate independent of an external power source. In some such implementations, an external power source interface may be configured to facilitate charging the internal power source. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The user interface 113 may facilitate user interactions independent of or in conjunction with user interactions facilitated by one or more of the control devices 130 (FIG. 1A). In various embodiments, the user interface 113 includes one or more physical buttons and/or supports graphical interfaces provided on touch sensitive screen(s) and/or surface(s), among other possibilities, for a user to directly provide input. The user interface 113 may further include one or more light components (e.g., LEDs) and the speakers to provide visual and/or audio feedback to a user.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

In some embodiments, the playback device 110a may include a speaker interface for connecting the playback device to external speakers. In other embodiments, the playback device 110a may include an audio interface for connecting the playback device to an external audio amplifier or audio-visual receiver.

Figure 1D:
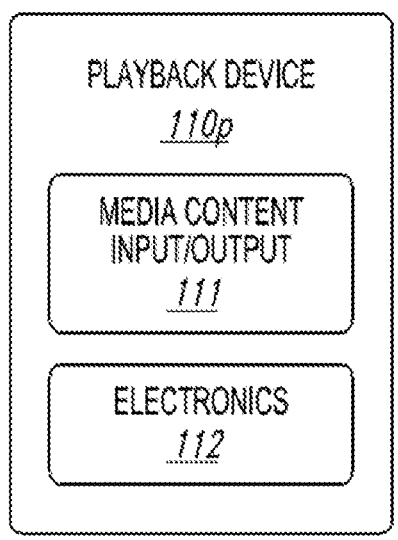

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," "SUB," "ARC," "MOVE," and "ROAM." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more of the playback devices 110 may comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device may omit a user interface and/or one or more transducers. For example, FIG. 1D is a block diagram of a playback device 110p comprising the input/output 111 and electronics 112 without the user interface 113 or transducers 114.

Figure 1E:
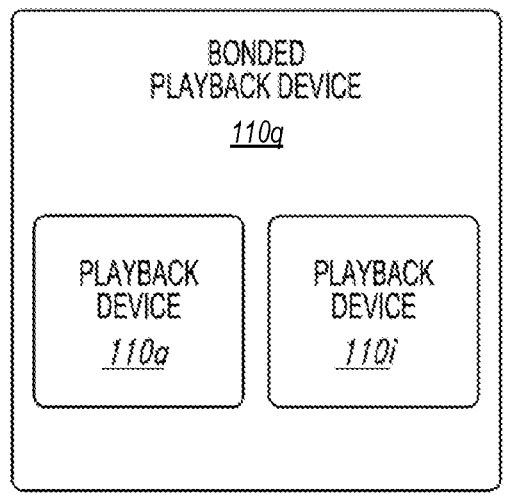

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with playback device 110i, is configured to render only the mid-range and high frequency components of a particular audio content, while the playback device 110i renders the low frequency component of the particular audio content. In some embodiments, the bonded playback device 110q includes additional playback devices and/or another bonded playback device.

Figure 2:
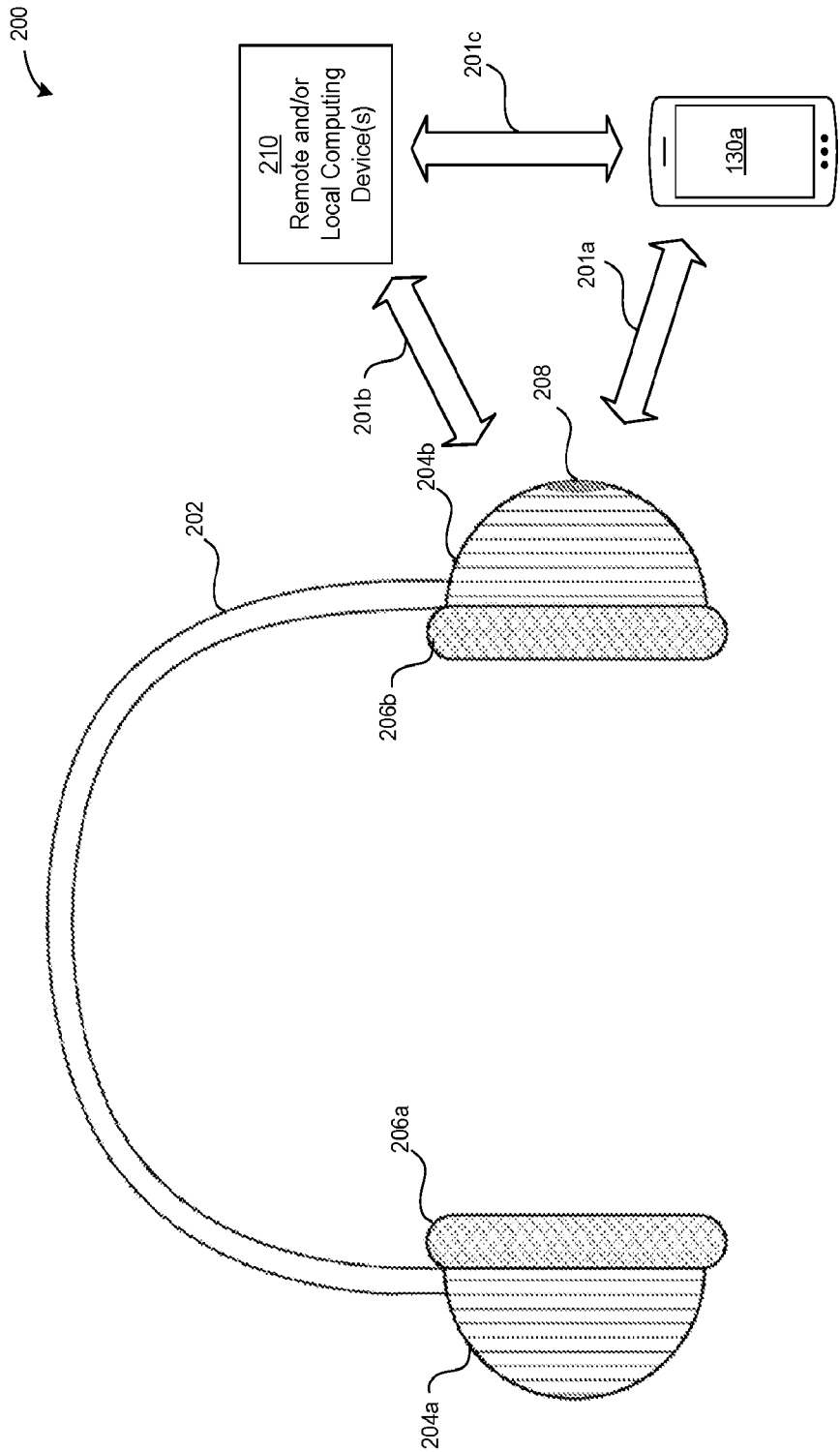
FIG. 2 is a diagram of an example headset assembly for an example playback device.

In some embodiments, one or more of the playback devices 110 may take the form of a wired and/or wireless headphone device (e.g., over-ear headphones, on-ear headphones, in-ear earphones, etc.). For instance, FIG. 2 shows an example headset assembly 200 ("headset 200") for such an implementation of one of the playback devices 110. As shown, the headset 200 includes a headband 202 that couples a first earcup 204a to a second earcup 204b. Each of the earcups 204a and 204b may house any portion of the electronic components in the playback device 110, such as one or more speakers. Further, one or both of the earcups 204a and 204b may include a user interface for controlling audio playback, volume level, and other functions. The user interface may include any of a variety of control elements such as a physical button 208, a slider (not shown), a knob (not shown), and/or a touch control surface (not shown). As shown in FIG. 2, the headset 200 may further include ear cushions 206a and 206b that are coupled to ear cups 204a and 204b, respectively. The ear cushions 206a and 206b may provide a soft barrier between the head of a user and the earcups 204a and 204b, respectively, to improve user comfort and/or provide acoustic isolation from the ambient (e.g., passive noise reduction (PNR)).

As described in greater detail below, the electronic components of a playback device may include one or more network interface components (not shown in FIG. 2) to facilitate wireless communication over one more communication links. For instance, a playback device may communicate over a first communication link 201a (e.g., a BLUETOOTH link) with one of the control devices 130, such as the control device 130a, and/or over a second communication link 201b (e.g., a WIFI or cellular link) with one or more other computing devices 210 (e.g., a network router and/or a remote server). As another possibility, a playback device may communicate over multiple communication links, such as the first communication link 201a with the control device 130a and a third communication link 201c (e.g., a WIFI or cellular link) between the control device 130a and the one or more other computing devices 210. Thus, the control device 130a may function as an intermediary between the playback device and the one or more other computing devices 210, in some embodiments.

In some instances, the headphone device may take the form of a hearable device. Hearable devices may include those headphone devices (including ear-level devices) that are configured to provide a hearing enhancement function while also supporting playback of media content (e.g., streaming media content from a user device over a PAN, streaming media content from a streaming music service provider over a WLAN and/or a cellular network connection, etc.). In some instances, a hearable device may be implemented as an in-ear headphone device that is configured to playback an amplified version of at least some sounds detected from an external environment (e.g., all sound, select sounds such as human speech, etc.)

It should be appreciated that one or more of the playback devices 110 may take the form of other wearable devices separate and apart from a headphone device. Wearable devices may include those devices configured to be worn about a portion of a user (e.g., a head, a neck, a torso, an arm, a wrist, a finger, a leg, an ankle, etc.). For example, the playback devices 110 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

c. Suitable Network Microphone Devices (NMDs)

Figures 1F, 1G:
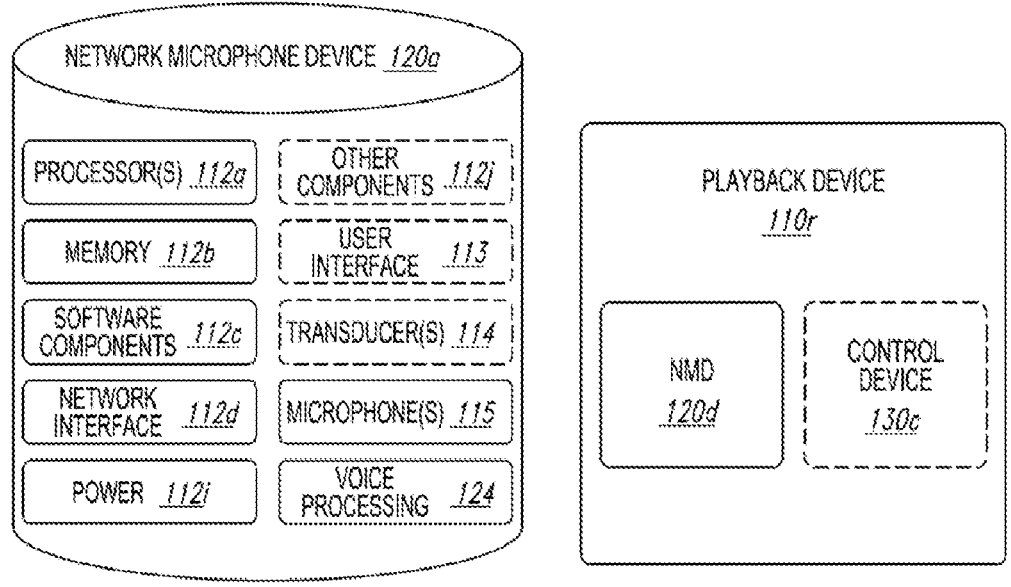
FIG. 1F is a block diagram of an example network microphone device.
FIG. 1G is a block diagram of an example playback device.

FIG. 1F is a block diagram of the NMD 120a (FIGS. 1A and 1B). The NMD 120a includes one or more voice processing components 124 and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio processing components 112g (FIG. 1C), the transducers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing components 124, and only a portion of the components of the electronics 112 described above with respect to FIG. 1C. In some aspects, for example, the NMD 120a includes the processor 112a and the memory 112b (FIG. 1C), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise any or all of the components of the playback device 110a and further include the microphones 115 and voice processing components 124 (FIG. 1F). The microphones 115 are configured to detect sound (i.e., acoustic waves) in the environment of the playback device 110r, which may then be provided to voice processing components 124. More specifically, each microphone 115 is configured to detect sound and convert the sound into a digital or analog signal representative of the detected sound, which can then cause the voice processing component to perform various functions based on the detected sound, as described in greater detail below. In some implementations, the microphones 115 may be arranged as an array of microphones (e.g., an array of six microphones). In some implementations the playback device 110r may include fewer than six microphones or more than six microphones. The playback device 110r optionally includes an integrated control device 130c. The control device 130c can comprise, for example, a user interface configured to receive user input (e.g., touch input, voice input) without a separate control device. In other embodiments, however, the playback device 110r receives commands from another control device (e.g., the control device 130a of FIG. 1B).

In operation, the voice-processing components 124 are generally configured to detect and process sound received via the microphones 115, identify potential voice input in the detected sound, and extract detected-sound data to enable a VAS, such as the VAS 190 (FIG. 1B), to process voice input identified in the detected-sound data. The voice processing components 124 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 124 may include or otherwise take the form of one or more DSPs or one or more modules of a DSP. In this respect, certain voice processing components 124 may be configured with particular parameters (e.g., gain and/or spectral parameters) that may be modified or otherwise tuned to achieve particular functions. In some implementations, one or more of the voice processing components 124 may be a subcomponent of the processor 112a.

In some implementations, the voice-processing components 124 may detect and store a user's voice profile, which may be associated with a user account of the MPS 100. For example, voice profiles may be stored as and/or compared to variables stored in a set of command information or data table. The voice profile may include aspects of the tone of frequency of a user's voice and/or other unique aspects of the user's voice, such as those described in previously-referenced U.S. Pat. No. 10,499,146.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The NMD 120a may use the microphone data (or transmit the microphone data to another device) for calibrating the audio characteristics of one or more playback devices 110 in the MPS 100. As another example, one or more of the playback devices 110, NMDs 120, and/or control devices 130 of the MPS 100 may transmit audio tones (e.g., ultrasonic tones, infrasonic tones) that may be detectable by the microphones 115 of other devices, and which may convey information such as a proximity and/or identity of the transmitting device, a media playback system command, etc. As yet another example, the voice processing components 124 may receive and analyze the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
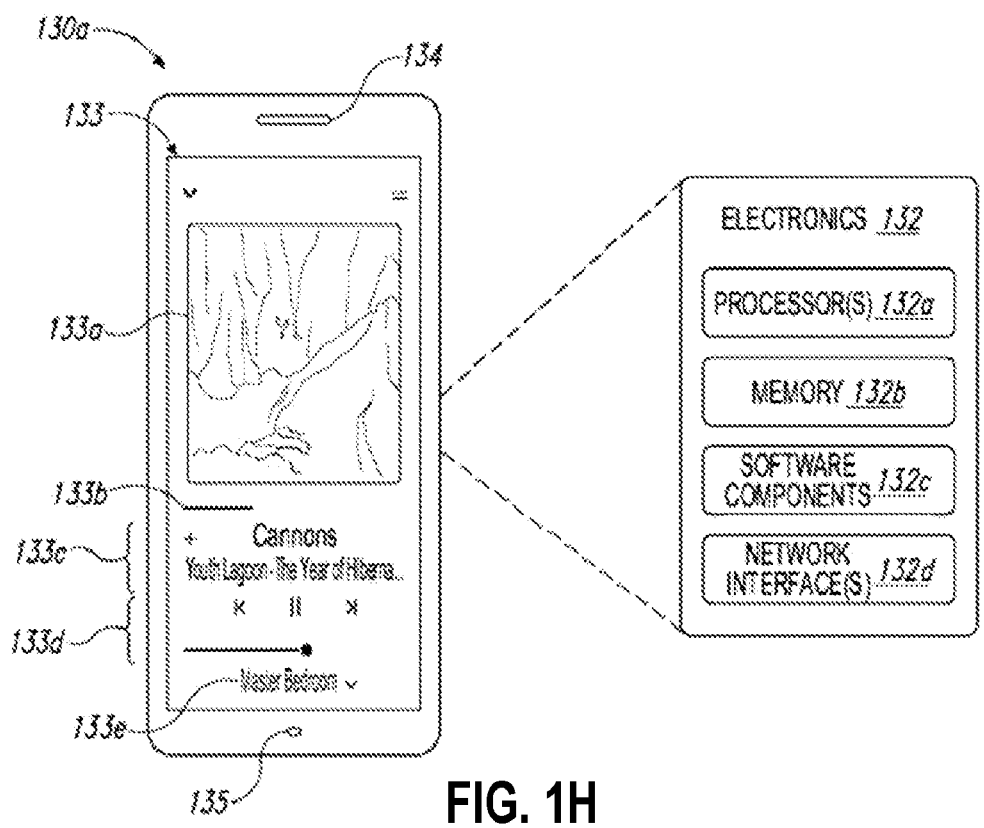
FIG. 1H is a partially schematic diagram of an example control device.

FIG. 1H is a partially schematic diagram of one example of the control device 130a (FIGS. 1A and 1B). As used herein, the term "control device" can be used interchangeably with "controller," "controller device," or "control system." Among other features, the control device 130a is configured to receive user input related to the MPS 100 and, in response, cause one or more devices in the MPS 100 to perform an action(s) and/or an operation(s) corresponding to the user input. In the illustrated embodiment, the control device 130a comprises a smartphone (e.g., an iPhone™ an Android phone) on which media playback system controller application software is installed. In some embodiments, the control device 130a comprises, for example, a tablet (e.g., an iPad"), a computer (e.g., a laptop computer, a desktop computer), and/or another suitable device (e.g., a television, an automobile audio head unit, an IoT device). In certain embodiments, the control device 130a comprises a dedicated controller for the MPS 100. In other embodiments, as described above with respect to FIG. 1G, the control device 130a is integrated into another device in the MPS 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processor(s) 132a"), a memory 132b, software components 132c, and a network interface 132d. The processor(s) 132a can be configured to perform functions relevant to facilitating user access, control, and configuration of the MPS 100. The memory 132b can comprise data storage that can be loaded with one or more of the software components executable by the processors 132a to perform those functions. The software components 132c can comprise applications and/or other executable software configured to facilitate control of the MPS 100. The memory 132b can be configured to store, for example, the software components 132c, media playback system controller application software, and/or other data associated with the MPS 100 and the user.

The network interface 132d is configured to facilitate network communications between the control device 130a and one or more other devices in the MPS 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.12, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130a to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among other changes. Additional description of zones and groups can be found below with respect to FIGS. 1J through 1N.

Figure 1I:
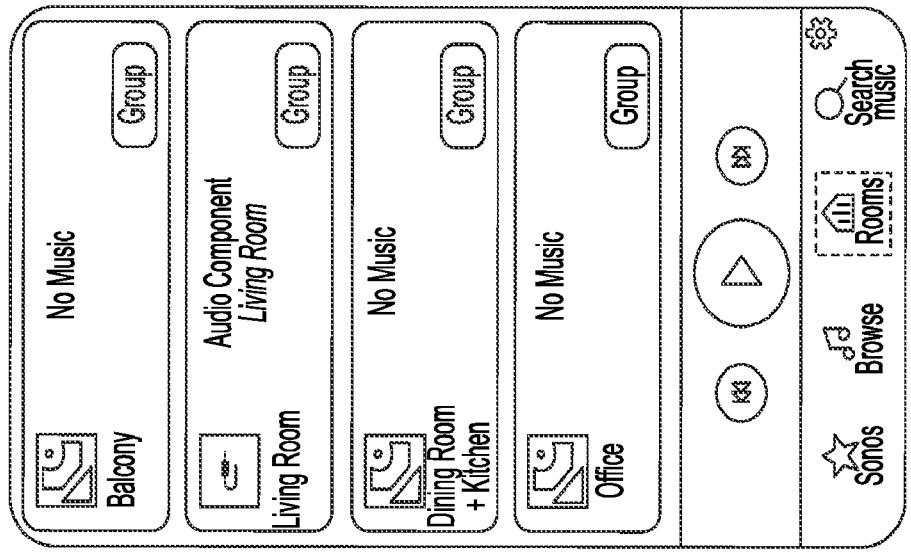
FIG. 1I is a schematic diagram of example user interfaces of the example control device of FIG. 1H.
Figure 1I:
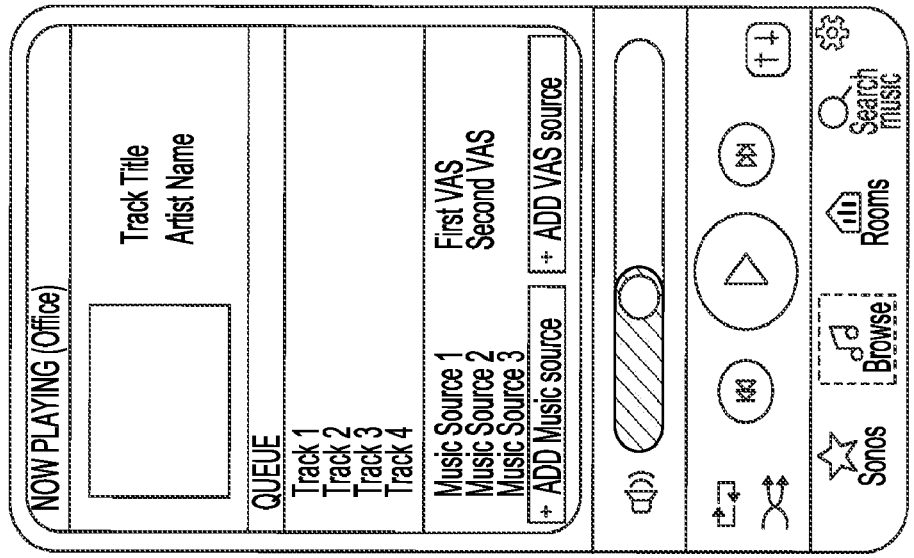

The user interface 133 is configured to receive user input and can facilitate control of the MPS 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone, etc.). In some embodiments, however, user interfaces of varying formats, styles, and interactive sequences may alternatively be implemented on one or more network devices to provide comparable control access to a media playback system. FIG. 1I shows two additional example user interface displays 133f and 133g of user interface 133. Additional examples are also possible.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device, etc.) comprising a portion of the electronics 132 and the user interface 133 (e.g., a touch screen) without any speakers or microphones.

e. Suitable Playback Device Configurations

Figure 1N:
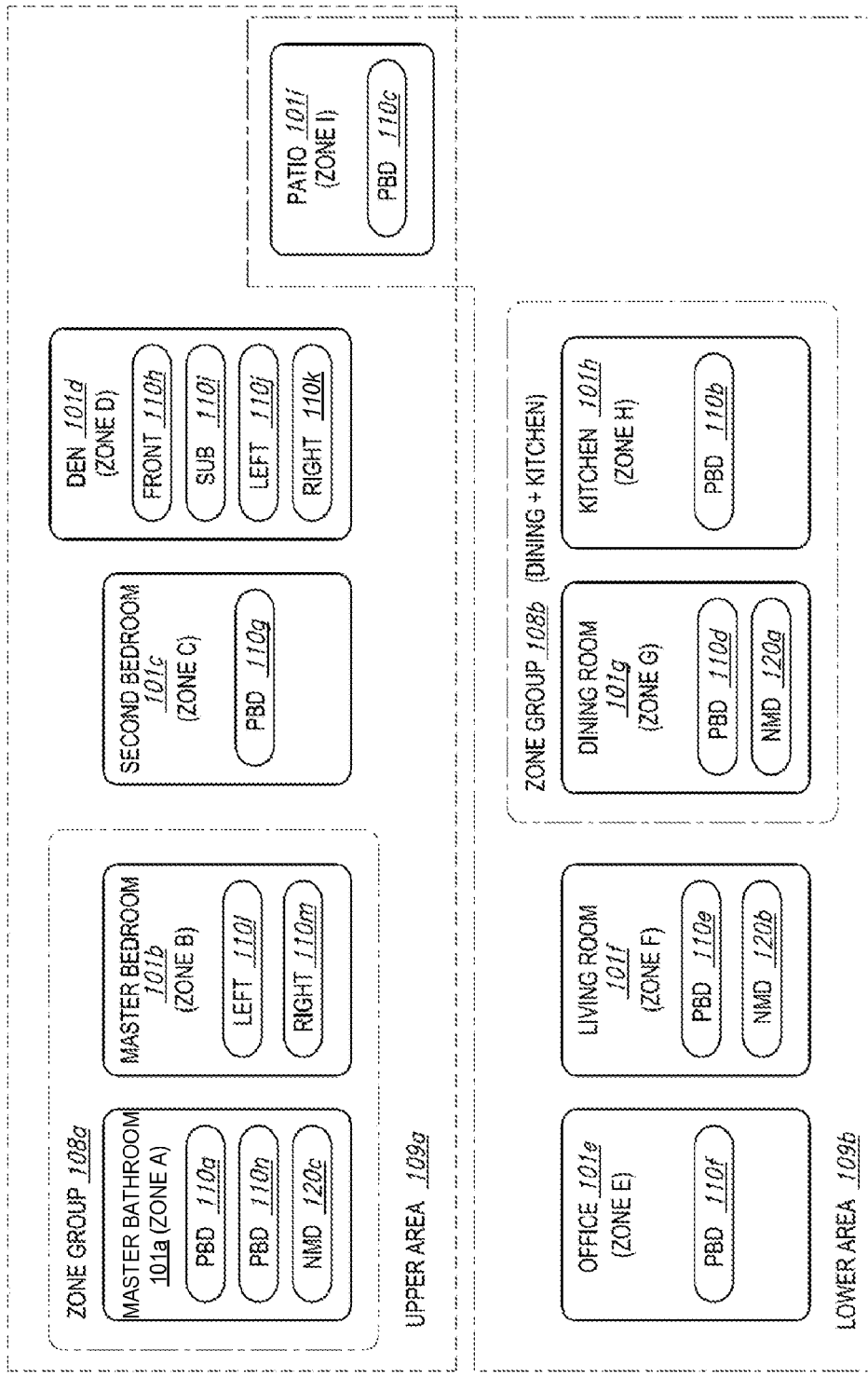
FIG. 1N is a schematic diagram of example media playback system areas.

FIGS. 1J, 1K, IL, 1M, and IN show example configurations of playback devices in zones and zone groups. Referring first to FIG. 1N, in one example, a single playback device may belong to a zone. For example, the playback device 110g in the Second Bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110m (e.g., a right playback device) to form Zone B. Bonded playback devices may have different playback responsibilities (e.g., channel responsibilities), as will be described in more detail further below. In other implementations, multiple playback devices may be merged to form a single zone. As one example, the playback device 110a can be bonded to the playback device 110n and the NMD 120c to form Zone A. As another example, the playback device 110h (e.g., a front playback device) may be merged with the playback device 110i (e.g., a subwoofer), and the playback devices 110j and 110k (e.g., left and right surround speakers, respectively) to form a single Zone D. In yet other implementations, one or more playback zones can be merged to form a zone group (which may also be referred to herein as a merged group). As one example, the playback zones Zone A and Zone B can be merged to form Zone Group 108a. As another example, the playback zones Zone G and Zone H can be merged to form Zone Group 108b. The merged playback zones Zone G and Zone H may not be specifically assigned different playback responsibilities. That is, the merged playback zones Zone G and Zone H may, aside from playing audio content in synchrony, each play audio content as they would if they were not merged and operating as independent zones.

Each zone in the MPS 100 may be represented for control as a single user interface (UI) entity. For example, Zone A may be represented as a single entity named Master Bathroom. Zone B may be represented as a single entity named Master Bedroom. Zone C may be represented as a single entity named Second Bedroom.

In some implementations, as mentioned above playback devices that are bonded may have different playback responsibilities, such as responsibilities for certain audio channels. For example, as shown in FIG. 1J, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1K, the playback device 110h named Front may be bonded with the playback device 110i named SUB. The Front device 110h can be configured to render a range of mid to high frequencies and the SUB device 110i can be configured to render low frequencies. When unbonded, however, the Front device 110h can be configured to render a full range of frequencies. As another example, FIG. 1L shows the Front and SUB devices 110h and 110i further bonded with Left and Right playback devices 110j and 110k, respectively. In some implementations, the Right and Left devices 110j and 110k can be configured to form surround or "satellite" channels of a home theater system. The bonded playback devices 110h, 110i, 110j, and 110k may form a single Zone D (FIG. 1N).

In other implementations, playback devices that are merged may not have assigned playback responsibilities and may each render the full range of audio content of which the respective playback device is capable. Nevertheless, merged devices may be represented as a single UI entity (i.e., a zone, as discussed above). For instance, the playback devices 110a and 110n in the Master Bathroom have the single UI entity of Zone A. In one embodiment, the playback devices 110a and 110n may each output the full range of audio content of which each respective playback devices 110a and 110n is capable, in synchrony.

In some embodiments, an NMD may be bonded or merged with one or more other devices so as to form a zone. As one example, the NMD 120c may be merged with the playback devices 110a and 110n to form Zone A. As another example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. Pat. No. 10,499,146.

As mentioned above, in some implementations, zones of individual, bonded, and/or merged devices may be grouped to form a zone group. For example, referring to FIG. 1N, Zone A may be grouped with Zone B to form a zone group 108a that includes the two zones, and Zone G may be grouped with Zone H to form the zone group 108b. However, other zone groupings are also possible. For example, Zone A may be grouped with one or more other Zones C-I. The Zones A-I may be grouped and ungrouped in numerous ways. For example, three, four, five, or more (e.g., all) of the Zones A-I may be grouped at any given time. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zone groups in an environment may be named by according to a name of a zone within the group or a combination of the names of the zones within a zone group. For example, Zone Group 108b can be assigned a name such as "Dining+Kitchen", as shown in FIG. 1N. In other implementations, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, identifiers associated with the Second Bedroom 101c may indicate (i) that the playback device 110g is the only playback device of the Zone C and (ii) that Zone C is not in a zone group. Identifiers associated with the Den 101d may indicate that the Den 101d is not grouped with other zones but includes bonded playback devices 110h-110k. Identifiers associated with the Dining Room 101g may indicate that the Dining Room 101g is part of the Dining+Kitchen Zone Group 108b and that devices 110d and 110b (Kitchen 101h) are grouped (FIGS. 1M, 1N). Identifiers associated with the Kitchen 101h may indicate the same or similar information by virtue of the Kitchen 101h being part of the Dining+Kitchen Zone Group 108b. Other example zone variables and identifiers are described below.

In yet another example, the MPS 100 may include variables or identifiers representing other associations of zones and zone groups, such as identifiers associated with Areas, as shown in FIG. 1N. An area may involve a cluster of zone groups and/or zones not within a zone group. For instance, FIG. 1N shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. Pat. No. 10,712,997 filed Aug. 21, 2017, issued Jul. 14, 2020, and titled "Room Association Based on Name," and U.S. Pat. No. 8,483,853, filed Sep. 11, 2007, issued Jul. 9, 2013, and titled "Controlling and manipulating groupings in a multi-zone media system." Each of these applications is incorporated herein by reference in its entirety. In some embodiments, the MPS 100 may not implement Areas, in which case the system may not store variables associated with Areas.

Figure 3:
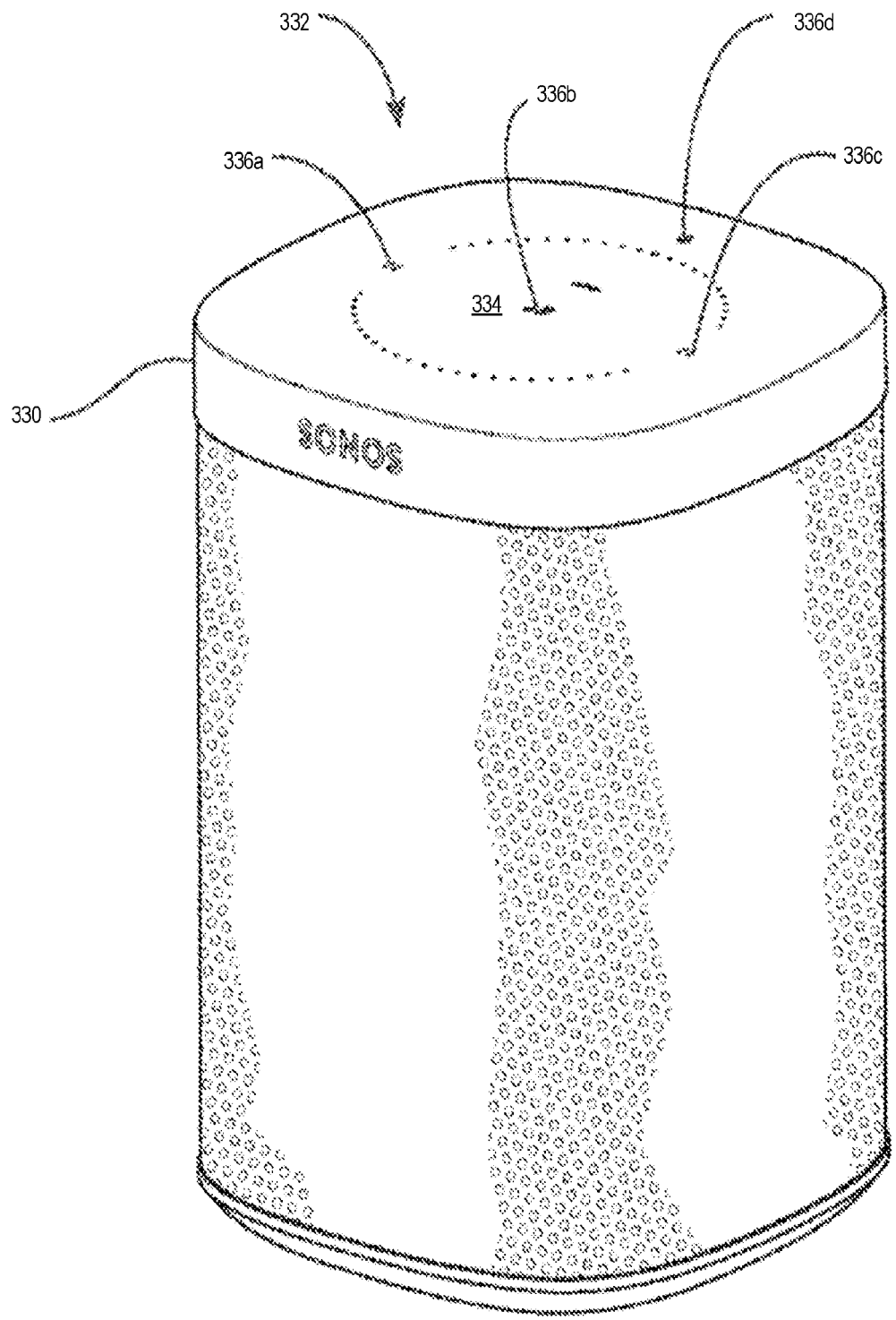
FIG. 3 is an isometric diagram of an example playback device housing.

FIG. 3 shows an example housing 330 of the playback device 110 that includes a user interface in the form of a control area 332 at a top portion 334 of the housing 330. The control area 332 includes buttons 336a, 336b, and 336c for controlling audio playback, volume level, and other functions. The control area 332 also includes a button 336d for toggling one or more microphones (not visible in FIG. 3) of the playback device 110 to either an on state or an off state. The control area 332 is at least partially surrounded by apertures formed in the top portion 334 of the housing 330 through which the microphones receive the sound in the environment of the playback device 110. The microphones may be arranged in various positions along and/or within the top portion 334 or other areas of the housing 330 so as to detect sound from one or more directions relative to the playback device 110.

f. Audio Content

Audio content may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio associated with a television program or movie received from any of a television, set-top box, Digital Video Recorder, Digital Video Disc player, streaming video service, or any other source of audio-visual media content now known or later developed; (iv) text-to-speech or other audible content from a voice assistant service (VAS), such as Amazon Alexa, Google Assistant, or other VAS services now known or later developed; (v) audio content from a doorbell or intercom system such as Nest, Ring, or other doorbells or intercom systems now known or later developed; and/or (vi) audio content from a telephone, video phone, video/teleconferencing system or other application configured to allow users to communicate with each other via audio and/or video.

In operation, a "sourcing" playback device obtains any of the aforementioned types of audio content from an audio source via an interface on the playback device, e.g., one of the sourcing playback device's network interfaces, a "line-in" analog interface, a digital audio interface, or any other interface suitable for receiving audio content in digital or analog format now known or later developed.

An audio source is any system, device, or application that generates, provides, or otherwise makes available any of the aforementioned audio content to a playback device. For example, in some embodiments, an audio source includes any one or more of a streaming media (audio, video) service, digital media server or other computing system, VAS service, television, cable set-top-box, streaming media player (e.g., AppleTV, Roku, gaming console), CD/DVD player, doorbell, intercom, telephone, tablet, or any other source of digital audio content.

A playback device that receives or otherwise obtains audio content from an audio source for playback and/or distribution to other playback devices may be referred to herein as the "sourcing" playback device, "master" playback device, a "group coordinator" playback device, or simply a "group coordinator." One function of the "sourcing" playback device is to process received audio content for playback and/or distribution to other playback devices. In some embodiments, the sourcing playback device transmits the processed audio content to all the playback devices that are configured to play the audio content. In other embodiments, the sourcing playback device transmits the processed audio content to a multicast network address, and all the other playback devices configured to play the audio content receive the audio content via that multicast address. In yet other embodiments, the sourcing playback device alternatively transmits the processed audio content to a respective unicast network address of each other playback device configured to play the audio content, and each of the other playback devices configured to play the audio content receive the audio content via its respective unicast address.

III. Example Techniques for Content Quality Enhancement

As mentioned above, conventional adaptive streaming techniques do not sufficiently address challenges presented by high-definition (HD) audio streaming in modern networks (e.g., typical household networks such as Wireless Local Area Networks (WLANs)). With increasing trends towards higher Internet connection speeds (e.g., increased availability of Fiber Internet for households with download speeds exceeding 1,000 Megabits per second (Mbps), availability of smartphones that are 5G capable with download speeds exceeding 600 Mbps), the connection quality between the streaming device and cloud servers is less frequently the only factor impacting the reliability of playback. A new (and growing) problem area involves limitations in local network bandwidth (e.g., instead of only wide area network bandwidth). In the context of a household, there is an increasing amount of traffic that passes through the local networking equipment of the household (e.g., access point(s), router(s), etc.) to accommodate the ever-increasing number of devices connected to the network (e.g., Internet-of-Things (IoT) devices, tablets, smartphones, cars for software updates, etc.).

Figure 4:
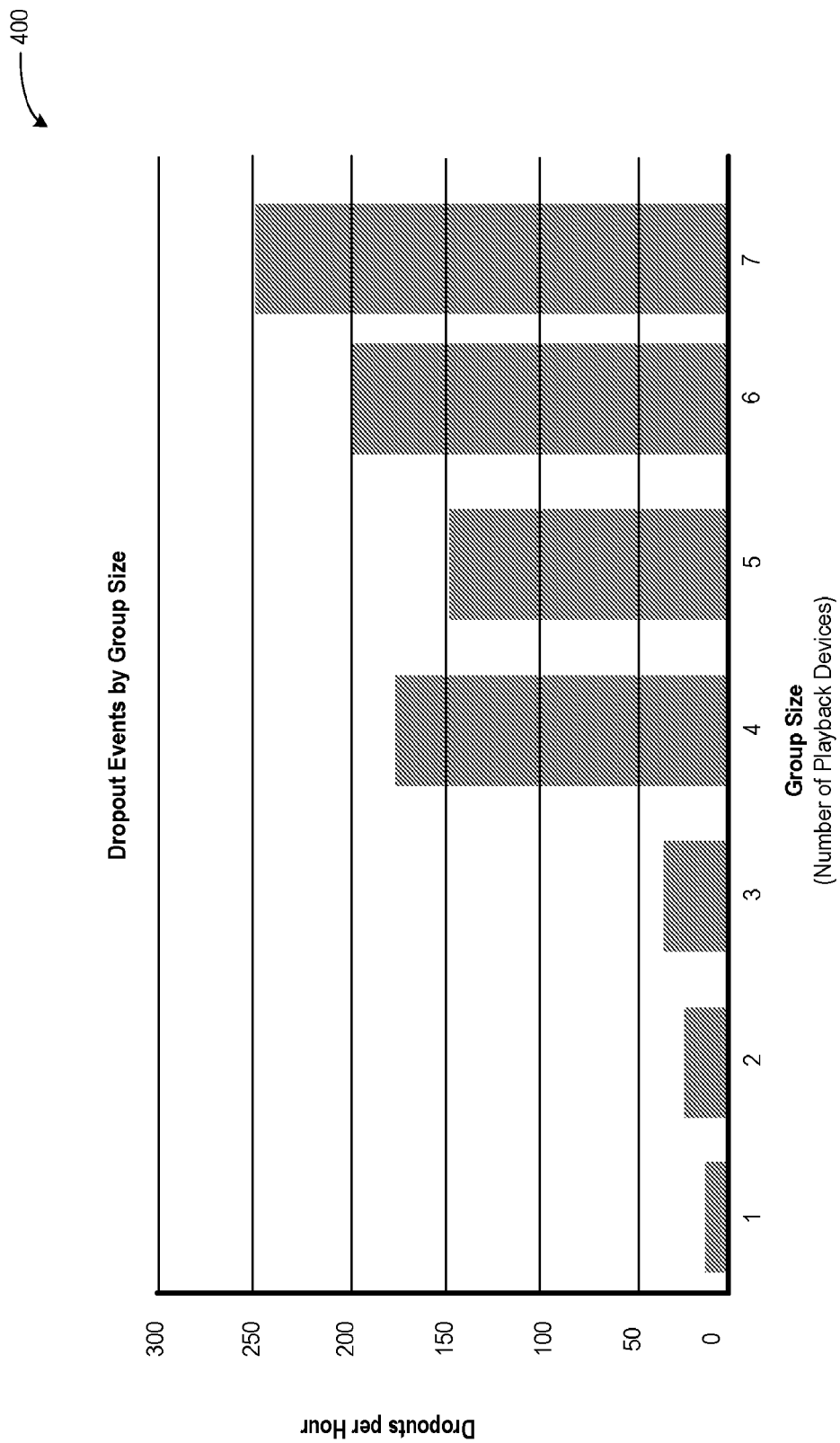
FIG. 4 is a graph showing detected dropout events for synchrony groups organized by group size.

Such bandwidth requirements are exacerbated in scenarios involving playback of higher quality audio streams (e.g., HD audio) and/or multiple playback devices that are grouped for synchronous playback within a local network. In such instances with multiple grouped players, the given audio content may need to pass through local networking equipment multiple times, as discussed above. To illustrate, FIG. 4 depicts an example graph 400 of detected dropout events for synchrony groups operating on a local network, organized by group size. As the number of playback devices in a synchrony group increases, bandwidth usage surges and local network traffic becomes more congested as audio content is transmitted through local networking equipment to each playback device of the synchrony group. Consequently, the likelihood of dropout events increases, which is undesirable. As shown in the example graph 400, the dropout rate increases significantly when the size of a synchrony group exceeds three playback devices. In particular, the dropout rate increases from ~30 dropouts per hour with a group size of three playback devices to ~180 dropouts per hour with a group size of four playback devices. The dropout rate continues to increase as the group size grows, with the frequency of dropouts being substantially higher in synchrony groups with more than three playback devices relative to synchrony groups with 1-3 playback devices.

Building upon previous innovation, SONOS, Inc. has continued to develop new technology for improving playback reliability and supporting higher quality audio content for playback. The technology disclosed herein relates to dynamic modification of the quality of an audio stream based on a variety of factors including: (1) network characteristics (e.g., local network characteristics), (2) playback device characteristics (e.g., respective capabilities of playback devices to render content), and (3) characteristics of a group of playback devices that are grouped for synchronous audio playback (e.g., number of players in the group). As a result, the quality of the audio stream may be dynamically modified based on these (and other) factors to ensure reliable playback of audio in a wide variety of operating conditions.

To provide a high-quality audio experience, it may be desirable for each playback device of a playback group to play back the highest-quality version of given audio content that is available for playback. However, because the playback devices of the playback group may have different capabilities, not every playback device in the group may be able to play back the highest-quality version. The different capabilities may be related to one or more individual device characteristics, one or more network connection characteristics, or one or more group characteristics, among other possibilities, as will be explained in more detail further below. Attempting to play back a version of audio content that exceeds a playback device's capability may result in lapses in synchronous playback, drop-outs, or other audio delays and/or network disruptions, thereby diminishing the audio experience and resulting in user frustration. In some instances, as will be explained in further detail below, a given group member's capability may fluctuate during the course of playback. In such instances, the given group member may transition from playing one version of the given audio content to another version of the given audio content in order to reduce the possibility of playback disruptions or enhance the playback experience.

As discussed above, disclosed herein are various techniques for dynamically adapting audio content for enhanced audio playback. Embodiments described herein may involve the adaptive enhancement of audio playback based on (i) one or more network characteristics of a local wireless area network over which at least two playback devices that are grouped for synchronous playback of audio content are configured to communicate, (ii) one or more device characteristics of one or more playback devices that may play back audio content, including respective playback capabilities of each playback device in a synchrony group, and/or (iii) one or more group characteristics of a playback group comprising at least two playback devices that are grouped for synchronous playback of audio content. In this regard, it will be understood that enhancing the reliability of audio content playback as discussed herein may involve playback of a lower-quality version of given audio content in some situations, in order to reduce the possibility of playback disruptions. Further, embodiments described herein may involve transcoding audio content for playback by one or more playback devices in a playback group based on one or more characteristics, including but not limited to those identified above. Additionally, embodiments described herein may involve creating sub-groups of playback devices within a playback group based on one or more characteristics, including but not limited to those identified above. Additionally yet, embodiments described herein may involve selecting a particular playback device to serve as group coordinator based on one or more characteristics, including but not limited to those identified above. Still further, embodiments described herein may involve decrypting and re-encrypting audio content based on one or more characteristics, including but not limited to those identified above.

In some implementation, a single version of audio content may be identified for playback based on the playback capabilities, and all group members may play back the same version of the audio content in synchrony. In other implementations, two or more versions of audio content may be identified based on the respective playback capabilities of the group members, and each group member playback device may play back a given version of the audio content based on that group member's respective capability. As a result, the quality of an audio stream that is selected for grouped playback may be dynamically adapted to increase the reliability of audio playback o in a wide variety of operating conditions, including conditions where one or more playback devices that are grouped for synchronous playback have different and/or fluctuating playback capabilities. Each group member playback device may then play back a given version based on the group member's respective capability. In this regard, the given version may be the highest-quality version of the given audio content that the group member is capable of playing back at a given time. In this way, each group member may play back the highest-quality version of the given audio content according to its respective capability at any given time during synchronous playback. Other implementations are also possible, as will be discussed further below.

a. Example Playback Group

In a playback group comprising at least two playback devices that are grouped for synchronous playback of audio content, at least one playback device may serve as a group coordinator, and the other playback device(s) of the group may serve as group member(s). The playback group may be part of a local media playback system wherein each of the group coordinator and group members are configured to coordinate and/or communicate over a local data network (e.g., wireless local area network) that is provided by one or more local network devices (e.g., WIFI router).

Figure 5:
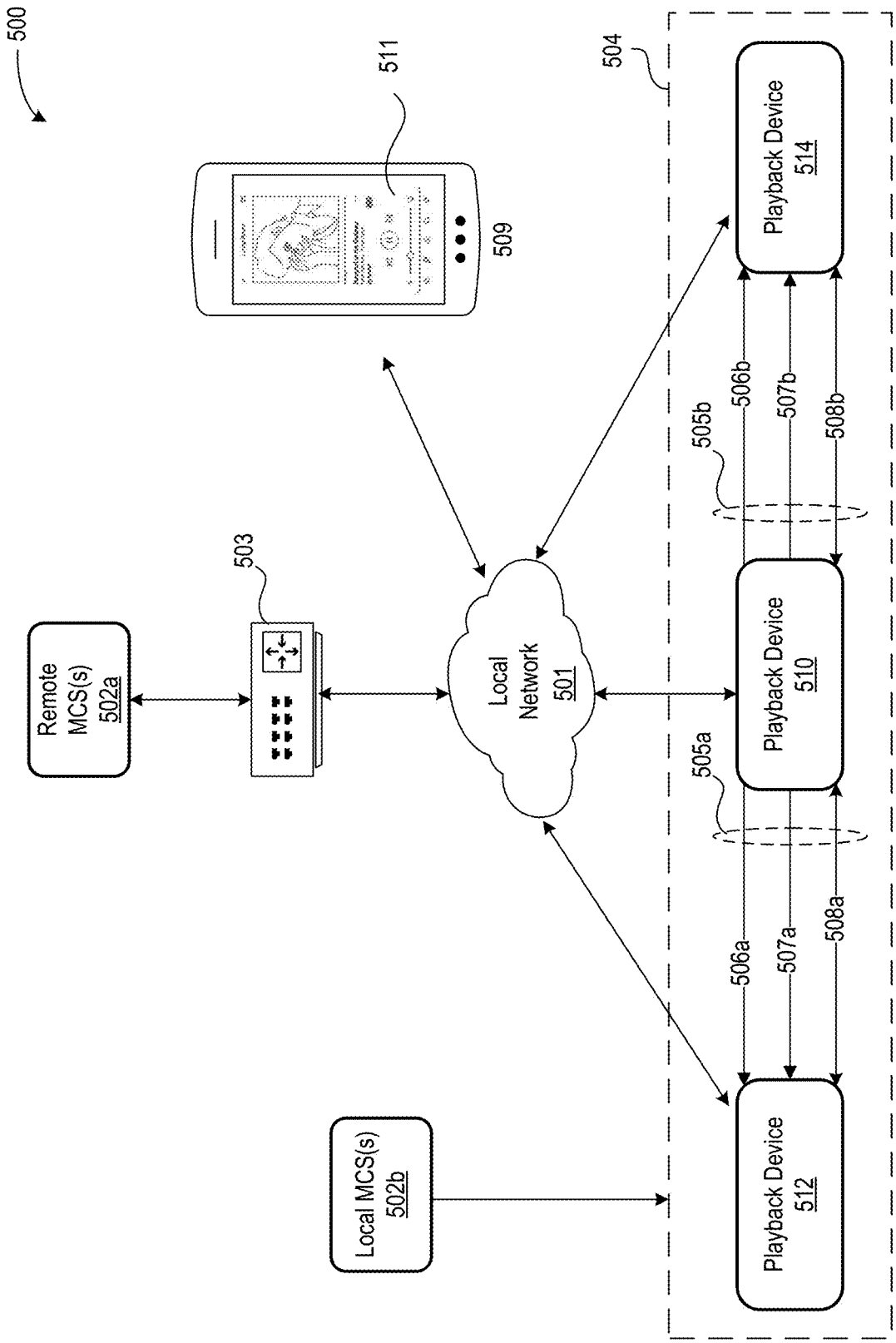
FIG. 5 is a diagram of an example synchrony group operating according to one embodiment of the disclosed technology.

FIG. 5 depicts an example configuration of a local media playback system 500, which may resemble the MPS 100 shown in FIGS. 1A-1B. In the local MPS 500 shown in FIG. 5, each of the playback devices 510, 512, and 514 may be part of a playback group 504 (also referred to herein as a "synchrony group") such that the playback devices 510, 512, and 514 are grouped for synchronous playback of audio content and configured to coordinate and/or communicate over a wireless local area network 501. The local network 501 may be provided by a local network device, such as the wireless router 503, which may resemble the router 109 of FIG. 1B. The playback device 510 may serve as group coordinator and the playback devices 512 and 514 may serve as group members. In the examples that follow, the playback device 510 will generally be referred to as a group coordinator, although it should be understood that either of the playback devices 512 or 514, or any other playback device of the MPS 500 not shown in FIG. 5, may serve as a group coordinator in other embodiments. Further, although the synchrony group of MPS 500 shows only two additional group members 512 and 514 grouped with the group coordinator 510 for synchronous playback, it should be understood that any number of playback devices may be included in the group.

As group coordinator, the playback device 510 may generally be responsible for various tasks, including but not limited to, identifying audio content for playback by the group members of the playback group, transmitting the identified audio content and playback timing information to one or more group members, monitoring device characteristics of one or more group members, monitoring network characteristics associated with the network device and one or more group members, monitoring group characteristics, dynamically modifying audio content for playback based on a change in one or more characteristics, collecting and/or storing characteristics throughout the course of a grouped playback session, and providing the collected and/or stored characteristics to a remote computing device configured to receive characteristics data from a plurality of playback devices from a plurality of media playback systems. Various actions of and interactions between devices of the MPS 500 will be described in more detail below.

b. Identifying Audio Content

Audio content that is identified for playback may generally take the form of a music track, spoken word content (e.g., a podcast, social audio stream, sports broadcast, etc.), generative audio and/or audio content that accompanies video content, among other possibilities. A playback device may generally have access to numerous media content sources, such as audio and video streaming services, content libraries, and local device storage, among other examples. Many of the sources available to the playback device may provide multiple versions of the same audio content, such as multiple versions of a particular song by a particular artist, or multiple versions of an audio track that accompanies video content, such as a movie. The audio characteristics of different versions of given audio content may differ, including a bit rate, a sample rate, a bit depth, and/or a number of output channels, etc. For example, a first version of the given audio content may have a first bit depth, sample rate, and/or number of audio output channels, whereas a second version of the given audio content may have a second bit depth, sample rate, and/or number of audio output channels.

In general, the value of one or more such audio characteristics may indicate the level of quality of given audio content. For example, audio characteristics comprising a bit rate of 3,000 kilobits per second (kbps), a sample rate between 96 kHz and 352.8 kHz, and a bit depth of 24 bits may generally indicate relatively higher-quality audio content. Audio characteristics comprising a bit rate ranging between 1,000 kbps and 320 kbps or 160 kbps, a sample rate between 44.1 kHz, and a bit depth of 16 bits may generally indicate relatively medium or lower-quality audio content. As one example, the playback device may identify a first version that comprises a high-quality version of the audio content and a second version that comprises a medium-quality version of the audio content. As another example, the playback device may identify a first version that comprises a medium-quality version of the audio content and a second version that comprises a lower-quality version of the audio content. As yet another example, the playback device may identify two medium-quality versions wherein a first medium-quality version is a higher-quality than the second medium-quality version. Other examples are also possible.

The multiple versions of the audio content may be available from a single media content source or from more than one media content sources. For example, a first version of audio content may be available from a first media content source, and a second version of the audio content may be available from the first media content source or a second media content source. Further, a third version of the audio content may be available from one or both of the first or second sources or from a third media content source.

As previously described, as group coordinator, the playback device 510 may be responsible for identifying audio content for playback by the playback group 504. In practice, the process of identifying audio content for playback may be triggered by detecting (via one or more microphones of the playback device 510 of the MPS 500) or by receiving (via a controller device of the MPS 500 that is configured to communicate with the playback device 510) a command to play back audio content in synchrony with the other group members (e.g., playback devices 512 and 514) of the playback group 504. Based on detecting or receiving the command to play back the audio content, the playback device 510, as group coordinator, may identify one or more versions of the audio content.

For example, the group playback device 510 may identify a first version and a second version of the audio content as described above. The first and second versions of the audio content identified by the playback device 510 may each take the form of audio content that may be played back by the playback device 510 and/or one or more group member playback devices of the playback group. The playback device 510 may receive the first and second versions of the audio content from one or more media content sources, which may be any source of media content now known or later developed that may provide content to the playback device 510, including a cloud-based source, a local device of the media playback system, or a control device of the media playback system (e.g., one of the control devices 130 of FIG. 1A). As one example, the media content sources may comprise remote MCS(es) 502*a*, which may be an Internet-based streaming source that provides media including audio content via the Internet, examples of which may include service providers like Sonos HD Radio, Spotify, Apple Music, or YouTube Music. As another example, the media content sources may comprise local MCS(es) 502*b*, which may be a network-connected source that provides audio content directly to one or more playback devices of the playback group 504. For instance, the MCS(es) 502*b* may be a line-in/line-out content source, such as a television, media player, or other computing device of the media playback system that has a wired connection to one or more playback devices of the playback group 504 and is configured to provide audio content via the wired connection. Other examples are also possible.

The first and second versions of the audio content identified by the playback device 510 may take various forms. As one example, each of the first and second versions of the audio content may take the form of a music track. As another example, each of the first and second versions of the audio content may take the form of an audiobook. As yet another example, each of the first and second versions of the audio content may take the form of a podcast. Still further, each of the first and second versions of the audio content may take the form of audio content that accompanies video content. For instance, although not shown, the media playback system 500 may be integrated with a home theater system (similar to the home theater configuration discussed above with respect to FIG. 1L), and each of the first and second versions of audio content identified by the group coordinator may be a version of an audio track corresponding to a movie, television show, music video, or other video content that is playing on a television within the media playback system 500. Similarly, a control device, such as the control device 130*a*, may include a display capable of playing back video content in synchrony with the audio content being played back by the synchrony group of the media playback system 500. In such cases, the first and second versions of the audio content may be received from the same source that originates the video content (e.g., a locally-connected device, such as a cable box, a satellite tuner, a DVD player, a Blu-ray player, a game console, or an internet-based video streaming service that also transmits audio corresponding to the video stream, etc.). Numerous other possibilities exist.

The playback device 510 may identify the first and second versions of the audio content in various ways. As one possibility, the playback device 510 may receive a Uniform Resource Identifier (URI), a Uniform Resource Locator (URL), or some other pointer to the first and/or second versions of the audio content as part of a command to play back the audio content from a given source. As another possibility, the first and/or the second version of the audio content may be "pushed" (e.g., transmitted) to the playback device 510 by a computing device configured to communicate with the MPS 500, and the playback device 510 may identify the first and/or second version of the audio content based on metadata that is received in addition to the transmitted audio content. In some implementations where metadata identifying the first and/or second version of the audio content is not available, the playback device 510 may sample the first and/or second version of the audio content and identify it using an audio recognition algorithm to determine if it is in fact a version of the audio content that is to be played back.

In general, the playback device 510, as group coordinator, may prioritize quality when identifying different versions of the audio content. Thus, the group coordinator may generally attempt to identify the highest-available quality version of the audio content that is available. For example, if an MCS such as a media streaming service provides more than one version of the audio content including a higher-quality version and a lower-quality version, the group coordinator may identify the higher-quality version as the first version and the lower-quality version as the second version.

c. Evaluating Characteristics

The playback device 510, as group coordinator, may determine which version of audio content should be played back by each group member, including itself. To make this determination, the playback device 510 may identify one or more characteristics that may affect audio playback, such as network characteristics, group member playback device characteristics, and/or playback group characteristics. This identification may take place before and/or after the identifying first and second version of the audio content, and may be used to inform the determination made by the playback device 510 regarding which group members should play back which version of the audio content.

One type of characteristic that can be identified by the group coordinator may be a network characteristic. The playback device 510 may identify one or more network characteristics of each playback device in the synchrony group, including the playback device 510 itself. In general, a network characteristic may be a characteristic that is associated with one or more of the group coordinator, the other group members, or a network device (e.g., the WIFI router 503) with which the group members are configured to communicate over a local area network (e.g., WLAN 501). For example, a network characteristic may be a quality of a connection between a given group member (including the group coordinator) and the network device.

The quality of a connection between a playback device and a network device may be identified in various ways. As one possibility, the quality of the connection between the playback device and the network device may be identified based on an evaluation of the consumption of bandwidth by the playback device. As another possibility, the quality of the connection between the playback device and the network device may be identified based on an evaluation of the current latency associated with the connection between the playback device and the network device. In some implementations, a group coordinator may send out one or more test packets to each group member in order to identify a respective quality for each group member's respective connection with the network device. Connection quality may be impacted by various factors, including, for example, a given playback device's playback capability, or the total number of playback devices grouped for synchronous playback. Such factors will be discussed in more detail further below.

In some implementations, the group coordinator may monitor the network characteristics at various intervals (e.g., at regular intervals or sporadically) during grouped playback of the audio content. For example, the group coordinator may send a notification (e.g., a command or a request) to each group member to return an indication of each group member's respective connection quality. In other implementations, each group member may independently transmit an indication of its respective connection quality to the group coordinator. The group members may send the indications based on detecting or otherwise receiving a command to play back audio content in synchrony with the group coordinator. Additionally, or alternatively, the group members may send the indications based on detecting that they have been grouped for synchronous playback. Further, the group members may additionally or alternatively send the indications periodically throughout grouped playback. Still further, one or more group members may additionally or alternatively send an indication upon detecting a change in an audio characteristic. Other examples are also possible.

In the ways described above, the connection qualities of the group members may be monitored throughout the course of synchronous group playback. The group coordinator may utilize information about one or more network connection qualities at any given time to determine an appropriate version of audio content that is to be played back by a given member of the playback group.

Another type of characteristic that may affect audio playback that can be identified by the group coordinator is a playback device characteristic. The group coordinator may identify one or more device characteristics of each group member. The group coordinator may perform an evaluation of device characteristics at various times, including before, after, or in conjunction with the evaluation of network characteristics as previously described. In some instances, the identification of the one or more network characteristics may include or may be based on an evaluation of the one or more playback device characteristics, as playback device characteristics may impact one or more network characteristics.

A playback device characteristic may take various forms. As one possibility, a playback device characteristic may comprise information about a playback device's playback capability to reproduce and/or play back audio content. The playback capability information of group members may collectively be used to determine one or more versions of audio content that is to be played back by the playback group. Playback capability information of a playback device may take various forms.

In one aspect, playback capability information may indicate information about bit rate, sample rate, and/or bit depth that a playback device is capable of playing back. For instance, the playback capability information of a given playback device may indicate that the given playback device is capable of streaming and/or playing back audio content at a given maximum bit rate, a given maximum sample rate, and/or a given maximum bit depth. In another aspect, playback capability information may indicate information about one or more audio file formats that a playback device is capable of supporting. In this regard, some audio file formats and/or codecs utilize compression that results in data loss and degradation of the audio content, and generally correspond to relatively lower-quality audio content. On the other hand, other file formats (e.g., Dolby Atmos) and/or codecs (e.g., Dolby Digital Plus, Free Lossless Audio Codec (FLAC), Apple Lossless Audio Code (ALAC), etc.) result in less data loss, utilize lossless compression, or are uncompressed, and generally correspond to relatively higher-quality audio content. The playback capability information of a playback device may indicate that the playback device is capable of supporting a given maximum number of audio channels and/or a given set of audio file formats. For example, if a given playback device is capable of handling a higher-quality codec, then a first version of given audio content, which may be encoded according to the higher-quality codec, may be identified for playback by the given playback device. On the other hand, if the given playback device is not capable of handling the higher-quality codec, then a second version of the given audio content, which may be encoded according to a lower-quality codec, may be identified for playback.

In some instances, where the version of audio content obtained by the group coordinator is not suitable for one or more group members (e.g., a suitable version was not available for retrieval), the group coordinator may transcode one or more additional versions of audio content based on the respective playback capabilities of one or more group members, as will be described in more detail further below.

In yet another aspect, playback capability information may indicate a playback device's computing capability, which may include, for example, an indication of the playback device's processing power, an indication of the playback device's power specifications (e.g., if the playback device is battery-operated or not battery-operated), and/or an indication of the playback device's charging specifications (e.g., the playback device's current charge level, the playback device's charging capacity, etc.).

Still, in another aspect, playback capability information may indicate whether a playback device is capable of handling encrypted audio content. As previously mentioned, it is generally desirable for playback devices to provide high quality versions of audio content requested for playback. To meet this widespread demand for high quality media content, HD and UHD audio content has become increasingly available from streaming media providers. However, because such HD and UHD audio content possesses audio quality that is often superior to the quality of the audio content available in other forms of media (e.g., CD-ROM), such audio content is often targeted for media piracy, which has led to demands from digital music rights holders for increased security measures to protect against piracy attempts. In response, many media content streaming services that provide high quality (e.g., HD, UHD, etc.) media content have begun to implement Digital Rights Management (DRM) protection mechanisms (e.g., Widevine encryption technology, etc.) to encrypt the audio content provided by the media content services. Thereafter, when audio content is requested from the media content services by a playback device, the audio content is transmitted (e.g., via Dynamic Adaptive Streaming over HTTP (DASH), etc.) in encrypted form to the requesting playback device. The playback device can then decrypt the audio content using decryption information (e.g., key(s), certificate(s), etc.) that is obtained from a license server to play back the decrypted audio content. Utilizing these types of encryption schemes for providing audio content typically requires the requesting playback device to meet certain criteria, such as being able to provide a secure boot environment, and/or having a certain level of computing resources. Therefore, information about whether a playback device is capable of handling (e.g., decrypting) encrypted audio content may be used to facilitate identification of an appropriate version of given audio content that the playback device is capable of playing back. For example, if a given playback device is capable of decrypting encrypted audio content, then a DRM-encrypted version of the given audio content, which may generally correspond to higher-quality audio content, may be identified for playback by the given playback device. On the other hand, if the given playback device is not capable of decrypting encrypted audio content, then an unencrypted version of the given audio content, which may correspond to relatively lower-quality audio content, may be identified for playback. Techniques for decrypting and re-encrypting audio content are described in more detail in U.S. application Ser. No. 17/741,083 filed May 10, 2022 and titled "Audio Encryption in a Media Playback System," which is hereby incorporated by reference in its entirety.

Playback capability information may include other types of information as well.

The manner in which a group coordinator may determine playback capability information for each of a playback group's group members may take various forms.

As one possibility, the group coordinator may determine each group member's respective playback capability by sending a message (e.g., a command or a request) to each group member to return an indication of its respective playback capability. In turn, each group member may transmit to the group coordinator an indication of its playback capability, which may include one or more of the aspects mentioned above, such as the group member's decryption capability, the group member's decoding capability, the group member's processing power, and/or the group member's charging capacity, among other information about the device's playback capability.

As another possibility, each group member may transmit an indication of its respective playback capability to the group coordinator without being prompted by the group coordinator to do so. The group member may transmit an indication of its respective playback capability at various times. As one example, the group member may transmit the indication at the time of joining a playback group comprising the group coordinator (e.g., in response to receiving a command from a network device—such as a control device (e.g., user device) or the group coordinator—to begin playing back audio content in synchrony with the group coordinator). As another example, the group member may transmit an indication of its respective playback capability periodically throughout the time that it is grouped for synchronous playback with the group coordinator. In this regard, the group member may transmit an initial indication of its playback capability at the time of joining the playback group and thereafter periodically transmit one or more additional indications that indicate the group member's playback capability as of the time each of the one or more additional indications is transmitted. The times at which the group member may periodically transmit indications of its playback capability may include, as some non-limiting examples, a predetermined interval of time (e.g., every 2 minutes, every 5 minutes, etc.), or at each time an audio content boundary is detected (e.g., at or near the end of each audio track, etc.). As yet another example, the group member may transmit an indication when it detects a change in its respective playback capability. For instance, the group member may detect that it is experiencing reduced network connectivity and/or reduced battery power and may transmit an indication of its updated playback capability to the group coordinator. Thereafter, if the group member's network connectivity and/or battery power improves, it may transmit an indication of its updated playback capability to the group coordinator.

In this way, the playback capabilities of the group members may be monitored throughout the course of synchronous group playback to adapt for any fluctuations in playback capabilities. The group coordinator may then utilize updated information about one or more group member's playback capability to determine if playback by any group members should transition to a different version of the audio content, as will be discussed in more detail further below.

As yet another possibility, the group coordinator may determine a group member's respective playback capability by retrieving information about the group member from one or more other devices. As one example, the one or more other devices may be a network device that is communicatively coupled with the local media playback system and configured to receive and store information about each playback device of the local media playback system, including information about each playback device's respective playback capability. The network device may be, for example, a remote computing device (e.g., one of the computing devices 106c shown in FIG. 1B) that is configured to collect playback device information for the playback devices of a plurality of media playback systems, one of which may be the local media playback system 500 comprising the group coordinator 510 and the group members 512 and 514. The remote computing device may collect playback device information for each of the group members 512 and 514 in various ways. As one example, the remote computing device may collect playback device information at the time each group member is initially set up and configured for playback. As another example, the remote computing device may collect playback device information from each playback device periodically at certain intervals (e.g., once a day, each time the playback device receives a command to play back audio content, each time the playback device changes group configuration, etc.). The group coordinator may retrieve information about a group member's respective playback capability by querying the remote computing device. In response, the remote computing device may provide information about the group member's playback capability based on playback device information stored by the remote computing device (e.g., information previously collected from the group member) or otherwise accessible by the remote computing device (e.g., based on requesting information from the group member), as described above. In instances where the remote computing device has available information collected about the group member, the remote computing device may provide the group coordinator with the most recent playback capability information for the group member. In some instances, it is possible that the remote computing device does not have recent (or any) information about the group member. In such instances, the remote computing device may first request current playback capability information from the group member and then provide that playback capability information to the group coordinator. Alternatively, the remote computing device may notify the group coordinator that it is unable to provide playback capability information for the group member, in which case the group coordinator may query the group member directly. It should be understood that the network device may take various other forms as well, including, as some non-limiting examples, a control device or another playback device within the local media playback system 500. In some examples, for instance, a network device within the local network 501 such as the router 503 may provide information regarding the playback capability of one or more of the playback devices in the playback group 504.

As another example, the group coordinator may determine a group member's respective playback capability by retrieving information about the group member from a remote computing device that is associated with the media content service(s) 502a (which may resemble one of the computing devices 106b shown in FIG. 1B). The remote computing device may have access to general playback capability information for various categories of playback devices across different media playback systems and may use this information to determine the capability of individual group members with respect to the types of media content that are available from MCS(s) 502*a*. Playback devices may be categorized by the remote computing device in various ways, such as by make/model information, operating system information, and/or serial number, among other possibilities. Accordingly, the remote computing device may, based on identifying information about each group member (e.g., model and serial number, etc.) that is provided by the group coordinator, determine a respective playback capability for each group member and send an indication of the determined respective playback capabilities to the group coordinator. Other examples are also possible.

In addition to the above, the group coordinator may store information about its own playback capability. Thus, if the group coordinator receives a command to join a playback group or form a new playback group with one or more other playback devices for synchronous group playback, it may provide an indication of its own playback capability to another device (e.g., another playback device that will act as group coordinator, a remote computing device, etc.), and/or determine the respectively playback capability of each other playback device as described above.

As another possibility, a playback device characteristic may comprise device information about the playback device, which may include a serial number that indicates manufacturing and other hardware-based information about the playback device, a model type, a date of production, and/or software-based information that may have been updated at some point, such as a software and/or firmware version, among other possibilities. Such device information of a playback device may correspond with or indicate the playback device's playback capability. For example, such device information may indicate a quality level of audio content that the playback device can handle. As another example, such device information may indicate that the playback device is a newer model device with more sophisticated hardware and software that is capable of handling relatively higher quality audio content (e.g., UHD content) and/or a wider range of audio formats, or that the playback device is an older model device with less sophisticated hardware and software that is only capable of handling relatively lower quality audio content (e.g., HD content). Based on this evaluation, the playback device 510 may determine an appropriate version of audio content to be played back by a given playback device of the playback group.

The group coordinator may evaluate playback device characteristics at various times. In some implementations, the playback device 510, as group coordinator, may evaluate playback device characteristics of one or more group members at the time the playback group is formed. For example, the playback device 510 may be selected by a user for grouped playback with one or more other group members via a user interface (similar to the user interface 133 of FIG. 1H) that is displayed by a controller device (similar to the controller device 130*a* of FIGS. 1A and 1H) of the MPS 500. The playback device 510 may then identify at least one device characteristic for each other group member. Based on the identification, the playback device 510 may determine that two more of the other group members have different device characteristics. For instance, as one example, a first other group member, such as the playback device 512, may be an older model device with a less sophisticated playback capability than a second other group member, such as the playback device 514. As another example, one group member, such as the playback device 512, may be a portable, battery-powered playback device and may thus have a less stable network connection and/or reduced power capacity than a second other group member, such as the playback device 514, which may be a stationary playback device. For instance, as the portable playback device 512 is moved in relation to the router 503, its connection to the local network 501 may be affected, and the playback device 512 may be unable to reliably play back high-quality audio content in synchrony with the playback group and/or may experience reduced bandwidth that may adversely impact network performance. Other examples are also possible.

In such instances, the playback device 510 may cause the controller device 130*a* to display a notification informing the user that the desired synchrony group comprises playback devices having different playback capabilities, and as a result, the user may experience a lower-quality listening experience. In some implementations, the controller device 130*a* may independently display the notification without being prompted by the playback device 510. For example, the controller device 130*a* may have access to configuration information, playback device characteristics, or other data regarding each of the group members 510, 512, and 514. Upon determining that playback devices with differing capabilities have been selected for grouped playback, the controller device 130*a* may display the notification as described above. Implementations for displaying information about content quality during playback will be discussed further below.

Yet another type of characteristic that may affect audio playback that can be identified by the group coordinator is a playback group characteristic. The playback device 510, as group coordinator, may identify one or more characteristics of the playback group. The playback device 510 may perform such an evaluation of playback group characteristics in conjunction with the evaluation of network characteristics and/or device characteristics as described above. In some instances, the evaluation of the one or more network characteristics may include an evaluation of group characteristics, as group characteristics may impact one or more network characteristics.

Playback group characteristics may take various forms. As one possibility, a playback group characteristic may comprise a total number of playback devices that are grouped for synchronous playback. The number of playback devices that are grouped for synchronous playback may impact the overall bandwidth, latency, congestion, and/or other performance metrics of the local network, thus affecting the quality of the connection between one or more of the playback devices grouped for synchronous playback (e.g., playback devices 510, 512, 514) and the local network device (e.g., WIFI router 503) and also impacting overall network performance. In particular, the number of playback devices that are grouped for synchronous playback may be inversely correlated with network performance quality due to consumption of available bandwidth and increased network traffic.

For example, as the number of devices that are grouped for synchronous playback of streamed audio at a given time increases, the local network may become more congested, as the increasing number of devices will consume additional bandwidth, which may result in reduced network performance. For instance, one or more data packets (e.g., one or more packets of audio content that is to be played back by a given playback device) may fail to reach its destination (e.g., the destination playback device that is to play the one or more data packets) in a timely manner. As a result, the destination playback device may experience a dropout event and be unable to reliably play back audio content in synchrony with the playback group, resulting in a diminished user experience. Transmission of high-quality audio content (i.e., audio content requiring greater bandwidth) over the local network may further swell the strain on the network bandwidth.

Therefore, the group coordinator playback device may evaluate the number of total devices currently grouped for synchronous playback in order to determine if a threshold number of devices has been exceeded. The threshold number may correspond to a number of devices that can reliably transmit and/or stream high-quality audio content without adversely impacting the network bandwidth, network latency, and/or network throughout. The threshold number may be determined in various ways.

As one example, the threshold number may be a predefined number that may have been determined based on an analysis of historical playback data associated with one or more group members of the playback group and/or the network device, and the status of one or more network characteristics associated with the one or more group members and/or the network device during the course of previous audio playback sessions. The historical playback data may have been provided by the group coordinator or another group member to a remote computing device (e.g., a cloud-based computing device 106c as shown in FIG. 1B) associated with the media playback system. For example, the playback device 510, as group coordinator, may routinely provide data regarding network characteristics during grouped playback to the remote computing device. The remote computing device may then determine, based on the historical playback data and network characteristics of the network device and/or the local network, a maximum number of playback devices that may stream high-quality audio content without experiencing a significantly increased risk of reduced network performance. For example, the remote computing device may determine that up to three playback devices may be grouped for synchronous playback of high-quality audio content without experiencing a significant risk of adverse impact on network performance, such as reduced bandwidth, increased latency, and/or decreased throughput. In such an example, the threshold number may be defined as three, indicating that if the playback group 504 comprises more than three group members at any given time, the playback group 504 may run a relatively high risk of being unable to reliably play back the high-quality audio content. The remote computing device may provide the determined threshold number to one or more playback devices of the media playback system 500, such as the group coordinator playback device 510, which may store the threshold number in its local memory.

Thereafter, if the group coordinator detects that the total number of group members of the playback group exceeds the threshold number (e.g., if a fourth group member joins the synchrony group), the group coordinator may determine that a different version of audio content is to be played back in order to increase the likelihood of consistent, reliable playback. For instance, upon detecting that a fourth playback device has joined the synchrony group 504, thereby exceeding the threshold number for reliable playback, the playback device 510 may determine that each group member of the synchrony group 504 (e.g., the playback devices 510, 512, 514, and the fourth playback device) is to play back a lower-quality version of the audio content (e.g., lower bit rate, lower bit depth, etc.), regardless of the group member's respective capability to play back high-quality audio content or the current network characteristics. In this regard, if any of the previously identified versions of audio content comprise too high of a quality based on the number of group members, the playback device 510 may identify an alternate version of audio content that may be a lower-quality version than the previously identified version(s) for playback by the synchrony group.

As another possibility, a playback group characteristic may take the form of information about a grouping configuration of playback devices that are grouped for synchronous playback. For instance, as described above with respect to FIGS. 1J-1M, playback devices may be configured in various ways for synchronous playback (e.g., stereo pair, home theater/surround sound, etc.), and different configurations may correspond to different playback responsibilities and/or playback capabilities of one or more group members. For example, a first multi-channel version of the audio content (e.g., 2.0) may be appropriate for a stereo pair configuration (shown in FIG. 1J) and a second multi-channel version of the audio content (e.g., 5.1, 6.1, 7.2, etc.) may be appropriate for a surround sound configuration (shown in FIGS. 1K, 1L). Therefore, the group coordinator may identify different versions of audio content based on playback group characteristic(s) that includes group configuration information.

In some instances, one or more computing devices of the media playback system (e.g., one or more playback devices, one or more control devices, one or more network devices, one or more remote computing device such as a cloud server, etc.) may apply predictive analytics to collected playback performance data in order to determine a "best" recommended quality level of audio content for playback. The predictive analytics may take various forms. As one possibility, the predictive analytics may utilize a machine learning model that is trained using one or more machine learning techniques, including but not limited to: decision trees, neural networks (e.g., artificial neural networks, convolutional neural networks, recurrent neural networks, fully connected neural networks, partially connected neural networks, etc.), regression models, classification models, and/or clustering, among other possibilities.

The collected playback performance data may be historical data that is collected in various ways. As one possibility, the collected playback performance data may be collected by one or more devices of the media playback system, such as a playback device (e.g., a group coordinator playback device), a control device, or a remote computing device configured to communicate with the media playback system, as previously explained with reference to evaluating characteristics that may affect playback. The collected playback performance data may be collected in other ways as well. In some instances, the device that is configured to collect the playback performance data may be the same device that is configured to build and/or train the machine learning model. In other instances, the functions of building, training, and/or executing the machine learning model may be carried out by more than one device. The collected playback performance data may include, as some examples, playback data (e.g., data about content that was played back, etc.), network performance data (e.g., data about network characteristics, etc.), playback device data (data about playback devices and respective playback performances, etc.), playback group data (e.g., data about playback group size, etc.), or media playback system data (e.g., data about the media playback system, etc.).

In general, the machine learning model may function to (i) receive, as input, one or more characteristics described herein that may affect playback, which may include: a network characteristic (e.g., a network connection quality, a network latency, a network bandwidth, etc.), a playback device characteristic (e.g., playback capability information, device information, etc.), a playback group characteristic (e.g., information about playback group size, information about playback group configuration, etc.), among other possibilities, and (ii) output a recommended quality level for audio content that is to be played back. The output may be a highest-quality level of audio content that may be reliably played back.

In some instances, the predictive analytics that are utilized may be tailored for a specific set of devices in a particular operating environment that may be associated with a specific user, household, and/or business. For example, a set of collected playback performance data may indicate that occurrence of an audio dropout event significantly increases when high-quality audio content is selected for synchronous playback by three or more playback devices within a particular household. In such an example, the predictive analytics may utilize a machine learning model that is trained to output (based on input that includes, for example, playback group size and perhaps also network characteristics for the particular household) a recommendation that medium-quality audio content is most suitable for reliable synchronous playback by three or more playback devices in that particular household.

d. Threshold Criteria

After identifying one or more network characteristics, group member playback device characteristics, and/or playback group characteristics as described above, the playback device 510, as group coordinator, may determine if the identified characteristic(s) meets at least one criteria in a set of threshold criteria. The set of threshold criteria may comprise at least one threshold criteria for various characteristics, including each of the characteristics described above. Each threshold criteria may represent a minimum value of the respective criteria that may be required to reliably play back audio content and minimize interruptions to network performance during streaming and/or transmission of a certain-level quality of audio content (e.g., high-quality audio content).

For example, the playback device 510 may have identified, in its evaluation of network characteristics as described above, respective connection qualities between (i) the router 503 and the playback device 510, (ii) the router 503 and a first other group member playback device, such as the playback device 512, and (iii) the router 503 and a second other group member playback device, such as the playback device 514. The playback device 510 may then determine if each respective connection quality meets at least one criteria in the set of threshold criteria.

The set of threshold criteria may include a connection quality threshold criteria that corresponds to a minimum level of quality that a connection between a playback device and a network device must meet in order for the playback device to be able to reliably play back and/or stream audio content over the connection without adversely impacting network performance. The connection quality threshold criteria may comprise one or more of a bandwidth threshold, a latency threshold, a throughput threshold, and/or a wireless signal strength threshold, among other examples. In this regard, the connection quality threshold criteria may be a set of predetermined criteria to which each playback device has access. As one example, the criteria may be based on standard values for streaming average quality audio content in a way that maintains stable network performance. As another example, the criteria may be based on an initial bandwidth and/or latency test performed by the playback device or another group member. As yet another example, the threshold criteria may be based on playback history data of the media playback system. As further yet another example, some aspects of the threshold criteria may be based on a playback device's respective connection quality with the local network device.

The set of threshold criteria may include other characteristics as well. As one possibility, the set of threshold criteria may include playback device characteristics. For instance, such threshold criteria may include a threshold model or a threshold year of manufacture. Such threshold criteria may relate to a playback device's playback capability for grouped playback. As one example, certain older models of a playback device may not be capable of streaming high-quality audio content. As another example, certain older models of a playback device may not have the requisite componentry or capabilities for wireless streaming of audio content and/or playing back audio content in synchrony with a playback group. The threshold device characteristics criteria may help ensure that each group member playback device has the minimum requirements for participating in synchronous playback so as to provide (and maintain) a seamless and relatively-high fidelity playback experience.

As another possibility, the set of threshold criteria may include playback group characteristics. For instance, such threshold criteria may include a threshold number of group members that can stream high-quality audio content without impacting network performance, as described above.

Based on determining whether the identified characteristic(s) meet at least one threshold criteria, the group coordinator may determine which one of the previously-identified versions of audio content should be played back by each group member. For example, the playback device 510 may determine that its own network connection quality meets the threshold network connection quality criteria. Further, the playback device 510 may determine that a first network connection quality of the playback device 512 meets the threshold network connection quality criteria. Further yet, the playback device 510 may determine that a second network connection quality of playback device 514 does not meet the threshold network connection quality criteria.

For each group member whose respective identified characteristic(s) meet at least a threshold criteria, the group coordinator may cause the group member to play back a first version of audio content. For instance, based on determining that the network connection quality of each of the playback device 510 and the playback device 512 meets the threshold network connection quality criteria, the playback device 510 may (i) play back the first version of the audio content and (ii) cause the playback device 512 to play back the first version of the audio content in synchrony with the playback device 510.

For each group member whose identified characteristic(s) does not meet at least a threshold criteria, the group coordinator may cause the group member to play back a second version of audio content. For instance, based on determining that the network connection quality of the playback device 514 does not meet the threshold network connection quality criteria, the playback device 510 may cause the playback device 514 to play back the second version of the audio content in synchrony with playback of the first version of the audio content by the playback device 510 and the playback device 512. The second version of the audio content may be a lower quality version than the first version. For example, the second version may comprise a version with a lower bit rate, lesser sample rate, lower bit depth, and/or lesser audio channel outputs than the first version. As a result, because the network connection quality of playback device 514 does not meet the threshold criteria—indicating that the connection will likely be unable to support streaming of high-quality audio content—playing back a lower quality version of the audio content may enable the playback device 514 to participate in synchronous grouped playback without adversely impacting network performance and the overall user listening experience.

In some instances, the network connection quality of playback device 510 may not meet the threshold criteria, and the playback device 510 may instead play back the second version of audio content in synchrony with the playback device 514 and cause the playback device 512 to play back the first version in synchrony with the playback of the second version by the playback device 510 and the playback device 514.

In some implementations, the group coordinator may identify audio content after evaluating one or more characteristics that may affect audio playback, including network characteristics, group member playback device characteristics, and/or playback group characteristics, as described above. For instance, the group coordinator may determine each group member's respective playback capability and based on that determination, identify one or more versions of audio content for playback.

In some examples, if the group coordinator determines that the playback group comprises "heterogeneous" playback capabilities—i.e., that two or more members of the playback group have different playback capabilities—a single version of the audio content may be identified for synchronous playback by all group members. This is referred to herein as the "lowest common denominator" approach, wherein the single version of the audio content that is identified for synchronous playback is based on a most-sophisticated playback capability that is common to all group members. Thus, under this approach, the version of the audio content that is identified may correspond with the highest quality version that the least-sophisticated group member is capable of playing back. To illustrate with an example, the group coordinator 510 may determine that (i) the highest quality of audio content that the group coordinator 510 is capable of playing back is DRM-encrypted, Dolby Digital Plus-encoded, UHD audio content, (ii) the highest quality of audio content that the group member 512 is capable of playing back is DRM-encrypted, Dolby Digital Plus-encoded, UHD audio content, and (iii) the highest quality of audio content that the group member 514 is capable of playing back is non-DRM-encrypted, conventional multi-channel surround sound (e.g., non-Dolby Atmos-encoded content), HD audio content. Therefore, under the lowest common denominator approach, the version that is ultimately identified for playback may correspond with the most sophisticated playback compatibility that is common to all group members, which in this example, may be a non-DRM-encrypted, conventional multi-channel, HD version of the audio content that is playable by the group member 514.

In some instances, one or more aspects of the playback capability of a particular group member may warrant identification of a lower-quality version of the audio content despite that group member's capability to play back higher-quality audio content. For example, the group coordinator 510 may determine that each of the group coordinator 510 and group members 512 and 514 is capable of playing back DRM-encrypted, Dolby Digital Plus-encoded, UHD audio content. However, the respective playback capability of group member 514 may indicate that the group member 514 (i) is a battery-operated (e.g., portable) playback device, (ii) is not connected to an external power source, and (iii) has a battery level that is below a threshold level (e.g., 50%) of full battery power. Therefore, in order to prolong the battery life of the group member 514 and reduce interruptions to synchronous playback, the group coordinator 510 may identify a lower-quality version of the audio content for synchronous playback so that the group member 514 may consume power at a slower rate than it would consume if playing back higher-quality audio content. In some implementations, the lower-quality version of the audio content that is identified in these situations may be a first version of the audio content, and the group coordinator may additionally identify a second, higher-quality version of the audio content that would be used if the playback capability of the group member 514 improves or otherwise changes. Accordingly, the group coordinator may initially provide the first version of the audio content to the group members 512 and 514 and play back the first version of the audio content in synchrony with the group members 512 and 514. Thereafter, in the event that the playback capability of the group member 514 improves during the course of synchronous playback (e.g., gets plugged into a charging device) the group coordinator may provide the second version of the audio content to the group members 512 and 514 and transition to playing back the second version of the audio content, content in synchrony with the group members 512 and 514. Transitioning from playback of a first version of audio content to a second version of audio content will be described in more detail further below.

Notably, and as will be explained in more detail below, the evaluation of characteristics that may affect audio playback, including the playback capabilities of group member playback devices, may be performed at various times, such as on a regular basis while devices are grouped for synchronous playback (e.g., at a timed interval (e.g., every 2 minutes), when an audio boundary is detected (e.g., at the end of an audio track, at the beginning of a new audio track, etc.), when a change in group characteristics is detected (e.g., a device leaves the group, a device joins the group, etc.), or when a change in network characteristics is detected, etc.), among other possibilities. In this way, playback may be adapted dynamically to account for fluctuating capabilities of one or more members of a synchrony group in a manner that enables seamless transitioning between different versions of audio content while decreasing user perceptibility of changes in playback quality in order to maintain a high fidelity and satisfying user listening experience.

e. Obtaining Audio Content

After the playback capabilities of the group members have been determined and the one or more versions of the audio content have been identified, the one or more versions of the audio content may be obtained for playback. Obtaining the one or more versions of the audio content may take various forms.

In some examples, the version(s) of audio content may be obtained by the group coordinator from one or more media content services. The group coordinator may begin by determining a respective playback capability of each group member as described above. Based on the respective playback capabilities, the group coordinator may request a given version of the audio content from a media content service.

In some implementations, the group coordinator may receive, from the media content service, the given version of the audio content, which the group coordinator may then distribute to each group member, along with playback timing information, for synchronous playback. Alternatively, in some implementations, the group coordinator may receive, from the media content service, a pointer (e.g., a URI or a URL, etc.) for retrieving the given version of the audio content. The group coordinator may then retrieve the given version of the audio content using the pointer and distribute the given version of the audio content, along with playback timing information, to each group member for synchronous playback. Alternatively still, in some implementations, the group coordinator may receive, from the media content service, a manifest (or a pointer to the manifest) comprising a plurality of pointers corresponding to respective versions of the audio content. The group coordinator may then determine a pointer corresponding to the given version of the audio content, retrieve the given version of the audio content using the pointer, and distribute the given version of the audio content, along with playback timing information, to each group member for synchronous playback. Other examples are also possible.

In implementations where the group coordinator identifies more than one version of the audio content that is to be played back by the playback group, the group coordinator may request each identified version of the audio content from the media content service. The media content service may then return each version of the audio content, a respective pointer for each version of the audio content, or the manifest of pointers to the group coordinator as described above. In such implementations, the group coordinator may request the versions of the audio content from more than one media content service. For instance, the group coordinator may request a first version of the audio content from a first media content service and a second version of the audio content from a second media service.

In some examples, the version(s) of audio content may be obtained by a media content service based on playback capability information provided by the group coordinator. The group coordinator may begin by determining a respective playback capability of each group member as described above and then transmitting to a media content service the determined playback capabilities. The media content service may then identify one or more versions of the audio content based on the playback capability information provided by the group coordinator and provide the identified version(s) of the audio content to the group coordinator. The group coordinator may receive the version(s) of the audio content as described above.

In some examples, the version(s) of audio content may be obtained by a remote computing device that is configured to communicate with the local media playback system of the playback group and one or more media content services. For instance, in an implementation where the remote computing device is configured to collect playback device information including playback capability information, the remote computing device may obtain, from one or more media content services, one or more versions of the audio content based on the respective playback capabilities of the playback group. The remote computing device may then provide the obtained version(s) to the group coordinator. In turn, the group coordinator may distribute the obtained version(s) to the group members, along with playback timing information, for synchronous playback.

f. Transmitting Audio Content

Causing a group member to play back a given version of the audio content may take various forms. As one possibility, the group coordinator may, at the time of identifying different versions of the audio content from the one or more media content sources, retrieve the different versions of the audio content from the one or more media content sources. As one example, the group coordinator may download and temporarily store the retrieved versions of the audio content in a local memory. After determining which version should be played back by each group member as described above, the group coordinator may then concurrently, or substantially concurrently, transmit, to each group member, the determined version of the audio content, via one or more data packets, that is to be played back by the respective group member. For example, with reference to FIG. 5, the playback device 510 may concurrently, or substantially concurrently, transmit (i) a first version of the audio content via a first stream of audio content 505a comprising one or more data packets 506a to group member 512 and (ii) a second version of the audio content via a second stream of audio content 505b comprising one or more data packets 506b to group member 514.

Each stream of audio content 505a and 505b may further comprise respective playback timing information 507a and 507b. Playback timing information 507a and 507b may comprise presentation timestamps indicating to respective group members 512 and 514 the timing and/or order in which each of the one or more respective data packets 506a and 506b should be consumed (e.g., output)—that is, at what time and/or in which order the data packets should be played back by the respective group member to achieve synchronous playback of the audio content. In this regard, after retrieving the different versions of the audio content, the group coordinator may generate, for each version of audio content, corresponding sets of data packets for transmission to one or more group members. The sets of data packets may comprise a corresponding pair of data packets, for each version of the audio content, for a given portion of the audio content. The group coordinator may further generate, for each pair of data packets, a corresponding presentation timestamp. In this way, regardless of the version of the audio content received by the group members, each group member may play back its respective version (based on the presentation timestamp of each received data packet) in synchrony with the other group members of the playback group. In some embodiments, the streams of audio content 505a and 505b may further comprise respective clock timing information 508a and 508b. In some instances, the playback device 510 may use one or both of the playback timing information 507a and/or 507b and one or both of the clock timing information 508a and/or 508b to play back audio content in synchrony with one or both of group members 512 and 514 as described herein. Additional information about synchronous playback may be found in U.S. patent application Ser. No. 17/508,028, filed on Oct. 22, 2021 and titled "Techniques for Enabling Interoperability between Media Playback Systems," which is incorporated by reference herein in its entirety.

As another possibility, the group coordinator may transmit, to each group member, a notification including a pointer (e.g., a URI or a URL) for independently retrieving a given version of the audio content from a given media content source. The notification may further include timing information in order for each group member to play back its respective version of the audio content in synchrony with the other group members. Other examples are also possible.

g. Detecting Changes in Characteristics

While the group members are synchronously playing back the audio content, the group coordinator may detect a change in one or more group members' previously identified characteristics. Based on the detected change, the group coordinator may cause the one or more group members to transition from playing one version of the audio content to playing a different version of the audio content.

The group coordinator may detect a change in various types of characteristics. As one possibility, the group coordinator may detect a change in one or more network characteristics. As one example, the group coordinator may detect an upgrade in a network characteristic. For instance, the playback device 510, as the group coordinator, may detect that the quality of the second connection between the playback device 514 and the network device has improved such that the quality of the second connection meets the threshold network connection quality criteria, indicating that the playback device 514 is able to stream higher-quality audio content without adversely impacting network or playback performance. Therefore, the playback device 510 may cause the playback device 514 to transition from playing back the second version of the audio content to playing back the first version of the audio content in synchrony with the playback device 510 and the playback device 512. As another example, the group coordinator may detect a downgrade in a network characteristic. For instance, the playback device 510 may detect that the quality of the first connection between the playback device 512 and the network device has degraded such that the quality of the first connection no longer meets the threshold network connection quality criteria, indicating that the playback device 512 is no longer able to stream the first version of the audio content without adversely impacting network or playback performance. Therefore, the playback device 510 may cause the playback device 512 to transition from playing back the first version of the audio content to playing back the second version of the audio content in synchrony with playback of the second version of the audio content by the playback device 514 and playback of the first version of the audio content by the playback device 510.

As another possibility, the group coordinator may detect a change in one or more playback device characteristics. For instance, the group coordinator may determine at a first time that a particular group member is capable of handling a first encoding scheme that corresponds with higher-quality audio content. However, the group coordinator may determine at a second time that the particular group member is currently experiencing a performance-reducing condition (e.g., reduced processing capability, reduced battery, etc.). As a result, the group coordinator may determine that the group member is temporarily incapable of handling the first encoding scheme and may thus identify corresponding audio content having a second encoding scheme that corresponds with lower-quality audio content, at least until the group member's playback capability improves.

The group coordinator may detect a change in other characteristics, including playback group characteristics, as well. Many other examples are also possible.

The group coordinator may detect a change in a characteristic in various ways. As one possibility, the group coordinator may detect a change as a result of monitoring one or more characteristics as discussed above. For instance, as described above, the group coordinator may periodically send test packets to the other group members of the playback group and/or request information from the other group members regarding the status of one or more characteristics. As another possibility, the group coordinator may receive an indication from one or more group members that a group member's respective characteristic(s) has changed. Based on the change, the group coordinator may cause group playback to be adapted. To illustrate with an example, at an initial time T1, the group coordinator may have determined that the group coordinator and each of a first group member and a second group member had respective playback capabilities that enabled each playback device to play back a relatively high-quality, first version of the audio content. The group coordinator may then have obtained the first version of the audio content corresponding to the respective playback capabilities of the playback group at the initial time T1 for synchronous playback. Thereafter, while the group coordinator and the first and second group members were playing back the first version of the audio content in synchrony, the group coordinator may have continued to monitor the playback capabilities of the group members by periodically receiving indications of each group member's respective playback capability (and perhaps also generating internal indications of its own playback capability), as previously discussed. Based on playback capability information determined at a second time T2, the group coordinator may have determined that the playback capability of one or more group member has changed such that the one or more group member is no longer capable of playing back the first version of the audio content. For instance, at time T2, a given group member may have been experiencing reduced network connectivity or reduced battery power (e.g., less than 50%, less than 40%, less than 30%, less than 20%, and/or less than 10% battery power remaining) that adversely impacted its respective playback capability. Therefore, the group coordinator may have determined that a second, relatively lower-quality version of the audio content should be obtained for playback by the given group member. Other examples are also possible.

As another possibility, the group coordinator may detect a change in characteristics when the size of a playback group comprising the group coordinator changes (e.g., when a group member leaves the group or when a new group member joins the group). For example, the group coordinator may detect a change in playback capability at the time that a new group member joins the playback group comprising the group coordinator. As mentioned above, the group coordinator may receive an indication of the group member's respective playback capability (perhaps in response to a request from the group coordinator) at the time the group member joins a playback group with the group coordinator or otherwise receives a command to play back audio content in synchrony with the group coordinator. Based on the indication of the group member's respective playback capability, the group coordinator may determine that the group member's playback capability is different from the playback capability of the group coordinator (and any other group members), and the group member is thus incapable of handling a first version of the audio content that is currently being played back by the playback group. The group member may be incapable of handling the first version for any one of a variety of reasons, including those previously discussed, such as the group member's decryption and/or decoding capability, processing capability, and/or battery status. Therefore, the group coordinator may determine that a second version of the audio content that is different from the first version should be obtained.

In some implementations, upon determining that the new group member is incapable of handling the first version of the audio content, the group coordinator may cause an indication to be displayed to a user indicating that the new group member is incapable of handling the version of audio content that is currently being played back, and that synchronous playback may be impacted as a result. The indication may take various forms. In some examples, the indication may take the form of a visual indication that is displayed via the on-device user interface (e.g., the user interface 113 of FIG. 1C) of the group coordinator or one or more other group members. For example, the visual indication may comprise displaying a given color via an LED display of one or more group members. The visual indication may further be accompanied by an audio indication such as a short chime or alert. In some examples, in addition or as an alternative to the on-device UI display, the indication may take the form of a notification displayed to a user via a user interface of a controller device (e.g., the user interface 133 of the controller device 130a of FIG. 1H). Other examples are also possible.

In some examples, the indication noted above may be provided to the user after the group coordinator determines that the capability of the new group member may necessitate a change (e.g., after receiving the grouping command) but before effecting the change. Thus, the user may be presented with an option to cancel the command in favor of maintaining the current playback conditions.

In some implementations, the group coordinator may predict a change in one or more characteristics and cause group playback to be adapted accordingly in anticipation of the predicted change. The group coordinator may predict the change in various ways. As one possibility, the group coordinator may predict a change based on historical playback data, historical zone formation data, and/or historical group formation data. For example, the group coordinator may determine, based on historical playback data and historical group formation data, that at a given time of day, the group coordinator will be entered into a given synchrony group with other playback devices for playback of given audio content. The given synchrony group may comprise at least one playback device that is an older model with a less sophisticated playback capability and/or may comprise a large number of playback devices. For instance, a user may listen to a given playlist while cooking dinner every evening from 6-7 pm and may group several playback devices in the user's kitchen and living room area in order to create a more immersive audio experience, and one of those playback devices may be an older model playback device, a battery-powered playback device, etc., that has a relatively less sophisticated playback capability than the other playback devices. Accordingly, as the given time of day approaches, the group coordinator may predict increased network traffic and may thus cause grouped playback to be adapted accordingly for more reliable synchronous playback—e.g., by causing one or more group members to play back a lower-quality version of the given audio content.

As another possibility, the group coordinator may predict a change in one or more network characteristics based on a location of one or more other group members. For example, a given playback device may be located in an area of a media playback system that is physically far away (e.g., in a basement, in a garage, etc.) from a centrally-located local network device, resulting in a generally weak network connection between the given playback device and the network device. Accordingly, any time the given playback device is selected for grouped playback, a group coordinator of the playback group may predict that the given playback device may have reduced bandwidth. The group coordinator may thus cause group playback to be adapted accordingly—e.g., by causing at least the given playback device to play back a lower quality version of the given audio content. The group coordinator may predict changes in other ways as well.

In some implementations, upon detecting or predicting a change in one or more characteristics, the group coordinator may cause an indication of the change to be displayed to the user. The indication may take various forms. As one possibility, the indication may take the form of a visual indication that is displayed via the on-product user interface (e.g., the user interface 113 of FIG. 1C) of the group coordinator or one or more other group members. For example, the visual indication may comprise displaying a given color via an LED display of one or more group members. The visual indication may further be accompanied by an audio indication such as a short chime or alert. As another possibility, in addition or as an alternative to the on-product UI display, the indication may take the form of a notification displayed to a user via a user interface of a controller device (e.g., the user interface 133 of the controller device 130a of FIG. 1H). Other examples are also possible.

A change in one or more group members' playback capability may be detected in other ways or at other times as well.

Based on the detecting a change in one or more characteristics, the group coordinator may determine that one or more different versions of audio content should be obtained. The group coordinator may then proceed to obtain the different version(s) of the audio content for playback by the playback group. For instance, the group coordinator may determine that a second version of audio content should be obtained. After the group coordinator has determined that the second version of the audio content should be obtained, the group coordinator may proceed to obtain the second version from a media content source. The group coordinator may obtain the second version in any one of the various ways previously described, such as by requesting the second version of the audio content from the media content source, by receiving the second version (or a pointer to the second version) based on playback capability information provided to the media content source, or by communicating with a remote computing device to receive the second version from the media content source.

Advantageously, the group coordinator may retrieve the second version of the audio and provide the second version to each group member in a manner that reduces user perception of the transition from playback of the first version to the second version. The group coordinator may achieve such a "seamless transitioning" effect in various ways.

In some examples, the group coordinator may begin to retrieve the second version of the audio content while it is still coordinating with the other group members to play back the first version of the audio content in synchrony. During this time, the first version of the audio content may be stored in a first buffer of the group coordinator before transmission to the other group members. Concurrently, the group coordinator may begin storing the second version of the audio content in a second buffer, and may further identify an audio boundary (e.g., a sample boundary) within the first version of the buffered audio content and a corresponding audio boundary within the second version of the buffered audio content. When the boundary is reached in the first buffer, the group coordinator may transition from transmitting the first version of the audio content from the first buffer to transmitting the second version of the audio content from the second buffer, starting from the corresponding boundary within the second version of the buffered audio content.

The boundary may be identified in various ways. For instance, the boundary may correspond with a portion of the audio content where a transition between different versions of the audio content is less likely to be perceived by a user. As an example, if the audio content is a playlist, the boundary may be the end of a currently playing track, or perhaps the beginning of a chorus of the currently playing track. As another example, if the audio content is a soundtrack corresponding to video content being displayed at a display device (e.g., a television, smartphone, tablet, etc.), the boundary may be a portion of the soundtrack that corresponds with the end of a scene that is currently playing. Other examples are also possible.

After obtaining the second version of the audio content as noted above, the group coordinator may transmit the second version, along with playback timing information, to each group member. The playback timing information may include information about when to begin playing back the second version (e.g., at the boundary as described above). When the boundary is reached, the group coordinator and each group member may stop playing back the first version of the audio content and begin playing back the second version of the audio content.

In the ways described above, the group coordinator may utilize information about one or more group member's characteristics, including playback capability, to determine an appropriate version of audio content that is to be played back by the playback group at any given time. Furthermore, while the preceding example has been described with respect to a first version and a second version of audio content, it should be understood that any number of versions may be obtained by the group coordinator.

h. Creating Sub-Groups

Based on evaluating characteristics that may affect playback, the group coordinator may group one or more group members into one or more sub-groups of the synchrony group. The group coordinator may create such sub-groups in various ways.

In some implementations, the group coordinator may group one or more group members into one or more sub-groups of the synchrony group based on similar characteristics and cause the playback devices within each sub-group to play back a given version of audio content. As one example, the group coordinator may create sub-groups based on respective network and/or device characteristics of one or more group members. For instance, one or more group members may each be a newer model and/or have a wired connection to the network device, thus being relatively more capable of playing back high-quality content without adding wireless network strain. Accordingly, the group coordinator may place the newer model and/or wired group members into a first sub-group that receives the highest-quality version of audio content that the group coordinator identifies for grouped playback. Conversely, one or more other group members may each be an older model and/or a portable playback device, thus having relatively less reliable capability to play back high-quality content. Accordingly, the group coordinator may place the older model and/or portable group members into a second sub-group that receives the lower-quality version of audio content that the group coordinator identifies for grouped playback. Other examples are also possible.

In some examples, if the group coordinator determines that the playback group comprises heterogeneous playback capabilities as previously described, more than one version of the audio content may be identified based on the different playback capabilities. In this regard, the group coordinator may group one or more group members into sub-groups based on common playback capabilities and a respective version of the audio content for synchronous playback may then be identified for each sub-group.

As one example, group members may be grouped into a sub-group based on decryption capability. For instance, one or more group members may be capable of decrypting audio content and may thus be grouped into a first sub-group, and one or more other group members may be incapable of decrypting audio content and may thus be grouped into a second sub-group. The group coordinator may then identify a first version of the audio content that is an encrypted, higher-quality version for provision to the first sub-group (e.g., by decrypting and re-encrypting the audio content as will be explained further below) and a second version of the audio content that is an unencrypted, lower-quality version for provision to the second sub-group. The group coordinator may then cause the group members of each sub-group to play back their respective versions of the audio content in synchrony with the other sub-group.

As another example, the group coordinator may group some group members into a sub-group based on decoding capability. For instance, group members that are capable of decoding audio content may be grouped into one or more sub-groups based on the type of encoding scheme that the group members are capable of decoding. For instance, a first group member may be capable of decoding a first encoding scheme corresponding to high-quality, lossless audio content and a second group member may only be capable of decoding a second encoding scheme, relatively lower-quality (e.g., more lossy) format of audio content. Thus, the group coordinator may identify two versions of audio content: a first version that is encoded according to the first encoding scheme for provision to the first group member and a second version encoded according to the second encoding scheme for provision to the second group member. In some examples, different versions of encoded audio content may not necessarily comprise different quality versions of the audio content. For instance, the first version of the audio content may have approximately the same audio quality as the second version of the audio content. Regardless of the respective version that is provided to each group member, the group coordinator may cause each group member to play back its respective version in synchrony.

In an instance in which the group coordinator is the only member of a playback group (e.g., the group coordinator is not grouped with any other playback device), the group coordinator may identify a version of audio content based only on its own playback capability.

i. Predictive Grouping

In some implementations, the group coordinator may evaluate a given synchrony group configuration and predict a probability of the given group reliably playing back a given quality of audio content. Such an evaluation may be based on historical grouping, network, and/or playback data of the media playback system. As one possibility, each playback device of the media playback system may routinely collect and send to a remote computing device data related to that playback device's playback history, including grouped playback involving the playback device and network characteristics during grouped playback. Based on receiving such data from each playback device of the media playback system, the remote computing device may maintain a probability model that predicts network and/or playback performance based on a given grouping of playback devices.

Thereafter, the group coordinator may request from the computing device a probability corresponding to the given group configuration, which may be provided in the form of a probability value. In some implementations, the group coordinator may determine that a different group configuration may produce a higher probability and may recommend that group configuration as an alternative. The group coordinator may cause an indication of the predicted probability and/or the alternative group configuration to be displayed at a user interface of the group coordinator and/or a controller device, as discussed above.

j. Transcoding Audio Content

In some instances, when identifying audio content for playback by a synchrony group, the playback device 510, as group coordinator, may determine that only one version, or relatively few versions, of given audio content is available. As previously discussed, different playback devices of a synchrony group may have different and/or fluctuating playback capabilities based on network, playback device, and/or synchrony group characteristics. Therefore, it is possible that the version(s) of the audio content identified by the group coordinator may be unsuitable for playback by one or more group member playback devices of the synchrony group. In such instances, the group coordinator may obtain an identify a version of the given audio content and then use the identified version to transcode a version that is suitable for playback by each group member of the synchrony group. In general, transcoding the identified version of the audio content may involve (i) decoding (e.g., decompressing) the identified version from a first format and (ii) re-encoding (e.g., compressing) the decoded version according to one or more other formats based on respective group member characteristics.

The transcoding techniques disclosed herein may be particularly useful in scenarios that involve home theater configurations. A home theater configuration may typically involve multiple playback devices, including a "primary" playback device (e.g., a soundbar, a home theater hub without speakers, etc.) that acts as group coordinator, and "secondary" playback devices (also referred to as "satellite" playback devices) that act as group members, which may include full-range playback devices that are capable of playing back all audio frequencies as well as limited-range playback devices (e.g., a subwoofer playback device) that are capable of playing back only certain audio frequencies, at least when grouped in a home theater configuration. Home theater configurations may be more susceptible to playback interruptions than other playback configurations due to (i) relatively larger playback group size (e.g., 3-7 group members, with additional members potentially joining during playback), (ii) relatively increased diversity of group member playback capabilities, and (iii) additional synchronization with streaming video content.

As another possibility, a group coordinator of a playback group having a home theater configuration may take advantage of the fact that certain channels in a home theater configuration (e.g., surround channels and subwoofer channels) are less listening-sensitive than others (e.g., front channels), such that the difference between higher-quality and lower-quality audio content is less noticeable. Thus, the group coordinator may transcode given home theater audio content into a relatively lower-quality, low-bandwidth version that may be streamed to the group members that output these channels. In this way, the group coordinator may preserve network bandwidth that would have otherwise been used to transmit the higher-quality version to these satellites.

The group coordinator may determine that a suitable version of given audio content is not available in various ways. For instance, the group coordinator may determine that a media content source provides only a first version of the given audio content. As one example, the group coordinator may identify the first version of the given audio content from a remote MCS 502a, which may be a streaming media service that provides only one version of the given audio content. As another example, the group coordinator may identify the first version of the given audio content from a local MCS 502b, which may be a media player (e.g., a smart TV, DVD/Blu-ray player, etc.) that is connected to the local network 501 and configured to provide audio content to the group coordinator directly via a wired input (similar to the local audio source 150 of FIG. 1C) while displaying corresponding media content (e.g., video content). For example, the first version of the audio content may be audio content corresponding to a movie that is being played by the MCS 502b that comprises a smart television of the MPS 500.

The group coordinator may determine that the identified first version of the given audio content is unsuitable for playback by one or more group members. In this regard, as described above, this determination may be made based on an evaluation of network, playback device, and/or synchrony group characteristics. For example, one or more group members may be an older model playback device, a battery-powered playback device, and/or may not meet the network characteristic threshold criteria described above, among other possibilities. Based on the determination that the first version is unsuitable for playback by at least one group member, the group coordinator may cause the first version to be transcoded to one or more other versions.

Transcoding of the audio content may take various forms. As one example, audio content may be transcoded from a higher quality level to a lower quality level. For example, an identified first version of the audio content may be encoded according to a first format (e.g., a lossless-compressed or uncompressed codec) such that the first version comprises a sample rate and bit depth corresponding to higher-quality audio content (e.g., 192 kHz/24-bit). The first version may be of a higher-quality than what one or more group members (e.g., an older model playback device) is capable of reliably playing back, and the group coordinator may determine that the first version of the given audio content, if played back by the one or more group members, may lead to an increased likelihood of dropouts or interrupted playback, which may in turn lead to a less ideal user experience. Therefore, the group coordinator may instead decode the identified first version of the audio content and subsequently re-encode it according to a different format (e.g., a lossy-compressed codec) that comprises a sample rate and bit depth corresponding to lower-quality audio content (e.g., 96 kHz/16-bit) for transmission to one or more group members for playback. Conversely, as another example, the identified first version of the audio content may be transcoded from a lower-quality level to a higher-quality level.

In some implementations, in addition to transcoding audio content received from a media content source, a group coordinator may also decrypt and then re-encrypt the audio content according to a particular encryption scheme before transmitting the transcoded, re-encrypted audio content to one or more group members. Decryption and re-encryption of high quality audio content is described in more detail in U.S. application Ser. No. 17/741,071, which was incorporated by reference above.

Further, transcoding of the audio content may be performed by various devices. As one possibility, in line with the discussion thus far, the group coordinator may identify the first version of the audio content and evaluate the network, playback device, and/or synchrony group characteristics discussed above. Based on the evaluation, the group coordinator may then transcode the first version of the audio content into a second version and transmit data packets comprising the transcoded second version of the audio content to those group members that are unsuited to play back the first version. The group coordinator may also transmit respective playback timing information and clock timing information so that the transcoded second version may be played back in synchrony with playback of the first and/or second version by other group members.

As another possibility, the group coordinator may identify the first version of the audio content and evaluate the network, playback device, and/or synchrony group characteristics as described above. Based on the evaluation, the group coordinator may then direct a different playback device to transcode the first version of the audio content based on the evaluation. In this regard, the group coordinator may direct an idle playback device or a playback device that is not a member of the synchrony group to perform the transcoding.

To illustrate an example with reference to the MPS 500 of FIG. 5, the group coordinator playback device 510 may direct a playback device (not shown) other than the playback devices 512 or 514 of the playback group 504 to perform the transcoding. The playback device 510 may send the first version of the audio content to the other playback device, perhaps also with the evaluation results and/or information about a format/quality level into which the first version should be transcoded. The other playback device may then proceed to perform the transcoding and then transmit the transcoded version(s) of the audio content back to the playback device 510. The group coordinator 510 may then transmit the transcoded version(s), along with respective playback timing and clock timing information, to the playback device 512 and/or 514. In some implementations, the group coordinator 510 may include, along with the transmission of the first version of the audio content, information about which group member(s) is to receive the transcoded version(s), and the other playback device may perform the transcoding and then transmit the transcoded version(s) directly to the playback device 512 and/or 514, perhaps also along with respective playback timing and clock timing information. Other examples are also possible.

Advantageously, by (fully or partially) delegating the responsibility of transcoding of the audio content to a different device, the group coordinator may direct its computational resources to other tasks and/or preserve resources (e.g., if the group coordinator is a battery-powered playback device, delegating the transcoding process may help preserve battery capacity).

Further yet, the determination that the first version of the audio content is to be transcoded may be performed at various times. As one possibility, the group coordinator may make the determination after detecting or receiving a command to begin synchronous playback and before synchronous playback of the first version of the audio content has begun. For example, based on an evaluation of the network, playback device, and/or synchrony group characteristics, the group coordinator may determine that the first version is unsuitable for playback by a given group member. After discovering that the first version is the only available version of the audio content, the group coordinator may determine that the first version is to be transcoded for playback by the given group member.

As another possibility, the group coordinator may make the determination after synchronous playback of the first version of the audio content has begun (e.g., while the synchrony group 504 is playing back the first version of the audio content). For instance, the group coordinator may determine that one or more network, playback device, and/or synchrony group characteristics has changed (e.g., based on monitoring and/or predicting changes as described above) and that continued playback of the first version by one or both of the playback devices 512 or 514 may increase the likelihood of network latency and/or bandwidth constraints that may result in playback dropouts. Therefore, the group coordinator may determine that the first version is to be transcoded to a version more appropriate for playback by the playback devices 512 and/or 514.

In instances where the group coordinator makes the determination that transcoding of the first version of the audio content is required after synchronous playback has begun, the group coordinator may include, in the playback timing and clock timing information that is sent to group members, an indication of a particular audio boundary at which playback of the first version should stop and playback of the second version should begin in an effort to make the transition from playback of the first version to playback of the second version as seamless as possible and reduce any perceived playback change by the user. The audio boundary may be, for example, a particular audio frame, a beginning of a new audio track, or a pause in dialogue of corresponding video content, among other possibilities.

Advantageously, the transcoding techniques disclosed herein may enable a group coordinator to react quickly and autonomously to changes in network, playback device, and/or synchrony group characteristic(s) such that the group coordinator can dynamically adapt and enhance synchronous audio playback (i) on an ad-hoc basis and (ii) without the need to repeatedly communicate with a content source(s) to obtain different versions of audio content, thereby reducing overall time and network resources that would otherwise be allocated for identifying the different versions of the audio content while maintaining user perception of a consistent and seamless playback experience.

While the disclosed transcoding techniques have been described in the examples above as being effectuated after a determination by the group coordinator that only one version of given audio content is available from an MCS, it should be understood that the transcoding techniques may be performed at any time, regardless of availability of different versions of the given audio content from the MCS, without departing from the disclosed teachings. For example, the group coordinator playback device 510 may initially identify a first and a second version of given audio content for playback by the synchrony group 504. The playback device 510 may then (i) play back the first version, (ii) cause the playback device 512 to play back the first version in synchrony with the playback coordinator 510, and (iii) cause the playback device 514 to play back the second version in synchrony with playback of the first version by the playback devices 510 and 512. While the playback group 504 is playing back the audio content, the playback device 510 may detect that a network characteristic of the playback device 512 has changed (e.g., the playback device 512 is experiencing network latency). Based on the change, the playback device 510 may determine that the first version is no longer suitable for playback by the playback device 512. The playback device 510 may further determine that the second version is also not suitable for playback by the playback device 512. Therefore, the playback device 510 may transcode the first version of the given audio content into a third version of the audio content and then transmit the third version to the playback device 512 such that the playback device 512 transitions from playing back the first version to playing back the third version in synchrony with (i) the playback of the first version by the playback device 510 and (ii) the playback of the second version by the playback device 514. Other examples are also possible.

k. Selecting a Group Coordinator Based on Playback Capability

Evaluation of one or more characteristics that may affect audio playback as described above may be used for various other operations in addition to identifying audio content. For instance, information about respective playback capabilities of group members of a playback group may be used to select a group coordinator for the playback group.

In some examples, respective playback capabilities may be used to determine a group coordinator for a playback group comprising two or more playback devices that have been newly grouped for synchronous playback. For instance, a first playback device and a second playback device may receive a command to form a playback group for synchronous playback of audio content. As mentioned above, a playback group may have at least one designated group coordinator that is responsible for, among other things, obtaining and providing the audio content to each group member for synchronous playback, which typically requires relatively more playback capabilities (e.g., decryption, decoding, processing, memory, and storage capabilities, etc.) than a group member. To determine which one of the first or second playback devices should serve as the group coordinator, the respective playback capabilities of first and second playback devices may be compared. Such a comparison may take various forms.

As one example, the playback devices may perform the comparison of the respective playback capabilities themselves. For instance, each of the first and second playback devices may transmit a first indication of its respective playback capability to the other playback device, compare the other playback device's respective playback capability against its own playback capability, determine that a given one of the first or second playback device has a more sophisticated playback capability, and transmit a second indication of the determination to the other playback device. Upon receiving the second indication, the playback device that was determined to have the more sophisticated playback capability may then begin to serve as the group coordinator of the playback group.

As another example, a network device may perform the comparison of the respective playback capabilities. The network device may be, for example, another playback device of the local media playback system, a control device of the local media playback system, another device on the local network (e.g., a router, one or more IoT devices, etc.), and/or a remote computing device configured to communicate with the local media playback system. For instance, the network device may request from each of the first and second playback devices an indication of its respective playback capability, compare each respective playback capability, determine that a given one of the first or second playback device has a more sophisticated playback capability, and transmit an indication of its determination to the first and second playback devices. The playback device that was determined to have the more sophisticated playback capability may then begin to serve as the group coordinator of the playback group. The comparison may be performed in other ways as well.

In some instances, the playback capabilities of the playback devices may be equal, or approximately equal, and thus no one playback device is determined to be more sophisticated than the other. In such instances, a given one of the playback devices may be selected based on other criteria, or may be selected at random.

In some examples, respective playback capabilities may be used to determine a new group coordinator for an existing playback group. For instance, a third playback device may join a playback group comprising a first and second playback device, wherein the first playback device is currently designated as the group coordinator. As discussed above, the third playback device may transmit an indication of its current playback capability to the first playback device (e.g., the group coordinator) at the time of joining the playback group. The first playback device may then perform a comparison of the respective playback capability of the first and third playback devices. Based on the comparison, if the first playback device determines that it has a more sophisticated playback capability than the third playback device, it may continue to serve as the group coordinator of the playback group. However, if the first playback device determines that it has a less sophisticated playback capability than the third playback device, the first playback device may discontinue serving as group coordinator and notify the third playback device that it should begin to serve as the group coordinator of the playback group instead of the first playback device.

In this way, designation of a group coordinator may be regularly evaluated in an effort to ensure that group coordinator responsibilities are being handled by the playback device that is best equipped to do so.

l. Example Embodiments

FIGS. 6-10 depict flowcharts of example embodiments as described above for enhancing grouped playback of audio content using adaptive bitrate streaming techniques that can be implemented within an operating environment involving, for example, the media playback system 100, one or more of the playback devices 110, one or more of the network microphone devices 120, and/or one or more of the control devices 130 of FIG. 1, or for example, the media playback system 500 and one or more of the playback devices 510, 512, and 514 of FIG. 5. The example processes 600, 700, 800, 900, and 1000 may include one or more operations, functions, or actions as illustrated by one or more of blocks 602-616, 702-706, 802-814, 902-912, and 1002-1010. Although blocks 602-616, 702-706, 802-814, 902-912, and 1002-1010 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the example processes 600, 700, 800, 900, 1000, and any other processes and methods disclosed herein, each flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example processes 600, 700, 800, 900, and 1000 (and any other processes and methods disclosed herein), each block shown in FIGS. 6-10 may represent circuitry that is wired to perform the specific logical functions in the process.

Figure 6:
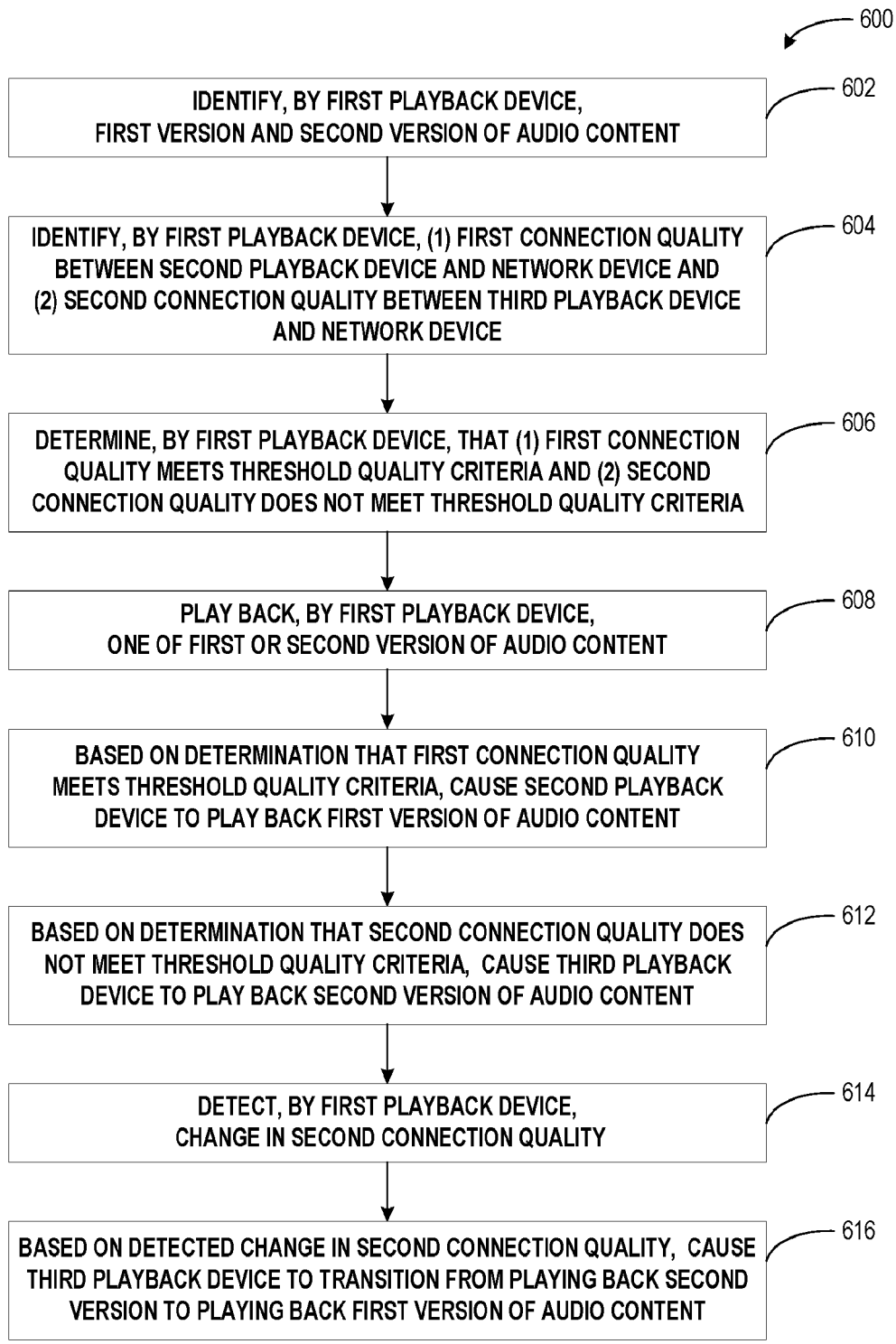
FIG. 6 is a flow diagram showing example operations for adaptive enhancement of audio content based on network connection quality according to one embodiment of the disclosed technology.

Turning to FIG. 6, a flow diagram of an example process 600 for identifying audio content for synchronous playback is shown. In the example process 600, a first playback device may be grouped with a second playback device and a third playback device of a media playback system for synchronized group playback of audio content. The media playback system may be, for example, the MPS 500 of FIG. 5. The first playback device may be, for example, the playback device 510, the second playback device may be, for example, the playback device 512, and the third playback device may be, for example, the playback device 514 of FIG. 5. The first playback device 510 may act as a group coordinator of the synchrony group comprising the playback devices 510-514. In this regard, the first playback device may be responsible for monitoring and evaluating network characteristics, playback device characteristics, and playback group characteristics, identifying one or more versions of audio content for grouped playback, and/or causing one or more group member playback devices to play back a given version of the audio content, as described above.

The example process 600 of FIG. 6 may be initiated, for example, with the first playback device detecting (e.g., via one or more microphones) or receiving (e.g., via a controller device) a command to play back audio content in synchrony with the second and third playback devices. After detecting or receiving a command to play back audio content in synchrony with the second and third playback devices, the first playback device may proceed to identify at least two versions of the audio content. At block 602, the first playback device may identify a first version and a second version of the audio content that is to be played back by the playback group, as described above. The first and second versions may be from a single media content source or from two different media content sources. Further, the first version may comprise a higher quality version of the audio content than the second version.

After identifying the first and second versions of the audio content, the first playback device may proceed to identify at least one network characteristic of each playback device. At block 604, the first playback device may identify (1) a first connection quality between the second playback device and a network device and (2) a second connection quality between a third playback device and the network device. As described above, the network device may be a local network device (e.g., router 503 of FIG. 5) of the media playback system that provides access to a local data network (e.g., WLAN 501) over which the first, second, and third playback devices and the network device are configured to communicate. The first playback device may identify the first and second connection qualities as described above.

The first playback device may then proceed to determine if each connection quality meets a threshold criteria. At block 606, the first playback device may determine that (1) the first connection quality meets a threshold network connection quality criteria and that (2) the second connection quality does not meet the threshold network connection quality criteria. The first playback device may make this determination as described above. For example, the first connection quality may have sufficient bandwidth for streaming high-quality audio content, and the second connection quality may not have sufficient bandwidth for streaming high-quality audio content.

The first playback device may also determine if its own connection quality meets a threshold criteria. Based on that determination, the first playback device may, at block 608, play back either the first version or the second version of the audio content. At block 610, based on the determination that the first connection quality meets the threshold criteria, the first playback device may cause the second playback device to play back the first version of the audio content in synchrony with the first playback device's playback of the first or second version of the audio content. The first playback device may cause the second playback device to play back the first version as described above. For example, the first playback device may transmit to the second playback device a stream of data packets comprising the first version of the audio content.

At block 612, based on the determination that the second connection quality does not meet the threshold criteria, the first playback device may cause the third playback device to play back the second version of the audio content in synchrony with the first playback device's play back of the first or second version of the audio content and the second playback device's play back of the first version of the audio content. The first playback device may cause the third playback device to play back the second version as described above. For example, the first playback device may transmit to the third playback device a stream of data packets comprising the second version of the audio content. It should be understood that the first playback device may perform the functions of blocks 610 and 612 concurrently or in any order.

At block 614, the first playback device may detect a change in the second connection quality. For example, the first playback device may detect that the second connection quality has improved, and the third playback device is now capable of playing back a higher quality version of audio content. Therefore, at block 616, the first playback device may cause the third playback device to transition from playing back the second version of the audio content to playing back the first version of the audio content.

Figure 7:
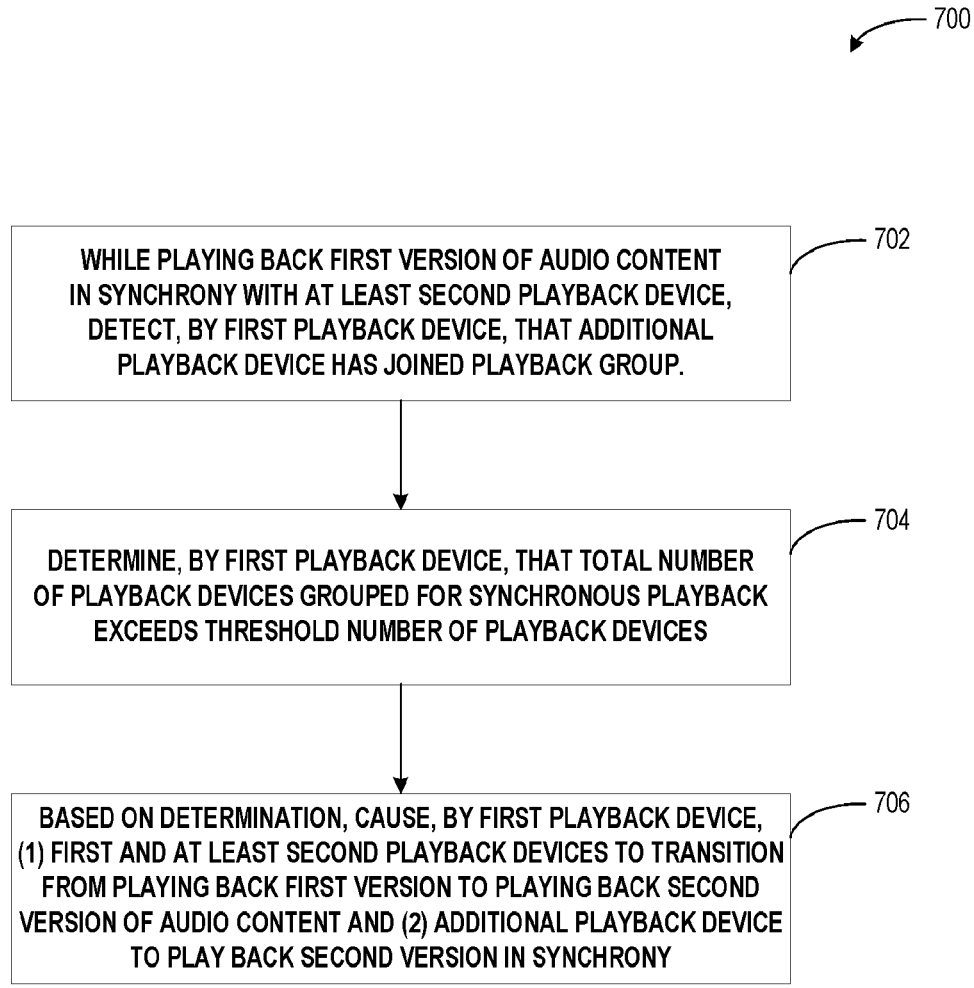
FIG. 7 is a flow diagram showing example operations for adaptive enhancement of audio content based on playback group size according to another embodiment of the disclosed technology.

FIG. 7 depicts a flow diagram of another example process 700 for identifying audio content for synchronous playback that may be implemented during synchronous grouped playback, while a first playback device is playing back a first version of audio content in synchrony with at least a second playback device. In this regard, the first version of audio content may comprise higher quality audio content than a second version that has been previously identified by the first playback device.

At block 702, the first playback device may detect that an additional playback device has joined the playback group. The first playback device may evaluate one or more characteristics based on detecting the additional playback device. Such an evaluation may include identifying a playback group characteristic as described above. At block 704, the first playback device may determine that the total number of playback devices currently grouped for synchronous playback exceeds a threshold number of playback devices (e.g., two playback devices in this example) that can synchronously play back the first version of the audio content without increasing the probability of reduced network or playback performance. Therefore, at block 706, the first playback device may cause (1) the first and at least second playback devices to transition from playing back the first version of audio content to synchronously playing back a second version of audio content, which may comprise a lower quality audio content than the first version, and (2) the additional playback device to play back the second version of the audio content in synchrony with the first and at least second playback devices.

In some instances, the example process 700 may be implemented by the first playback device of the example process 600 of FIG. 6 after performing the function at block 616. For example, while the first, second, and third playback devices are playing back the first version of the audio content in synchrony, the first playback device may detect that a fourth playback device has joined the playback group. The first playback device may then determine that the threshold number of playback devices (e.g., three playback devices in this example) that can synchronously play back high-quality audio content without increasing the probability of reduced network or playback performance (e.g., packet loss, audio delay, etc.) has been exceeded. Therefore, the first playback device may (1) cause each of the first, second, and third playback devices to transition from playing back the first version of the audio content to playing back the second version (i.e., the lower-quality version) of the audio content and (2) cause the fourth device to play back the second version of audio content in synchrony with the first, second, and third playback devices.

Figure 8:
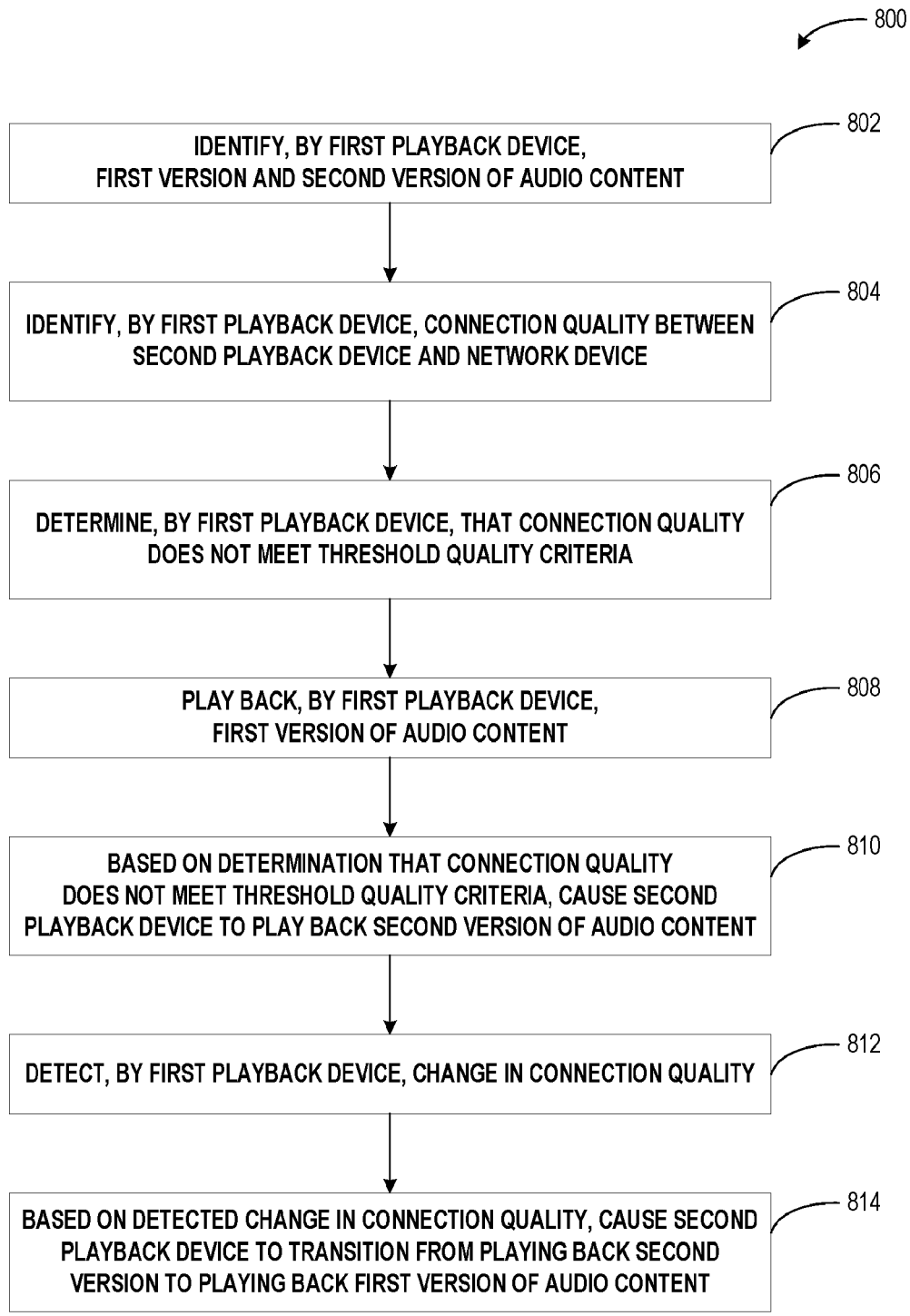
FIG. 8 is a flow diagram showing example operations for adaptive enhancement of audio content based on threshold quality criteria according to yet another embodiment of the disclosed technology.

FIG. 8 depicts a flow diagram of yet another example process 800 for identifying audio content for synchronous playback that may be implemented by a first playback device that is grouped with a second playback device for synchronous playback of audio content. At block 802, the first playback device may identify a first and a second version of the audio content. The first version of audio content may be a higher-quality version than the second version.

The first playback device may then evaluate network characteristics associated with the second playback device. At block 804, the first playback device may identify a connection quality of a connection between the second playback device and a network device (e.g., a wireless router). At block 806, the first playback device may determine that the connection quality of the connection between the second playback device and the network device does not meet a threshold criteria.

Further, the first playback device may determine that the quality of its own connection with the network device does meet the threshold criteria. Therefore, at block 808, the first playback device may play back the first version of audio content. At block 810, based on determining at block 806 that the connection quality of the second playback device does not meet the threshold criteria, the first playback device may cause the second playback deice to play back the second version of the audio content in synchrony with the play back of the first version by the first playback device.

While the first playback device is playing back the first version in synchrony with the second playback device's playback of the second version, the first playback device may detect, at block 812, that the connection quality of the connection between the second playback device and the network device has changed. In particular, the first playback device may determine that the connection quality has improved. Therefore, at block 814, the first playback device may cause the second playback device to transition from playing back the second version to playing back the first version of the audio content in synchrony with the first playback device.

Figure 9:
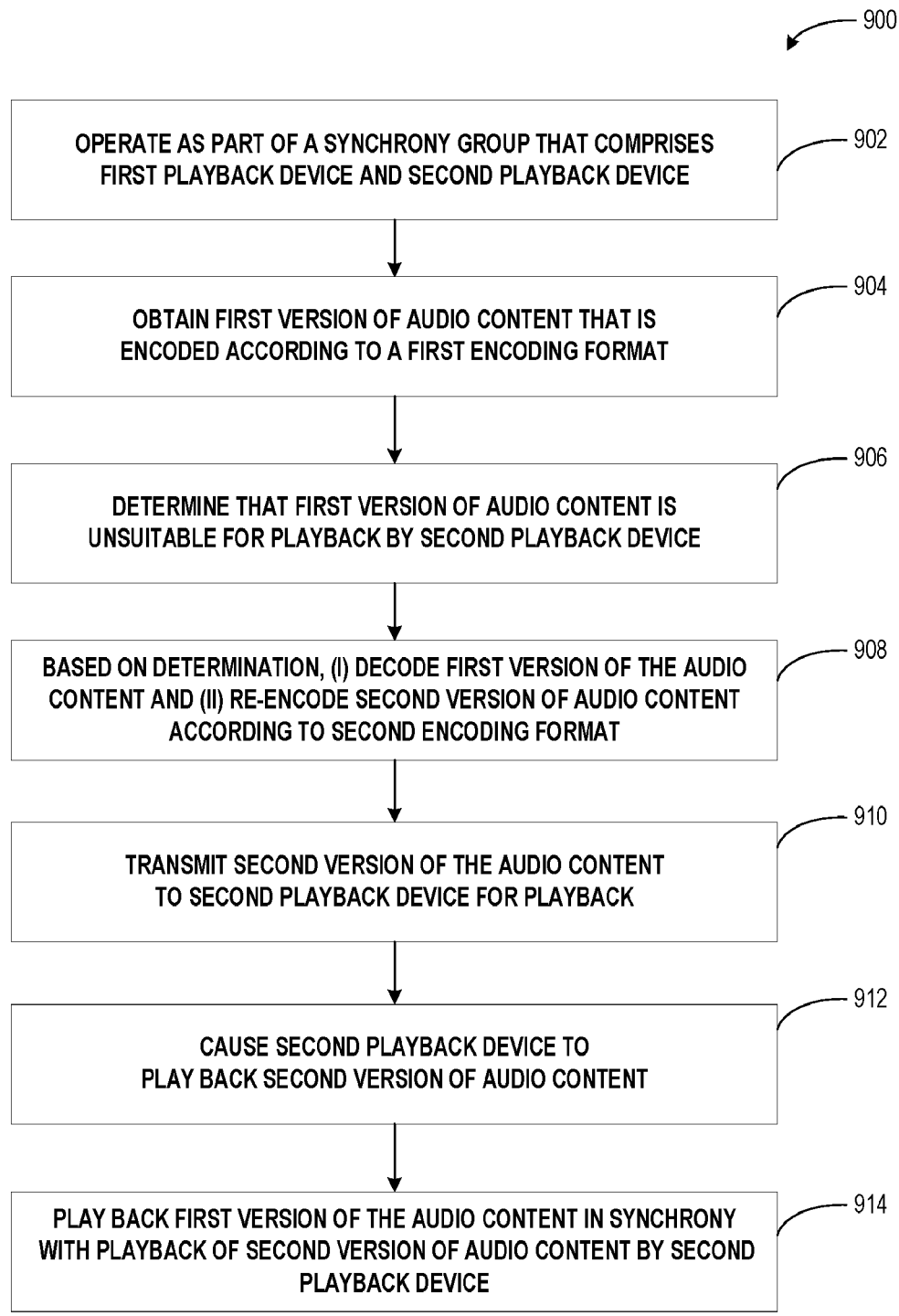
FIG. 9 is a flow diagram showing example operations for adaptive enhancement of audio content that involves transcoding audio content according to yet another embodiment of the disclosed technology.

FIG. 9 depicts a flow diagram of an example process 900 for transcoding audio content for synchronous playback that may be implemented by a playback device. The example process may begin at block 902, wherein a first playback device may be operating as part of a synchrony group that includes the first playback device and a second playback device. The first playback device may begin to operate as part of the synchrony group based on detecting or receiving (e.g., via a controller device) a command to form or join the synchrony group with the second playback device for synchronous playback of given audio content. The first playback device may serve as a group coordinator of the synchrony group and may thus be responsible for identifying audio content for playback by the synchrony group.

At block 904, the first playback device may obtain a first version of the given audio content. The first version of the audio content may be encoded in accordance with a first encoding format and may comprise, for example, a relatively higher-quality version of the given audio content.

At block 906, the first playback device may determine that the first version of the given audio content is unsuitable for playback by the second playback device. The first playback device may make this determination in any of the various ways described above, including by evaluating one or more network, playback device, and/or playback group characteristics. As one example, the first playback device may determine that a connection quality between the second playback device and a network device does not meet a threshold connection quality. As another example, the first playback device may determine that the second playback device comprises a battery-powered playback device and that a power capacity of the second playback device does not meet a threshold power capacity. Other examples are also possible.

At block 908, based on the determination that the first version of the given audio content is unsuitable for playback by the second playback device, the first playback device may transcode the first version of the audio content into a second version of the audio content as previously disclosed by (i) decoding the first version of the audio content and (ii) re-encoding the decoded version according to a second encoding format. For example, the transcoded, second version of the audio content may comprise a relatively lower-quality version of the given audio content.

At block 910, the first playback device may transmit the second version of the given audio content to the second playback device. As described above with respect to FIG. 5, the first playback device may transmit to the second playback device an audio stream that includes (i) data packets comprising the second version of the given audio content, (ii) playback timing information, and (iii) clock timing information. At block 912, the first playback device may cause the second playback device to play back the second version of the given audio content based on the playback timing and clock timing information. At block 914, the first playback device may play back the first version of the given audio content in synchrony with the second playback device's playback of the second version of the given audio content.

Thereafter, if the first playback device detects additional changes in the network, playback device, and/or playback group characteristics (e.g., improvement in the connection quality between the second playback device and the network device, addition of a new group member, etc.), the first playback device may transcode the first version of the given audio content into one or more additional versions based on the needs of the synchrony group. As another possibility, if the appropriate conditions exist, the first playback device may discontinue transcoding the first version of the given audio content and instead transmit the first version of the given audio content to the second playback device for synchronous playback.

Figure 10:
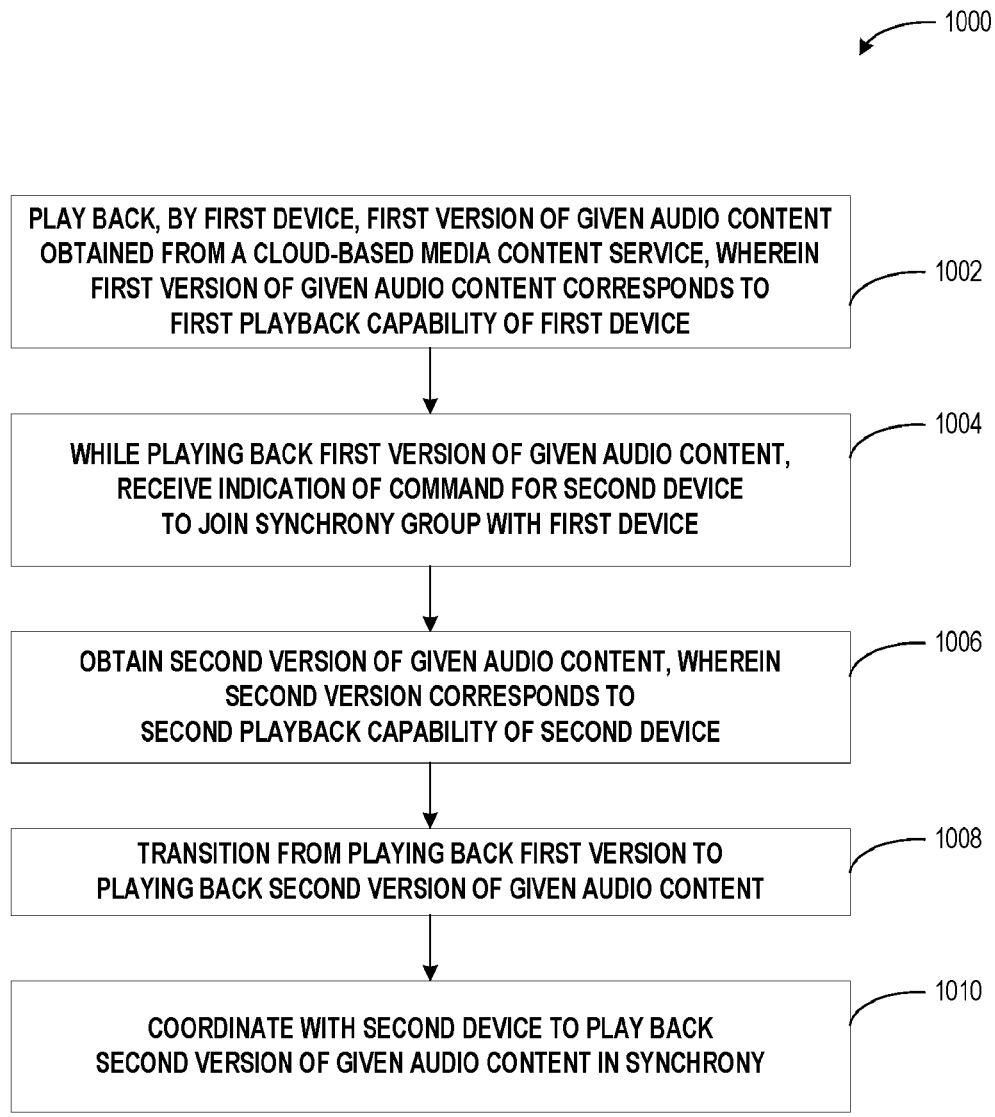
FIG. 10 is a flow diagram showing example operations for adaptive enhancement of audio content based on playback device capability according to yet another embodiment of the disclosed technology.

FIG. 10 depicts a flowchart of an example process 1000 for enhancing grouped playback of audio content based on the respective playback capabilities of playback devices in a synchrony playback group.

The example process 1000 may begin at block 1002, where the first playback device may play back a first version of given audio content. The first version of the given audio content may have been obtained from a cloud-based media service as described above based on a first playback capability that corresponds with the first playback device's respective playback capability. In some examples, the first playback device may be configured for individual playback of the first version of the given audio content. In other examples, the first playback device may be configured as a group coordinator to coordinate with one or more other group member playback devices for the synchronous playback of the first version of the audio content.

At block 1004, while playing back the first version of the given audio content, the first playback device may receive an indication of a command for a second playback device to be grouped with the first playback device for synchronous playback of the given audio content. As noted above, the second playback device may constitute an additional group member to be added to an already-existing synchrony group, or the second playback device may form a new synchrony group with the first playback device. In either situation, the first playback device may determine, according to one or more of the various characteristics and criteria discussed above, that it will serve (e.g., continue to serve or be designated to serve) as the group coordinator of the synchrony group. As described above, the first playback device, in its capacity as group coordinator, may determine a second playback capability that corresponds to the respective playback capability of the second playback device. The second playback capability of the second playback device may be less sophisticated than the first playback capability of the first playback device. Further, the first playback device may determine, based on the second playback capability, that the second playback device is not capable of playing back the first version of the given audio content. For instance, the first version of the given audio content may have a relatively high bit rate that is beyond the capability of the second playback device.

At block 1006, the first playback device may obtain a second version of the given audio content that corresponds with the second playback capability of the second playback device. In this regard, the second version of the audio content may be a lower-quality version than the first version of the audio content. For instance, continuing the example above, the first playback device may obtain a second version of the given audio content with a lower bit rate. The second version may be obtained from either the first media content source or a second media content source.

At block 1008, after obtaining the second version of the given audio content, the first playback device may transition from playing back the first version of the given audio content to playing back the second version of the given audio content, which may involve stopping playback of the first version of the given audio content at a determined audio boundary and beginning playback of the second version of the given audio content. Further, where the first playback device is also acting as group coordinator for other, already-grouped playback devices, transitioning to the second version of the given audio content may also involve transitioning from transmitting the first version of the given audio content (e.g., from a first buffer) to the other group members to transmitting the second version of the given audio content (e.g., from a second buffer) to the other group members, as discussed above.

At block 1010, the first playback device may coordinate with the second playback device (and any other group members) to play back the second version of the given audio content in synchrony, which may involve transmitting playback timing and/or clock information as described above with respect to FIG. 5.

In the ways described above, and as will be described below with reference to FIGS. 11-13B, grouped playback of audio content may be monitored and adapted to accommodate different and/or fluctuating network characteristics, device characteristics (including playback capabilities), and/or group characteristics in order to facilitate playback of the highest possible quality of audio content at any given time, thus providing an improved user listening experience.

IV. Example User Interface for Managing Media Playback Experience

As previously mentioned, when engaged in media playback experiences, users typically expect media playback devices to provide media content (which may comprise any of the types of audio content previously discussed) that is of a high quality and in a manner that is seamless and continuous. During the course of playback, it is possible that the quality of media content that is being played back (e.g., streamed from a cloud-based media content service) may change due to fluctuations in various characteristics of the media playback system (e.g., playback device characteristics, network characteristics, synchrony group characteristics, etc.). For instance, a playback device of a media playback system that is part of a synchrony playback group may experience an attenuated network connection, in which case the media playback system may cause modifications to playback of media content by the playback device (e.g., cause the playback device to play back a relatively lower-quality version of the media content, and/or cause the playback device to temporarily drop out of the playback group, etc.).

SONOS, Inc. developed such dynamic content modification techniques to be performed automatically by a media playback system without user involvement so that media content may be seamlessly and continuously provided to the user while accommodations for fluctuations in media playback system characteristics are made, thereby reducing user-perceived interruptions to a media playback experience, some of which have been previously discussed herein. While continuing to develop technology related to support and enhancement of high-quality media content, SONOS, Inc. has recognized that many modern users prefer to be informed about and involved in managing media playback experiences, and particularly aspects of media playback experiences related to content quality management.

With that in mind, SONOS, Inc. has developed new technology for facilitating user-notification, user-involvement, and user-management of media content quality and media content quality characteristics of a media playback system.

At a high level, the technology disclosed herein comprises a media content quality indicator that may function as an identifier of media content quality and a quick-access tool for managing streaming quality settings and media playback characteristics. The disclosed technology enables users to manage various media playback characteristics of the playback devices of a media playback system. In this regard, the disclosed technology may be used to monitor and manage media playback characteristics of a single playback device or of two or more playback devices that are grouped for synchronous playback.

In an instance where two or more media playback devices are grouped for synchronous playback of media content, monitoring and/or management of media playback characteristics may be particularly desirable, as will be described in more details in examples herein.

In a playback group comprising at least two playback devices that are grouped for synchronous playback of media content, at least one playback device may serve as a group coordinator and each other playback device of the group may serve as a group member. For example, returning briefly to FIG. 5, the playback device 510 may serve as the group coordinator, and the playback devices 512 and 514 may serve as group members. As shown in FIG. 5, the local media playback system 500 may also include a control device 509 that includes a user interface 510 for enabling a user to interact with the media playback system 500. The control device 509 and user interface 510 may resemble the control device 130a and user interface 133 of FIGS. 1H and 1I.

In the examples that follow, the playback device 510 will generally be referred to as a group coordinator, although it should be understood that either of the playback devices 512 or 514, or any other playback device(s) of the playback group 503 not shown in FIG. 5, may serve as a group coordinator in other examples. Further, although the playback group 503 shows only two additional group members 512 and 514 grouped with the group coordinator 510 for synchronous playback, it should be understood that any number of playback devices may be included in the playback group 503. As group coordinator, the playback device 510 may generally be responsible for various tasks, including but not limited to identifying (and/or retrieving) media content for playback by the group members of the playback group, monitoring playback device characteristics of one or more group members, monitoring network characteristics associated with the network device and one or more group members, monitoring group characteristics, and dynamically modifying media content for playback based on a change in one or more characteristics. To facilitate performance of these and other tasks, a playback device (such as the group coordinator 510 of FIG. 5) may generally have access to numerous media content sources, such as audio and video streaming services, content libraries, and local device storage, among other examples.

a. Media Content Quality Indicator (Quality Badge)

Many of the media content sources available to a playback device (such as the group coordinator 510) may contain multiple versions of the same media content, such as multiple versions of a particular song by a particular artist, multiple versions of an audio track that accompanies a particular movie, or multiple versions of a particular podcast episode. The different versions of given media content may have different audio characteristics, which may include a bitrate, a sample rate, a bit depth, and/or a number of output channels, etc. For example, a first version of the given media content may have a first bit depth, sample rate, and/or number of audio output channels, whereas a second version of the given media content may have a second bit depth, sample rate, and/or number of audio output channels. In general, the value of these types of audio characteristics may indicate the level of quality of given media content. For example, a bitrate of 3,000 kilobits per second (kbps), a sample rate between 96 kHz and 352.8 kHz, and a bit depth of 24 bits may generally indicate relatively high-quality media content. Conversely, a bitrate ranging between 1,000 kbps and 320 kbps or 160 kbps, a sample rate between 44.1 kHz and 48 kHz, and a bit depth of 16 bits may generally indicate relatively lower-quality media content.

Further, different versions of media content that are offered by different media content sources may be categorized into different quality tiers of media content quality that generally range from relatively high-quality levels to intermediate and relatively lower-quality levels, such as the example quality levels mentioned above. For example, Spotify® currently offers various different tiers of media content quality based on subscription status and/or streaming device capability, with its highest-quality tier, identified as "Spotify HiFi," corresponding to audio with an average bitrate of 320 kbps. As another example, Amazon Music currently offers various tiers of media content quality based on subscription status, including a "standard" quality tier "Amazon Music SD" that corresponds to audio with bitrates of up to 320 kbps, a relatively higher-quality tier "Amazon Music HD" that corresponds to audio with an average bitrate of 850 kbps, and an even higher-quality tier "Amazon Music Ultra HD" that corresponds to audio with an average bitrate of 3,730 kbps. As yet another example, Apple Music offers various tiers of media content quality based on subscription status and/or streaming device capability, including a "standard" quality tier "AAC" (Advanced Audio Codec) that corresponds to lossy audio with bitrates of up to 256 kbps and a relatively higher-quality tier "ALAC" (Apple Lossless Audio Code) tier that corresponds to lossless audio with bitrates of up to 9,216 kbps. 24-bit/192 kHz. Numerous other examples are also possible and the example categorizations discussed above may also change over time.

As mentioned above, the technology disclosed herein relates to facilitating user management of media content quality characteristics of a media playback system. In practice, a user may manage media content quality characteristics by accessing a user interface (which may resemble the user interface 133 of FIGS. 1H and 1I or the user interface 510 of FIG. 5) that may be displayed at a control device (which may resemble the control device 130 of FIGS. 1H and 1I or the control device 509 of FIG. 5). At a high level, the disclosed technology comprises a media content quality indicator that provides information about media content quality and/or media playback characteristics of a media playback system.

The media content quality indicator—which may be referred to herein as a "quality badge"—may provide information about a highest-available media content quality level and a current media content quality level. The quality badge may take various forms. In general, the quality badge may include (i) a representation of a highest-available media content quality level and (ii) a representation of whether or not a current version of media content being played back matches the highest-available media content quality level. These representations will be explained in more detail below.

The representation of the highest-available media content quality level may take various forms. As one possibility, the representation of the highest-available media content quality level may take the form of a textual label comprising alphabetical and/or alphanumeric characters that are indicative of a particular quality level of media content. As another possibility, the representation of the highest-available media content quality level may take the form of an image label, such as an icon or logo, that is indicative of a particular quality level of media content. As yet another possibility, the representation of the highest-available media content quality level may take the form of a combination of a textual label and image. Other examples are also possible.

The form that the representation of the highest-available media content quality level takes may be based on various factors. As one possibility, the representation of the highest-available media content quality level may be based on one or more media content quality tiers offered by a media content source from which media content is currently being streamed. As previously discussed, different cloud-based media content providers typically offer different quality tiers of media content. When media content is being streamed from such a cloud-based media content source for playback, the form of the representation of the highest-available media content quality level may take the form of a textual and/or image label that indicates the highest quality tier that is offered by that cloud-based media content source.

As another possibility, the representation of the highest-available media content quality level may be based on the user's subscription information for the cloud-based media content source from which media content is being streamed for playback. During configuration of the media playback system, the user may have linked one or more cloud-based media content sources such that the media playback system (e.g., a playback device, a network device, or a remote-computing device of the media playback system) may access each media content source (e.g., communicate with a remote computing device associated with the media content source) and information about the user's subscription for that media content source. Such subscription information may indicate a particular subscription service level offered by the media content source to which the user is currently subscribed, as well as which media content quality tiers are accessible to that subscription service level. For example, a cloud-based media content source from which media content is currently being streamed may offer a free subscription service level to a "standard" tier that provides access to relatively lower-quality media content, a first paid subscription service level to an "intermediate" tier that provides access to relatively higher-quality media content, and a second paid subscription service level to a "high" tier that provides access to even higher-quality media content, which may be the highest quality tier offered by the cloud-based media content source. For example, the user may be subscribed to the first paid subscription level corresponding to the "intermediate" tier of media content. In one implementation, the representation of the highest-available media content quality level may take the form of a textual and/or image label that indicates the "intermediate" tier, because that is the highest quality tier available to the user based on the user's subscription.

As yet another possibility, the representation of the highest-available media content quality level may be based on both (i) the highest quality tier offered by the media content source from which media content is being streamed for playback and (ii) available upgrades to the user's current subscription information for that media content source. Continuing from the example above where the user is subscribed to the first paid subscription level corresponding to the "intermediate" tier, in another implementation, the representation of the highest-available media content quality level may take the form of a textual label and/or image label that indicates the "high" tier, which is the highest quality tier offered by the cloud-based media content source, even if the user is not currently subscribed to the second paid subscription level corresponding to the "high" tier of media content. In such an implementation, the representation of the highest-available media content quality level may serve to indicate that a higher-quality version of media content is available from the cloud-based media content source upon an upgrade of the user's current subscription service level to a higher tiered subscription service level. In some instances of this implementation, the representation of the highest-available media content quality level may also include information about one or more higher-tiered subscription service levels that are available to the user and perhaps also information about how to complete the upgrade to one of those subscription service levels.

As still another possibility, the representation of the highest-available media content quality level may be based on a media playback characteristic, such as a playback device characteristic, a network characteristic, and/or a playback group characteristic. For instance, a playback device may be generally capable of playing back higher-quality media content such that the representation of the highest-available media content quality level corresponds to a higher-quality tier. However, the playback device may experience a media playback characteristic change, such as reduced network connection or reduced processing power, that temporarily impedes the playback device's capability to play back higher-quality media content. In such an instance, the representation of the highest-available media content quality level may reflect a relatively lower-quality tier that corresponds to the playback device's current capability.

The representation of the highest-available media content quality level may be based on other factors as well.

The media content quality indicator, or quality badge, may additionally include a representation of whether or not the highest-available media content quality level (as described above) is currently being streamed—in other words, whether or not the quality level of the current version of media content that is being played back matches the highest-available media content quality level. In this regard, the media content quality indicator may include a representation of either a first state or a second state. The representation of the first state may indicate that the quality level of the current version of media content being played back matches the highest-available quality level. The representation of the second state may indicate that the quality level of the current version of media content being played back by the playback device does not match the highest-available quality level. The representations of the first and second states may generally be inversely related and may take various forms.

In one implementation, the representations of the first and second state may take the form of inversely highlighted visual indications. For example, the representation of the first state may take the form of a highlighted visual indication, such that the background of the quality badge is highlighted with a different color (e.g., black, green, gray, etc.). Inversely, the representation of the second state may take the form of an un-highlighted visual indication, such that the background of the quality badge remains unchanged (e.g., unhighlighted, transparent, etc.).

In another implementation, the representations of the first and second state may take the form of inversely bolded visual indications. For example, the representation of the first state may take the form of a bolded visual indication, where the textual and/or image components of the quality badge appear as bolded text and/or lines. Inversely, the representation of the second state may take the form of an un-bolded visual indication, where the textual and/or image components of the quality badge remain unchanged. Numerous other examples are possible.

In some implementations, it is possible that a quality badge may include a representation of only one state. For instance, in the example above where a playback device may be temporarily impeded from playing back higher-quality media content and the representation of the highest-available media content quality level thus reflects a relatively lower-quality tier that corresponds to the playback device's current playback capability, the quality badge may include only a first state that takes the form of a highlighted visual indication of the relatively lower-quality tier, thereby indicating that the currently-streaming media content is lower-quality level media content.

Figure 11A:
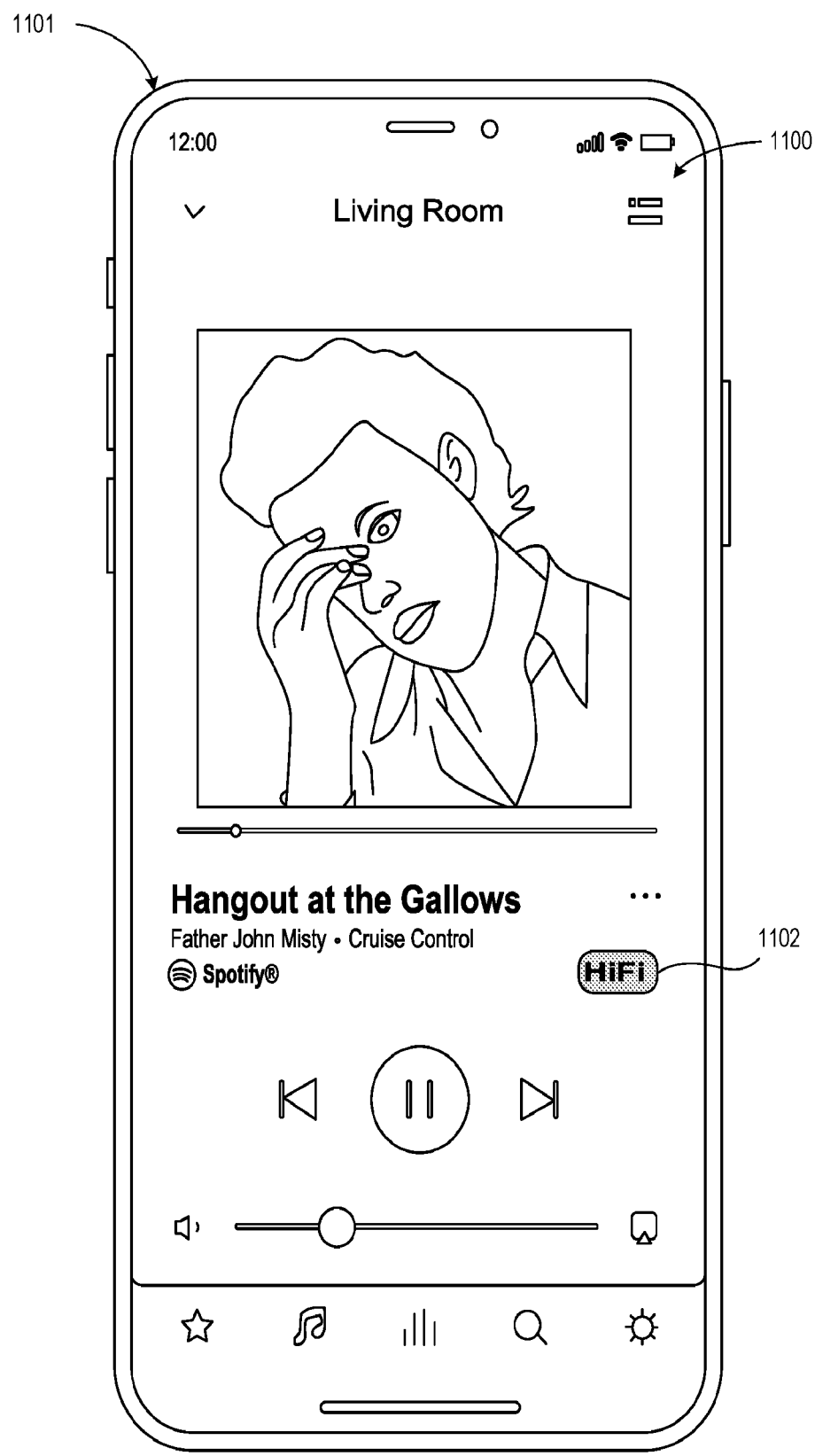
FIG. 11A depicts an example view of an example user interface in accordance with aspects of the disclosed technology.
Figure 11B:
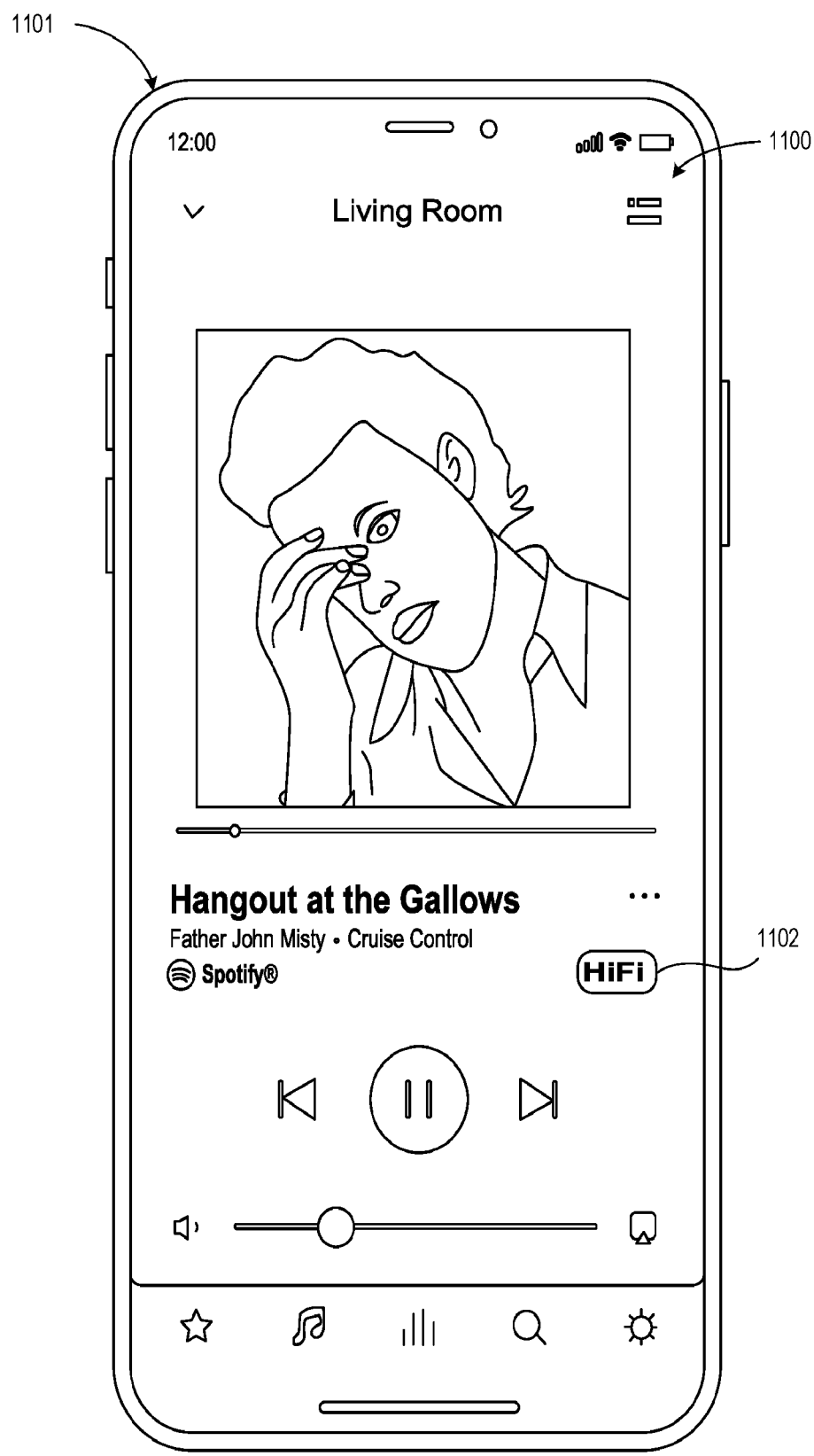
FIG. 11B depicts another example view of an example user interface in accordance with aspects of the disclosed technology.

FIGS. 11A-11B illustrate one example of a media content quality indicator, or quality badge, as described above where (i) the representation of the highest-available media content quality level takes the form of a textual label based on the highest quality tier offered by the media content source from which media content is currently being streamed and (ii) the representations of the first and second states take the form of inversely highlighted visual indications. FIGS. 11A-11B depict an example user interface 1100 that may be used to manage media playback characteristics of a media playback system (not shown), which may resemble the media playback system 500 of FIG. 5. The user interface 1100 may resemble the user interface 133 of FIGS. 1H and 1I, and may be displayed at a control device 1101, which may resemble the control device 130a of FIGS. 1H and 1I or control device 509 of FIG. 5.

Turning first to FIG. 11A, the user interface 1100 may display a view comprising various aspects of information about an ongoing media playback experience where media content is being played back by at least one playback device of a media playback system. Such information may include at least one playback zone, information about the media content (e.g., artist, album art, track information, etc.), and various playback controls and configuration options. The user interface 1100 may also display information about the media content source from which the media content is being streamed. As shown in FIG. 11A, the user interface 1100 indicates that the media content is currently being streamed from the cloud-based media content source Spotify®. Additionally, the user interface 1100 may display a quality badge 1102, which includes a representation of the highest-available quality level and a representation of whether or not the quality level of the media content that is currently being streamed matches the highest-available quality level, as described above. As shown in FIG. 11A, the quality badge 1102 comprises an encircled textual label that reads "HiFi," which represents the highest-available quality level of media content currently available for streaming from Spotify®. Furthermore, the quality badge 1102 is highlighted (e.g., in a green color), which represents the first state, indicating that the quality level of the version of the media content currently being played back matches the highest-available quality level. In other words, the color-highlighted visual indication of the quality badge 1102 indicates that the version of the song "Hangout at the Gallows" that is currently being played back is a "HiFi" version, as provided by Spotify®.

While the media playback experience of FIG. 11A is ongoing, fluctuations in media playback characteristics (e.g., changes in playback device characteristics, network characteristics, and/or a playback group characteristics, etc.) may necessitate adaptive action in order to maintain continuous playback and reduce user-perceived audio interruptions. Such action may include, as some examples, modifying the version of media content that is being played back or modifying the configuration of a synchrony group that is playing back the media content. More information about fluctuations in media playback characteristics and adaptive behavior can be found in previously-mentioned U.S. Pat. No. 10,873,820, in addition to the discussion above. As one example, a change in a media playback characteristic (e.g., reduced network bandwidth) may result in adaptive behavior that comprises playing back a lower-quality version of media content. In such an example, the lower-quality version of the media content may no longer match the highest-available quality level. As a result, the quality badge 1102 may be updated to include a representation of the second state, rather than the first state. FIG. 11B depicts an example of the quality badge 1102 representing the second state. As shown in FIG. 11B, the quality badge 1102 is transparent instead of highlighted, thus indicating that the current version of the song "Hangout at the Gallows" that is being streamed is not a "HiFi" version, as provided by Spotify®. Nevertheless, the presence of the quality badge 1102 indicates that a "HiFi" version is available through Spotify® and/or accessible through the present subscription service level.

In some implementations, the user interface 1100 may display a notification, in addition to the change in the quality badge 1102, that informs the user that a change to a media playback characteristic has been detected and that follow-up adaptive behavior has been performed by the media playback system. The notification may take various forms. As one possibility, the notification may take the form of a pop-up notification that includes information about the detected change and/or the follow-up adaptive behavior that was performed. As another possibility, the notification may take the form of a banner notification that includes information about the detected change and/or the follow-up adaptive behavior that was performed. As yet another possibility, the notification may take the form of a hyperlink that may be clicked on by the user to obtain information about the detected change and/or the follow-up adaptive behavior that was performed. As still another possibility, the notification may take the form of a combination of any of the previously described notifications. Numerous other examples are also possible.

Figure 11C:
FIG. 11C depicts yet another example view of an example user interface in accordance with aspects of the disclosed technology.

FIG. 11C depicts one example of a notification that may be displayed to the user via the user interface 1100 when a change to a media playback characteristic has been detected and follow-up adaptive behavior has been performed. As shown in FIG. 11C, such a notification may take the form of a pop-up banner notification 1103 that indicates to the user that "An audio interruption occurred." The notification 1103 may further include a hyperlink, such as the hyperlink displaying the text "Learn More" shown in FIG. 11C, that may be selected by the user to obtain additional information about the "audio interruption," which may present information about one or more media playback characteristic changes that were detected, any adaptive behavior that was implemented in response to the detection, and perhaps also information about actions that the user may take, which will be discussed in more detail further below with respect to FIG. 11F.

While a media content quality indicator, or quality badge, has been described above as being displayed in the context of the user interface views shown in FIGS. 11A, 11B, and 11C, it should be understood that the quality badge may be included in any view of the user interface 1100 that may display information about media content, either generally or in association with a given playback device that is configured for playback of media content. In this regard, the user interface 1100 may include a respective quality badge for each playback device of a media playback system.

Figure 11D:
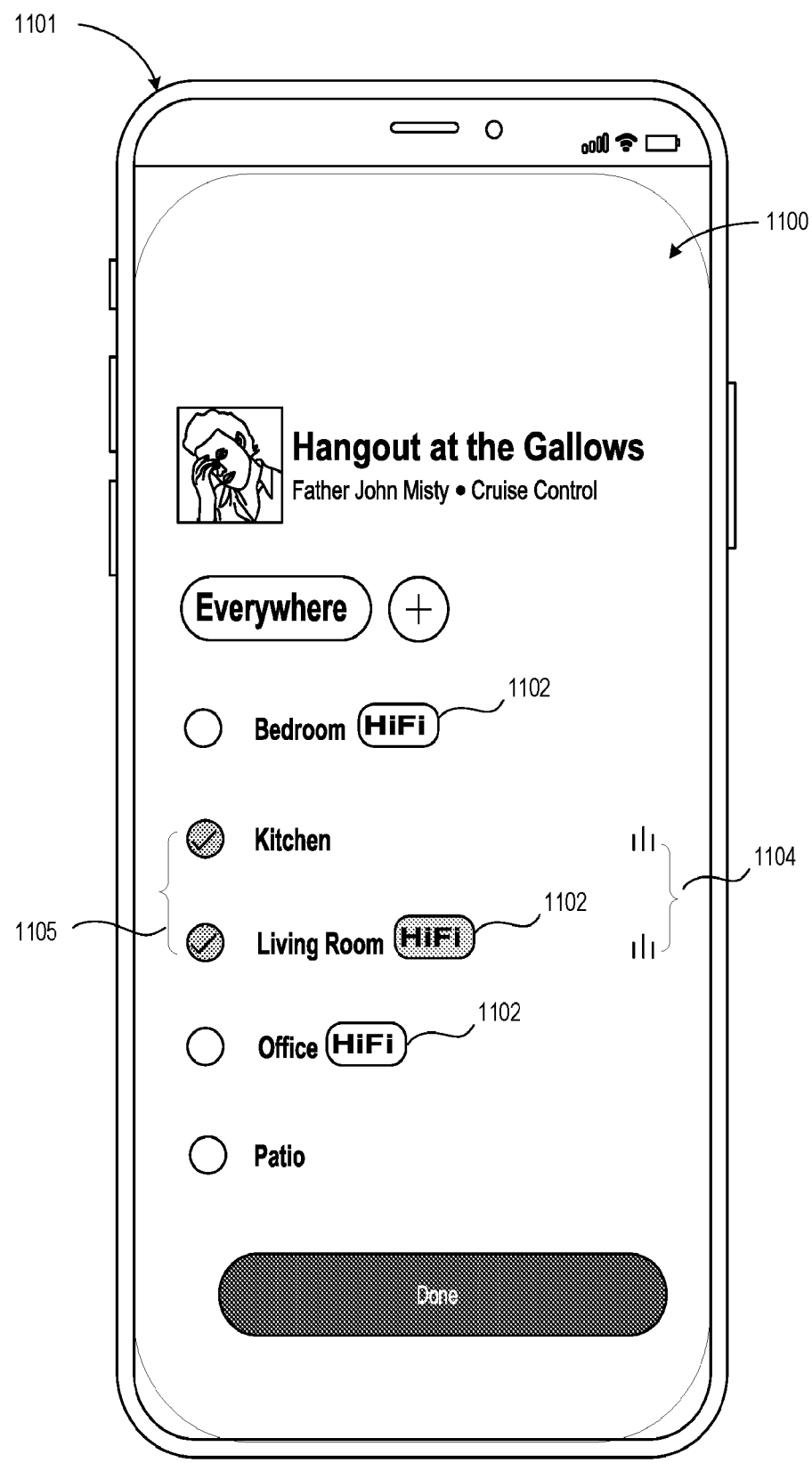
FIG. 11D depicts yet another example view of an example user interface in accordance with aspects of the disclosed technology.

FIG. 11D depicts an example view of the user interface 1100 that displays playback devices of the media playback system discussed above with reference to FIGS. 11A-11C. As shown in FIG. 11D, the media playback system may include five playback devices, corresponding to playback zones identified as "Bedroom," "Kitchen," "Living Room," "Office," and "Patio." In the example shown in FIG. 11D, the playback devices of "Kitchen" and "Living Room" may be grouped for synchronous playback of media content, indicated by selected check mark indicators 1105 and "now playing" graphic indicators 1104. Further, for each of the playback devices of "Bedroom," "Living Room," and "Office," the user interface 1100 may include a respective quality badge 1102, which may serve to indicate that each of those playback devices is capable of playing back "HiFi"-quality media content. For instance, each of the playback devices of "Bedroom" and "Office" has a respective "HiFi" quality badge 1102 but is not selected for grouped playback and does not have a "now playing" indicator, which may serve to indicate that while neither of those playback devices is currently playing back media content, if either or both were to be selected for individual or grouped playback, each would be capable of playing back "HiFi"-quality media content. In the implementation of FIG. 11D, the respective quality badges 1102 of the "Bedroom" and "Office" playback devices are shown to display a representation of the second state, which may serve to indicate that no media content is currently being played back by those playback devices. Still further, no corresponding quality badge is displayed for the playback devices of "Kitchen" and "Patio," which may serve to indicate that those playback devices are unable to play back "HiFi"-quality media content, as provided by Spotify®.

In some implementations, such as the one shown in FIG. 11D, when grouped for synchronous playback, each playback device may play back a different version of the media content based on each device's respective capability to play back higher-quality media content. For example, although the payback devices of the "Living Room" and "Kitchen" are grouped for synchronous playback of media content, the presence of a quality badge 1102 that represents the first state for the "Living Room" playback device and the absence of a quality badge for the "Kitchen" playback device collectively indicate that the "Living Room" playback device is currently playing back a relatively higher-quality version of the media content and the "Kitchen" playback device is currently playing back a relatively lower-quality version of the media content. However, in other implementations, each playback device of a synchrony group may play back a single version of media content based on a highest collective playback capability of the synchrony group. In such implementations, the "Living Room" playback device may play back the same relatively lower-quality version of the media content as the "Kitchen" playback device, and the quality badge 1102 of the "Living Room" playback device may represent the second state, thus indicating that the "Living Room" playback device, while capable of playing back "HiFi"-quality media content, is currently playing back lower-quality media content.

A playback device may be unable to play back relatively higher-quality media content for various reasons, including reasons related to one or more playback device characteristics of the playback device. For example, a playback device may be an older model playback device or may not have received a software update required to play back certain higher-quality media content. Other examples are also possible, as described above and discussed in U.S. Pat. No. 10,873,820, incorporated above.

In this way, the user interface 1100 may include a quality badge for each playback device of a media playback system to indicate whether or not the playback device is currently playing back (and/or capable of playing back) media content that is of a quality level that matches a highest-available quality level.

b. Quality Badge: Quick Access

In addition to providing information about the highest-available quality level and whether or not the quality level of currently-streaming media content matches that highest-available quality level, the media content quality indicator, or quality badge, may serve as a quick-access tool that enables a user to obtain information about current streaming settings and media playback system characteristics, customize an ongoing media playback experience, and in some instances, perhaps also take action to enhance conditions for playback of higher-quality media content. In this regard, the quality badge may be a selectable indicator that, when selected by the user, causes a set of information related to media content quality to be presented to the user. This set of information may include various aspects.

In one aspect, the set of information may include streaming settings. These streaming settings may include a set of one or more available media content quality level options and an indication of a currently-selected option that identifies a current media content quality level for media content that is retrieved for playback by the media playback system. The set of media content quality level option(s) may be based on media content quality levels provided by the media content service from which media content is currently being streamed and may generally include an option for retrieving relatively lower-quality level media content, at least one option for retrieving relatively higher-quality level media content, and perhaps also an option for retrieving the highest-available quality level media content. However, it should be understood that other and/or additional options may also be included.

The currently-selected option may have been selected in various ways. As one example, the currently-selected option may have been previously selected by the user (or a different user), perhaps during initial configuration of the media playback system or during a subsequent adjustment of the settings. As another example, the currently-selected option may have been pre-selected as a default system setting. As yet another example, the currently-selected option may have been selected at the time of linking the media content source from which media content is currently being streamed. Other examples are also possible.

Additionally, the set of media content quality level option(s) may indicate if any options other than the currently-selected option are available for selection. In some instances, one or more other options may be available for selection, in which case the user may select an alternative option as the default media content quality level for streamed media content. This may be desirable, for example, if the user expects a change in media playback characteristics to occur. For instance, the user may intend to move from an indoor playback environment to an outdoor playback environment and initiate (or continue) a media playback experience with a portable playback device. Because the portable playback device may have lower processing power, battery power, and/or be more likely to experience attenuated network bandwidth as compared to a stationary playback device located in the indoor playback environment, the portable playback device may be more prone to experiencing conditions that may impede the portable playback device's ability to play back higher-quality media content. Therefore, the user may preemptively adjust the streaming settings by selecting the quality badge to quickly access the streaming settings and then selecting a media content quality level option that corresponds to a lower-quality level. At a later time, the user may again adjust the streaming settings by selecting the quality badge to access the streaming settings and then selecting a media content quality level option that corresponds to a higher-quality level. Other examples are also possible.

In other instances, options other than the currently-selected option may not be available for selection, in which case each other option may be visually indicated as an unavailable option. For example, each other option may be shown as grayed out, struck out, accompanied by a textual label indicating that the option is currently unavailable for selection, or a combination of the above. Other examples are also possible.

It should be understood that the streaming settings discussed above may be accessed in ways other than selecting the quality badge. For example, the streaming settings may be accessed from a home view of the user interface 1100 or from a general settings view of the user interface 1100. Advantageously, enabling user access to the streaming settings via selection of the quality badge provides a user with a quick and easy way to access the streaming settings while a media playback experience is ongoing so as to obtain quality-related information about currently-streaming media content.

In another aspect, the set of information related to media content quality that may be presented upon selection of the quality badge may include a set of media playback characteristics. The set of media playback characteristics may be displayed in various ways, including as an itemized list, in a drop-down menu, or arranged in one or more columns, among other possibilities. Each media playback characteristic in the set may be represented by a textual label indicating the characteristic, and/or a graphical representation, such as an image, icon, or diagram, among other possibilities. Still further, each media playback characteristic in the set may include a respective status indicator that indicates a current status of that characteristic. The status indicator may take various forms.

As one possibility, the status indicator may take the form of a textual label that is descriptive of the current status. For example, the textual label may indicate that the current status of a particular media playback characteristic is "Weak," "Strong," "Supported," "Active," or "Undetected," among other possibilities. As another possibility, the status indicator may take the form of a color-based visual indicator. For example, the status indicator may include a red visual indicator to indicate that the current status of a particular media playback characteristic is weak, inactive, unsupported, or undetected, or a green visual indicator to indicate that the current status of the particular media playback characteristic is strong, active, or supported. Further, the status indicator may include a yellow visual indicator to indicate that the current status of a particular media playback characteristic, if pertinent, is between the respective characteristics indicated by the red and green visual indicators. As yet another possibility, the status indicator may comprise a combination of textual and color-based features. The status indicator may take many other forms as well, such as an emoji indicator (e.g., frown emoji for a weak status, smile emoji for a strong status, etc.) or a gradient scale (e.g., a red-to-yellow-to-green gradient scale with an indicator of where the current status falls within the scale). Numerous other possibilities exist.

In general, each characteristic that is included in the set of media playback characteristics may be related to playback of higher-quality media content. In this regard, a media playback characteristic that is included in the set of media playback characteristic(s) may be any one of various types of media playback characteristics.

As one possibility, a media playback characteristic may be a playback device characteristic. One example of a playback device characteristic may be a characteristic that is indicative of a connection between a group member playback device and a group coordinator playback device that is responsible for transmitting media content to the group member playback device. A status indicator for such a playback device characteristic may indicate the strength of the connection between the group member playback device and the group coordinator playback device. In general, a stronger connection between the group member and the group coordinator is more likely to enable reliable transmission of higher-quality media content from the group coordinator to the group member, thus increasing the reliability of playback of higher-quality audio. Another example of a playback device characteristic may be a characteristic that is indicative of a configurational relationship between two or more playback devices. A status indicator for such a playback device characteristic may indicate whether a particular media playback configuration (e.g., a home theater configuration such as one of the examples shown in FIGS. 2C and 2D) supports playback of higher-quality media content. Other examples of playback device characteristics are also possible, as discussed above and in U.S. Pat. No. 10,873, 820, incorporated above.

As another possibility, a media playback characteristic may be a network characteristic. One example of a network characteristic may be a characteristic that is indicative of a connection between one or more playback devices and a network device (e.g., a router or an access point, etc.). A status indicator for such a network characteristic may indicate the strength of the connection between the playback device(s) and the network device. In general, a stronger connection between the playback device and the network device is more likely to enable reliable retrieval of higher-quality of media content by the playback device via the network device, thus increasing the reliability of playback of higher-quality media content. Other examples of network characteristics are also possible, as discussed above and in U.S. Pat. No. 10,873,820, incorporated above.

As yet another possibility, a media playback characteristic may be a media content source characteristic. One example of a media content source characteristic may be a characteristic that is indicative of a media content source's high-quality media content services. A status indicator for such a media content source characteristic may indicate whether a given media content source currently offers high-quality media content. In some implementations, the status indicator may additionally include one or more levels of high-quality media content offered by the given media content source. Another example of a media content source characteristic may be a characteristic that is indicative of a network connection between the media playback system and the media content source. For instance, such a characteristic may indicate the strength of a data network connection (e.g., a wide area network connection) that is used for communication between the media playback system and the media content source (e.g., a remote computing device associated with the media content source) to retrieve media content for playback. Other examples are also possible.

Each media playback characteristic in the set of characteristics may be selectable by the user to obtain additional information about that media playback characteristic and its respective status. In some implementations, where a quality level of currently-streaming media content does not match a highest-available media content quality level, the respective status indicators of one or more media playback characteristics may indicate which particular media playback characteristic(s) are impeding playback of the highest-available quality level media content, and selecting those particular media playback characteristic(s) may enable a user to make one or more adjustments to enhance conditions for playback of the highest-available quality level media content. These features will be discussed in more detail below with respect to FIGS. 11E and 11F.

Figure 11E:
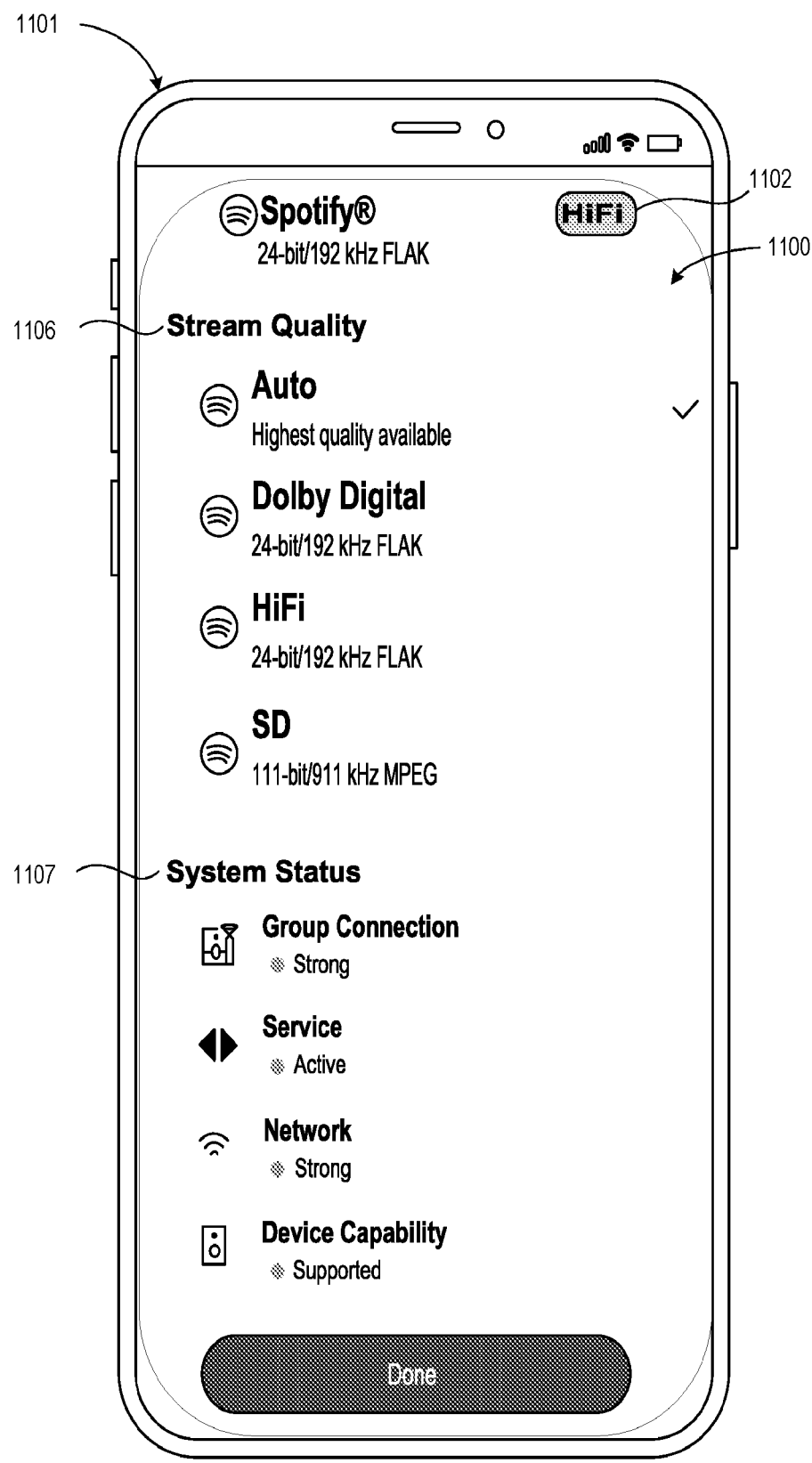
FIG. 11E depicts yet another example view of an example user interface in accordance with aspects of the disclosed technology.
Figure 11F:
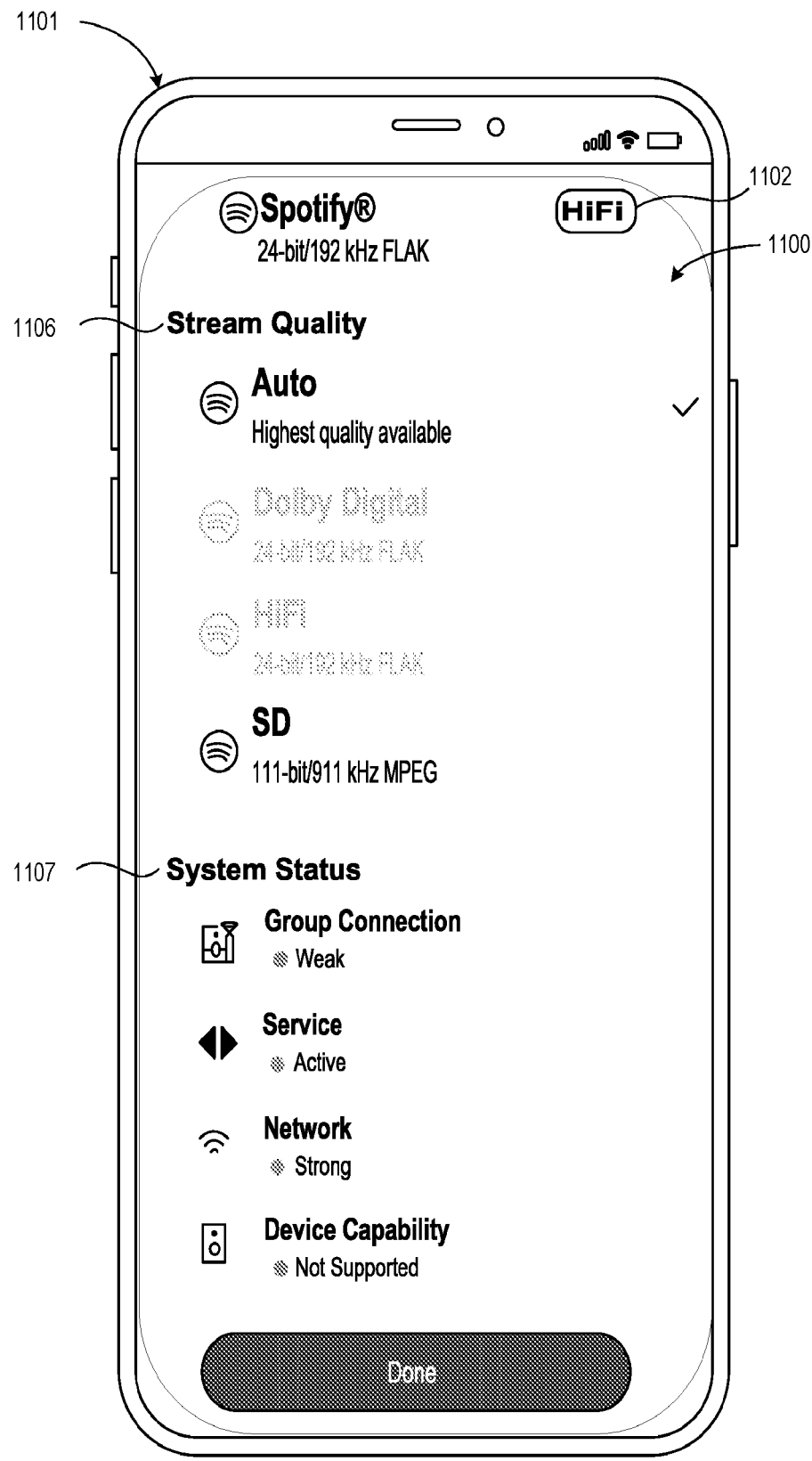
FIG. 11F depicts yet another example view of an example user interface in accordance with aspects of the disclosed technology.

FIG. 11E illustrates an example set of media content quality-related information that may be presented to a user via the user interface 1100 upon selection of a quality badge in the first state. FIG. 11F illustrates an example set of media content quality-related information that may be presented to a user via the user interface 1100 upon selection of a quality badge in the second state.

Turning first to FIG. 11E, one example of a view of user interface 1100 is depicted. This example view includes a set of media content quality-related information that may be presented to a user upon selection of a quality badge that represents the first state. For example, the user may have accessed the view shown in FIG. 11E by selecting the quality badge 1102 of FIG. 11A or 11D, where the quality badge 1102 indicates that media content currently streaming from Spotify® is "HiFi"-quality media content. As shown in FIG. 11E, the set of information may include a set of "Stream Quality" streaming settings 1106 and a set of "System Status" media playback characteristics 1107.

As shown in FIG. 11E, the set of streaming settings 1106 includes a list of four media content quality level options: (i) a first option labeled "Auto" which instructs the media playback system to retrieve media content of the highest-available quality level (which may depend on various factors as previously described), (ii) a second option labeled "Dolby Digital," which instructs the media playback system to retrieve surround sound media content comprising a quality level (e.g., resolution) of 24-bit/192 kHz, (iii) a third option labeled "HiFi," which instructions the media playback system to retrieve media content that comprises a quality level of 24-bit/192 kHz, and (iv) a fourth option labeled "SD," which instructs the media playback system to retrieve media content that comprises a quality level of 16-bit/96 kHz. The check mark icon displayed next to the first option "Auto" indicates that option is currently selected, and the media playback system will thus attempt to retrieve media content of the highest-available quality level for playback. Further, the second, third, and fourth options appear available for selection. Thus, if desired, the user may select an alternative media content quality level option.

As further shown in FIG. 11E, the set of media playback characteristics 1107 includes a list of four media playback characteristics. A first media playback characteristic labeled "Group Connection" may include a respective graphic and a respective status indicator that includes a textual label stating "Strong" and a visual indicator (e.g., a green-colored dot), which may indicate that a strong communicative connection exists between a group member playback device and group coordinator playback device that are grouped for synchronous playback of the currently-streaming media content. A second media playback characteristic labeled "Service" may include a respective graphic and a respective status indicator that includes a textual label stating "Active" and a visual indicator (e.g., a green-colored dot), which may indicate that the media content source Spotify® from which media content is currently being streamed offers high-quality media content. A third media playback characteristic labeled "Network" may include a respective graphic and a respective status indicator that includes a textual label stating "Strong" and a visual indicator (e.g., a green-colored dot), which may indicate that a strong communicative connection exists between at least one playback device that is currently playing back the media content and a network device of the media playback system and/or a remote computing device associated with the media content source. A fourth media playback characteristic labeled "Device Capability" may include a respective graphic and a respective status indicator that includes a textual label stating "Supported" and a visual indicator (e.g., a green-colored dot), which may indicate that all playback devices currently playing back media content are capable of playing back (e.g., "support" playback of) high-quality media content, that one or more alternative group configurations of a current playback group would support playback of high-quality media content, and/or that one or more peripheral devices of the control device (e.g., built-in speaker devices of the control device or external speaker devices to which the control device is currently connected) support playback of high-quality media content.

As mentioned above, each media playback characteristic in the set of media playback characteristics 1107 may be selectable by the user to obtain additional information about that media playback characteristic. For example, the "Group Connection" media playback characteristic may be selectable to access additional information about playback devices that are currently grouped for playback, the "Service" media playback characteristic may be selectable to access additional information about high-quality media content offered by the media content source from which media content is currently being streamed, the "Network" media playback characteristic may be selectable to access additional information about networked devices and related network characteristics, and the "Device Capability" media playback characteristic may be selectable to access additional information about the device capability of each playback device that is currently playing back media content.

The additional information about a selected media playback characteristic may be presented to the user in various ways. For example, the additional information may be presented as a pop-up window displayed to the user that is overlaid on the view shown in FIG. 11E. As another example, the additional information may be presented as different view of the user interface 1100. Other examples are also possible.

Turning now to FIG. 11F, another example view of the user interface 1100 is shown. This example view includes a set of media content quality-related information that may be presented to a user upon selection of a media content quality indicator, or quality badge, that represents the second state. For example, the user may have accessed the set of media content quality-related information shown in FIG. 11F by selecting the quality badge 1102 from a view resembling that of FIG. 11B or 11C, where the quality badge has been updated from a representation of the first state to a representation of the second state based on a detected change in a media playback characteristic, as previously described. As shown in FIG. 11F, the representation of the second state of the quality badge 1102 comprises an un-highlighted representation of the highest-available media content quality level "HiFi," as offered by Spotify®. Further, the set of information includes the set of "Stream Quality" streaming settings 1106 and the set of "System Status" media playback characteristics 1107 of FIG. 11E. Notably, however, at least one of the four media content quality level options and the four media playback characteristics have been updated.

As shown in FIG. 11F, the first media content quality level option "Auto" remains currently selected. However, the second and third options "Dolby Digital" and "HiFi" appear grayed out, thus indicating that neither "Dolby Digital"-quality media content nor "HiFi"-quality media content is currently available for playback. The fourth option "SD" remains available as a selectable option, indicating that "SD"-quality media content remains available for playback.

As further shown in FIG. 11F, the first media playback characteristic "Group Connection" has changed. Specifically, the respective status indicator for that characteristic now includes an updated textual label that states "Weak" and an updated visual indicator (e.g., a red-colored dot rather than a green-colored dot), which may indicate that the communicative connection between the group member playback device and the group coordinator playback device has weakened, thus impeding playback of higher-quality media content and causing playback of relatively lower-quality (e.g., "SD"-quality) media content instead.

Still further, the fourth media playback characteristic "Device Capability" has changed. Specifically, the respective status indicator for that characteristic now includes an updated textual label that states "Not Supported" and an updated visual indicator (e.g., a red-colored dot rather than a green-colored dot), which may indicate that one or more playback devices of a synchrony group is no longer capable of playing back "HiFi"-quality media content.

As mentioned above, each media playback characteristic in the set of media playback characteristics 1107 may be selectable by the user to obtain additional information about that media playback characteristic and its respective status. Thus, the "Group Connection" media playback characteristic may be selectable to access additional information about the connection between the playback devices that are currently grouped for playback. Such additional information may include information about the weakened connection, one or more factors that may have caused the connection to weaken, and/or identification of a particular playback device that experienced a media playback characteristic change. For example, the additional information may indicate to the user that a given playback device experienced group connectivity issues that weakened the connection between the given playback device and the group coordinator, which in turn reduced the given playback device's capability to retrieve higher-quality media content, thus causing a transition to playback of lower-quality media content. Additionally, the "Device Capability" media playback characteristic may be selectable to access additional information about the capabilities of the playback devices that are currently grouped for playback. Such additional information may include information about a changed capability, one or more factors that may have caused the changed capability, and/or identification of a particular playback device that experienced a media playback characteristic change. As one example, such additional information may take the form of a view similar to the view shown in FIG. 11D that lists the playback devices of the media playback system and each playback device's respective capability to play back "HiFi"-quality media content. Other examples are also possible.

In some implementations, the additional information may also include a set of one or more instructions and/or actions that the user may perform to improve conditions for playback of higher-quality media content. The set of one or more instructions and/or actions may take various forms. As one example, the set of instruction(s) and/or action(s) may take the form of a troubleshooting wizard that may be launched within or via the user interface 1100 and serves to present and perhaps also guide the user through a problem identification and troubleshooting process in an attempt to resume playback of higher-quality media content. As another example, the set of instruction(s) and/or action(s) may take the form of a list of possible solutions that may be attempted by the user, such as rebooting a particular playback device, or reconfiguring a playback group (e.g., removing a particular playback device from the group), among other possibilities. As yet another example, the set of instruction(s) and/or action(s) may comprise a pointer to an external resource (e.g., a link to an FAQ or Help webpage) for assistance. Other examples are also possible.

Figure 11G:
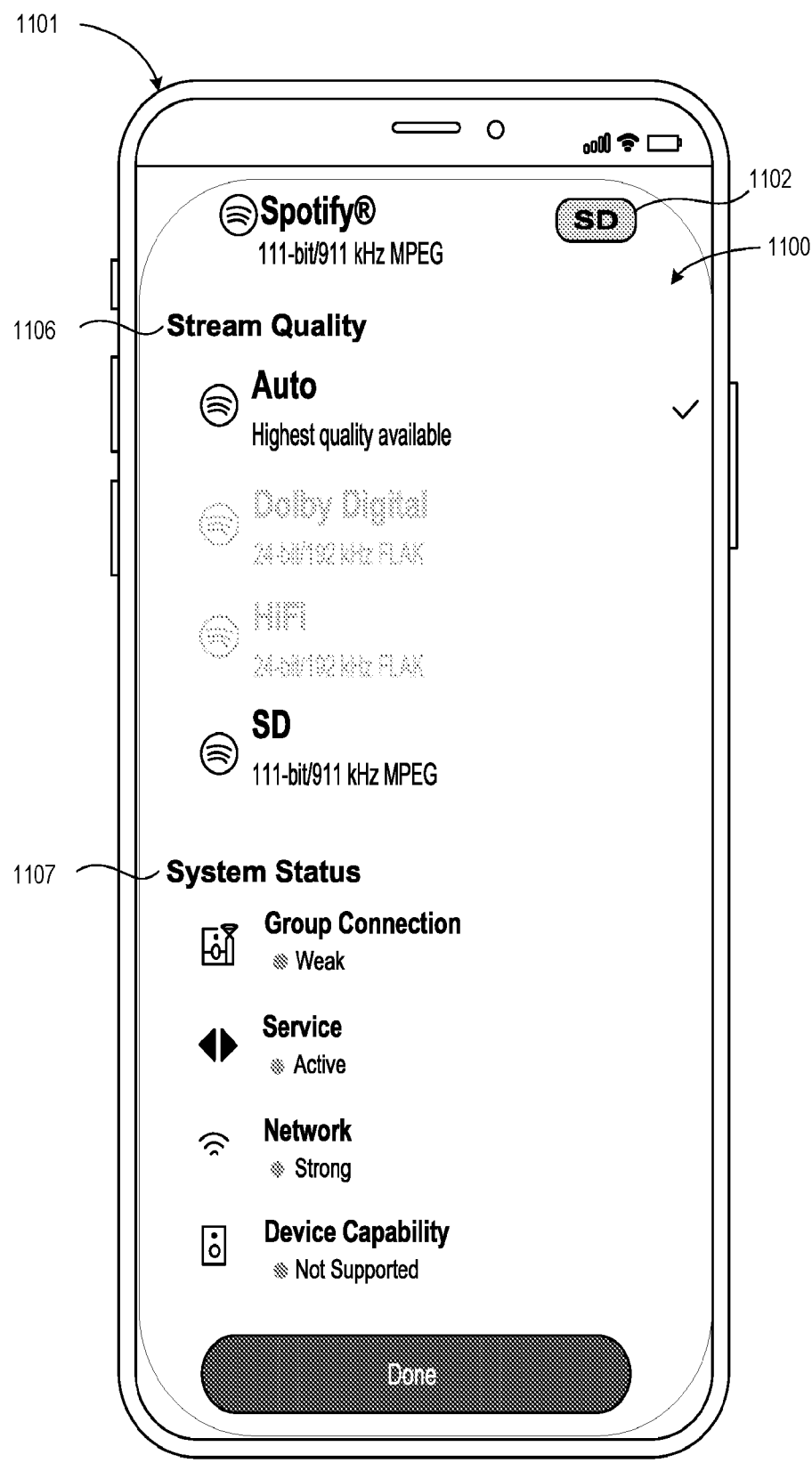
FIG. 11G depicts yet another example view of an example user interface in accordance with aspects of the disclosed technology.

FIG. 11G depicts an example view of the user interface 1100 that is similar to the user interface view shown in FIG. 11F and where media playback conditions are similar to the media playback conditions of the media playback experience of FIG. 11G, but where the quality badge 1102 takes a different form. In the implementation shown in FIG. 11G, the quality badge 1102 includes (i) a representation of a highest-quality level that reflects a current playback capability (e.g., where playback of higher-quality media content is temporarily impeded and thus currently-streaming media content comprises relatively lower-quality media content) and (ii) a representation of the first state. Therefore, as shown in FIG. 11G, quality badge 1102 comprises a color-highlighted representation of currently-streaming "SD"-quality level media content (e.g., standard definition), as offered by Spotify®. The additional information shown in FIG. 11G, such as the streaming settings 1106 and media playback characteristics 1107, may be similar to the additional information shown in FIG. 11F.

c. Quality Badge: Browsing and Filtering

In addition to the discussion above, a media content quality indicator, or quality badge, may serve other purposes as well.

As one example, a quality badge may be used to identify a quality level of media content that is displayed via the user interface 1100. As mentioned above, the user interface 1100 may enable a user to link a media playback system with one or more media content sources, including one or more cloud-based media content services such as Spotify®, Apple Music, Amazon Music, or Pandora, among other possibilities. Each such media content source typically offers media content of different quality levels. Based on those different quality levels, a respective quality badge may be associated with each unique quality level of each media content source. The respective quality badge may then be displayed in association with media content of that quality level for that media content source. Further, each quality badge may act as a selectable tool for obtaining information about that quality badge and its associated quality level, the media content source with which that quality badge is associated (and perhaps also other content quality-related information about that media content source), quality settings, and/or general information about media content quality.

As another example, a quality badge may be used for filtering media content. In general, the user interface 1100 may include a display of media content aggregated from two or more linked media content sources for browsing, searching, and/or playback selection by the user. One way the user interface 1100 may enable targeted browsing is by providing options to filter the media content. One type of filtering option may be an option to filter by media content quality.

After selecting the option to filter by media content quality, a user may be presented with a set of one or more content quality options. In general, a set of quality option(s) presented to the user may comprise a list of one or more quality badges and corresponding quality levels. The quality badges included in the list may be based on various factors. As one example, the list of quality badges may include all quality badges associated with each linked media content source. As another example, the list of quality badges may include all quality badges associated with a given linked media content source—which may be identified via another filtering option (e.g., a media content source filtering option). As yet another example, the list of quality badges may include only those quality badges corresponding to a quality level of which a given playback device is currently capable of playing back. Many other examples are possible.

Each content quality option may be presented as a selectable option, thereby enabling selection of multiple content quality options by which to filter media content. After completing selection of the desired quality options, the user may be presented with a set of media content that matches the selected content quality filtering options.

Figure 11H:
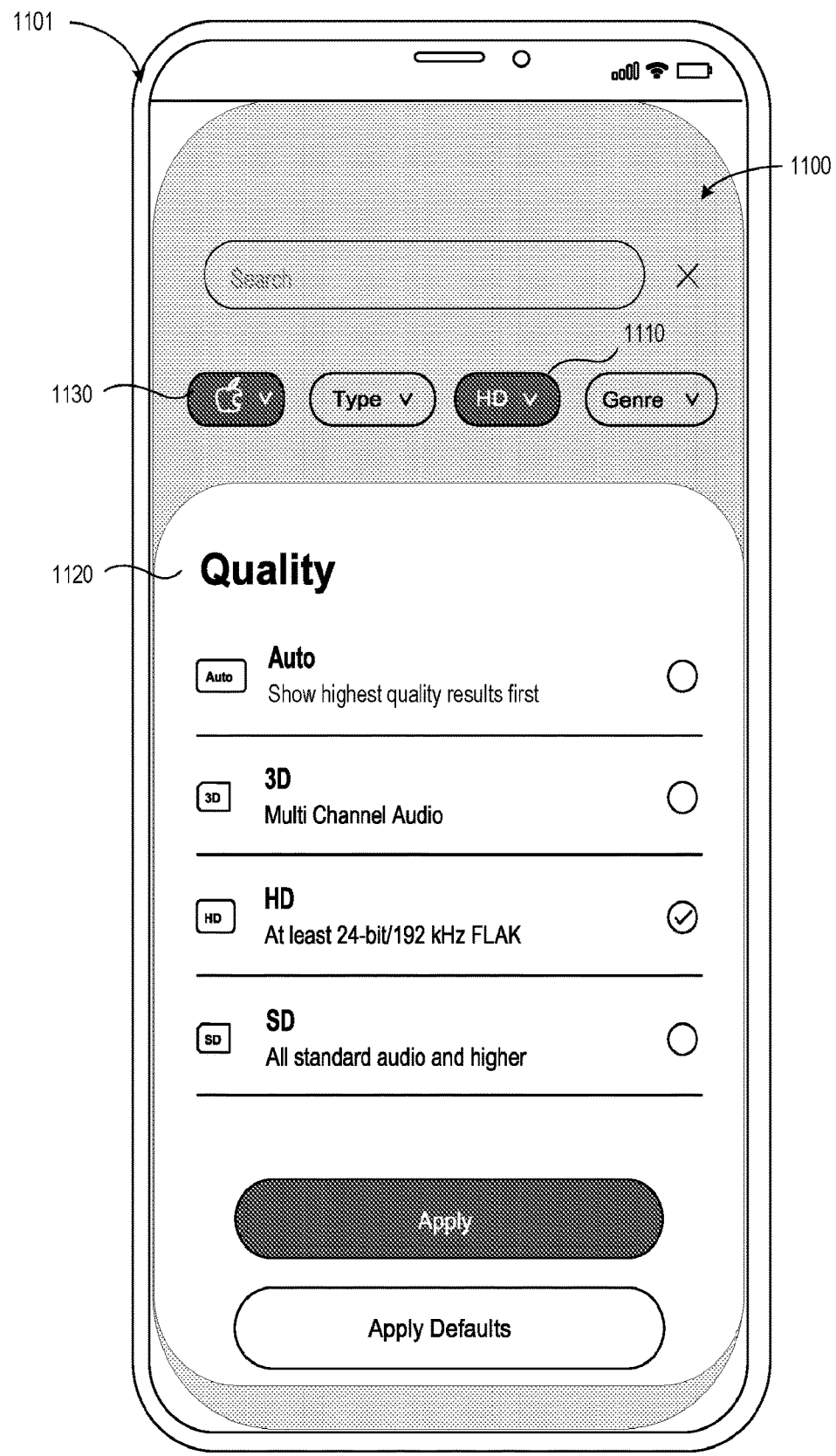
FIG. 11H depicts yet another example view of an example user interface in accordance with aspects of the disclosed technology.

FIG. 11H displays an example view of a set of one or more media content quality options that may be presented to a user after selecting a content quality filtering option. As shown, the user may have selected a content quality filtering option 1110, which may have then prompted selection of a set of media content quality options 1120 for presentation to the user. The content quality options 1120 may have been selected based on any one of the factors discussed above, such as selection of a particular media content source. As shown in FIG. 11H, the user may have previously selected a media content source filtering option 1130 to filter media content provided by Apple Music. Therefore, the content quality options 1120 may be associated with media content quality levels offered by Apple Music, which may include, for example, a "3D"-quality level for multi-channel media content, an "HD"-quality level for media content that is at least 24-bit/192 kHz resolution, and an "SD"-quality level for media content that is at least standard resolution. Additionally, the content quality options 1120 may include an "Auto" option to sort the filtered media content results by decreasing quality level. As shown in FIG. 11H, the user may have selected the "HD"-quality level option. After completing selection, the user may select an "Apply" user interface button to cause the user interface 1100 to apply the selected filters and display media content matching the selected filters. The user may then proceed to browse and/or select given media content for playback.

In the ways described above, the quality badge may enable a user to become more informed about different media content quality levels and gain a better understanding of the different quality options available to the user from various media content sources. Advantageously, the user may be able to engage in this type of edification in a manner that is organic to routine user management of a media playback experience. One having ordinary skill in the art will appreciate that the quality badge may also be deployed in other ways to enable a user to become more informed about different media content quality levels that are available.

d. UI Displaying Quality Badge and Associated Features

Figure 12:
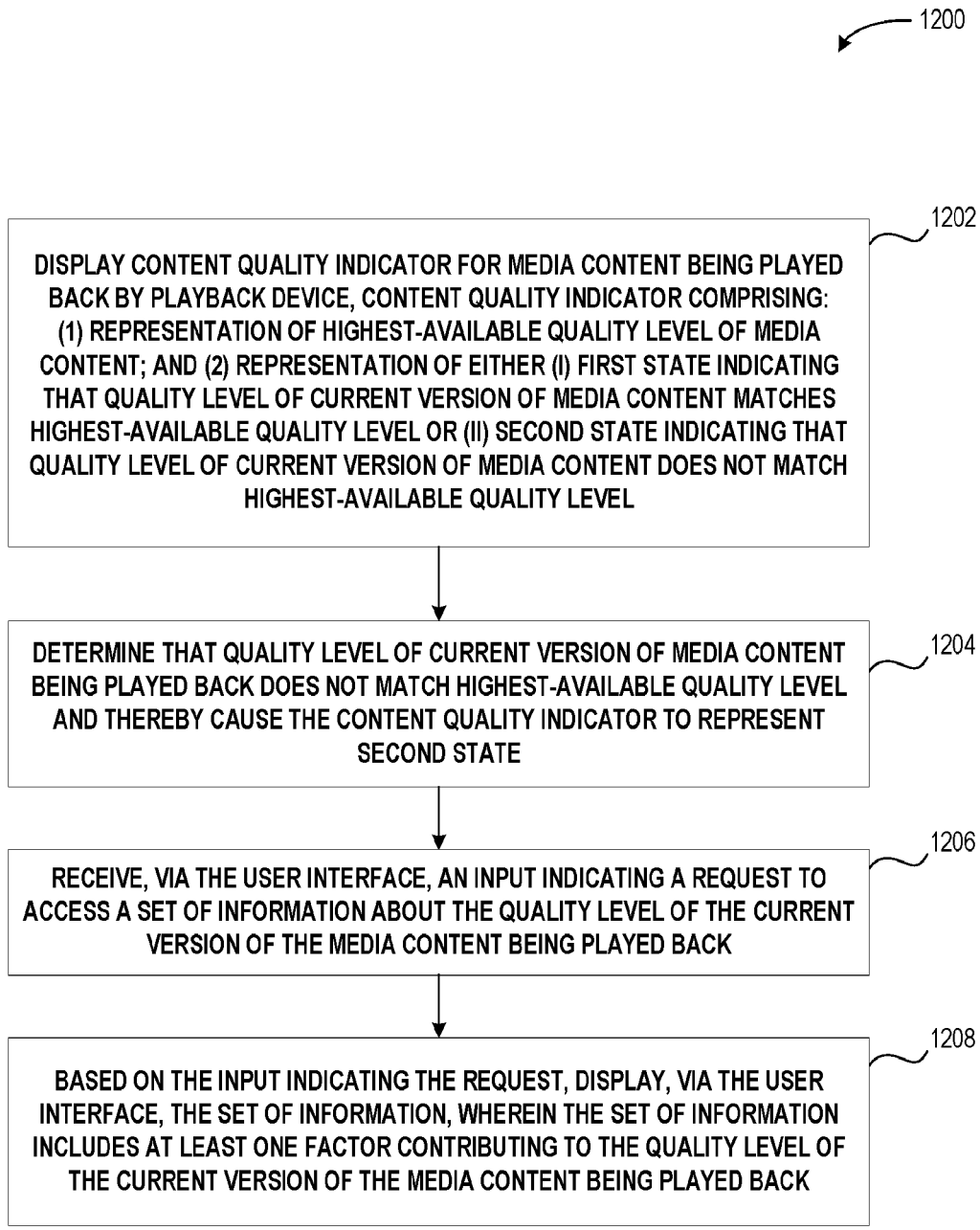
FIG. 12 is a flow diagram that depicts an example process for displaying a user interface for managing media playback experiences according to the disclosed technology Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

FIG. 12 depicts an example flowchart 1200 of example operations for presenting a media content quality indicator. The example depicted in FIG. 12 can be implemented within an operating environment involving, for example, the media playback system 100, one or more of the playback devices 110, one or more of the network microphone devices 120, and/or one or more of the control devices 130 of FIGS. 1A-1B, or for example, the media playback system 500, the playback devices 510, 512, and 514, and/or the control device 509 of FIG. 5. The example flowchart 1200 may include one or more operations, functions, or actions as illustrated by one or more of blocks 1202-1208. Although blocks 1202-1208 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the flowchart 1200 and other processes and methods disclosed herein, each flowchart shows functionality and operation of one possible implementation of examples discussed herein. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the flowchart 1200 and other processes and methods disclosed herein, each block shown in FIG. 12 may represent circuitry that is wired to perform the specific logical functions of the process.

At block 1202, a computing device may display, via a user interface, a content quality indicator for media content being played back by a playback device. The computing device may be, for example, a control device that resembles any of the control devices described herein, such as the control device 509 of FIG. 5. The playback device may resemble, for example, any of the playback devices 510, 512, or 514 of FIG. 5, with which the computing device may be configured to communicate. The content quality indicator may comprise (1) a representation of a highest-available quality level of media content and (2) a representation of either (i) a first state indicating that a quality level of a current version of media content being played back by the playback device matches the highest-available quality level or (ii) a second state indicating that the quality level of the current version of media content being played back by the playback device does not match the highest-available quality level. As described above, the representation of the highest-available quality level of media content may take various forms and may be based on various factors, including, among other examples, a highest-quality tier of media content offered by a media content source providing the media content that is currently being played back, or user subscription information for that media content source. Further, the representations of the first state and the second state may take any of various forms, including, as one example, a color-highlighted visual indicator and an un-highlighted visual indicator, respectively.

At block 1204, the computing device may determine that the quality level of the current version of the media content being played back does not match the highest-available quality level and thereby cause the content quality indicator to represent the second state. The computing device may make this determination in various ways, including receiving an indication from the playback device, a remote-computing device associated with the media content source, or another device configured to communicate with the media playback system, that includes information about the media content that is currently being played back.

At block 1206, the computing device may receive, via the user interface, an input indicating a request to access a set of information about the quality level of the current version of the media content being played back. The input may be a user input provided via the user interface that indicates a selection of the media content quality indicator, such as a touch input.

At block 1208, based on the input indicating the request, the computing device may display, via the user interface, the set of information, wherein the set of information includes at least one factor contributing to the quality level of the current version of the media content being played back. The set of information that includes the at least one factor contributing to the quality level of the current version of the media content being played back may comprise a set of one or more media playback characteristics and respective status indicators as previously described, which may be selectable by the user to cause the computing device to display, via the user interface, additional information and/or user actions that may facilitate playback of higher-quality media content.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

It should be appreciated that references to transmitting information to particular components, devices, and/or systems herein should be understood to include transmitting information (e.g., messages, requests, responses) indirectly or directly to the particular components, devices, and/or systems. Thus, the information being transmitted to the particular components, devices, and/or systems may pass through any number of intermediary components, devices, and/or systems prior to reaching its destination. For example, a control device may transmit information to a playback device by first transmitting the information to a computing system that, in turn, transmits the information to the playback device. Further, modifications may be made to the information by the intermediary components, devices, and/or systems. For example, intermediary components, devices, and/or systems may modify a portion of the information, reformat the information, and/or incorporate additional information.

Similarly, references to receiving information from particular components, devices, and/or systems herein should be understood to include receiving information (e.g., messages, requests, responses) indirectly or directly from the particular components, devices, and/or systems. Thus, the information being received from the particular components, devices, and/or systems may pass through any number of intermediary components, devices, and/or systems prior to being received. For example, a control device may receive information from a playback device indirectly by receiving information from a cloud server that originated from the playback device. Further, modifications may be made to the information by the intermediary components, devices, and/or systems. For example, intermediary components, devices, and/or systems may modify a portion of the information, reformat the information, and/or incorporate additional information.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

a. Example Features (Feature 1) A first playback device comprising: at least one processor; non-transitory computer-readable medium; and program instructions stored on the non-transitory computer-readable medium that are executable by the at least one processor such that the first playback device is configured to: (i) identify a first version and a second version of audio content; (ii) identify a first connection quality between a second playback device and a network device and a second connection quality between a third playback device and the network device, wherein the second playback device and the third playback device are members of a synchrony group with the first playback device for playback of audio content; (iii) determine that the first connection quality meets a threshold criteria and the second connection quality does not meet the threshold criteria; (iv) play back one of the first version or the second version of the audio content; (v) based on the determination that the first connection quality meets the threshold criteria and the second connection quality does not meet the threshold criteria: (1) cause the second playback device to play back the first version of the audio content in synchrony with the playback of the one of the first version or the second version of the audio content by the first playback device; and (2) cause the third playback device to play back the second version of the audio content in synchrony with the playback of the one of the first version or the second version of the audio content by the first playback device; (vi) while the third playback device is playing back the second version of the audio content, detect a change in the second connection quality between the third playback device and the network device; and (vii) based on the detected change in the second connection quality, cause the third playback device to transition from playing back the second version of the audio content to playing back the first version of the audio content in synchrony with the playback of the one of the first version or the second version of the audio content by the first playback device.

(Feature 2) The first playback device of feature 1, wherein the first, second, and third playback devices are configured to communicate with the network device over a wireless local area network (WLAN).

(Feature 3) The first playback device of feature 1, wherein the program instructions that are executable by the at least one processor such that the first playback device is configured to detect the change in the second connection quality between the third playback device and the network device comprise program instructions that are executable by the at least one processor such that the first playback device is configured to: detect at least one of: a change in network latency or a change in network bandwidth.

(Feature 4) The first playback device of feature 1, wherein the program instructions that are executable by the at least one processor such that the first playback device is configured to detect the change in the second connection quality between the third playback device and the network device comprise program instructions that are executable by the at least one processor such that the first playback device is configured to: detect an improvement in the in the second connection quality between the third playback device and the network device, and wherein the first version of the audio content comprises a higher bit rate than the second version of the audio content.

(Feature 5) The first playback device of feature 1, further comprising program instructions stored on the non-transitory computer-readable medium that are executable by the at least one processor such that the first playback device is configured to: (i) detect a change in the first connection quality between the second playback device and the network device; (ii) based on the detected change, determine that the first connection quality no longer meets the threshold criteria; (iii) based on the determination: (1) identify a third version of the audio content; and (2) cause the second playback device to transition from playing back the first version of the audio content to playing back the third version of the audio content in synchrony with the playback of the first version of the audio content by the first and the third playback devices; and (iv) continue playing back the first version of the audio content in synchrony with the third playback device.

(Feature 6) The first playback device of feature 5, wherein the program instructions that are executable by the at least one processor such that the first playback device is configured to detect the change in the first connection quality between the second playback device and the network device comprise program instructions that are executable by the at least one processor such that the first playback device is configured to: detect a reduction in the first connection quality, and wherein the third version of the audio content comprises a bit rate that is (i) lower than the first version of the audio content and (ii) higher than the second version of the audio content.

(Feature 7) The first playback device of feature 1, wherein the program instructions that are executable by the at least one processor such that the first playback device is configured to identify the first connection quality between the second playback device and the network device and the second connection quality between the third playback device and the network device further comprise program instructions that are executable by the at least one processor such that the first playback device is configured to: identify, for each of the second playback device and the third playback device that are members of the synchrony group with the first playback device for playback of audio content, a respective capability to produce audio content; and wherein the respective capability of the second playback device (i) matches a respective capability of the first playback device and (ii) is different from the respective capability of the third playback device.

(Feature 8) The first playback device of feature 1, wherein the program instructions that are executable by the at least one processor such that the first playback device is configured to play back one of the first version or the second version of the audio content comprise program instructions that are executable by the at least one processor such that the first playback device is configured to play back the first version of the audio content, the playback device further comprising program instructions stored on the non-transitory computer-readable medium that are executable by the at least one processor such that the first playback device is configured to: (i) determine that at least one additional playback device has joined the synchrony group; (ii) determine that a number of total playback devices in the synchrony group exceeds a threshold amount; and (iii) based on the determination that the number of total playback devices in the synchrony group exceeds the threshold amount: (1) cause the second and the third playback devices to transition from playing back the first version of the audio content to playing back the second version of audio content, wherein the second version of the audio content comprises a lower bit rate than the first version of the audio content; (2) cause the at least one additional playback device to play back the second version of the audio content in synchrony with the second and the third playback devices; and (3) transition from playing back the first version of the audio content to playing back the second version of audio content in synchrony with the second, the third, and the at least one additional playback devices.

(Feature 9) The first playback device of feature 1, wherein: (i) the program instructions that are executable by the at least one processor such that the first playback device is configured to cause the second playback device to play back the first version of the audio content in synchrony with the playback of the one of the first version or the second version of the audio content by the first playback device further comprise program instructions that are executable by the at least one processor such that the first playback device is configured to: transmit the first version of the audio content to the second playback device for playback; and (ii) the program instructions that are executable by the at least one processor such that the first playback device is configured to cause the third playback device to play back the second version of the audio content in synchrony with the playback of the one of the first version or the second version of the audio content by the first playback device further comprise program instructions that are executable by the at least one processor such that the first playback device is configured to: transmit the second version of the audio content to the third playback device for playback.

(Feature 10) The first playback device of feature 1, wherein the program instructions that are executable by the at least one processor such that the first playback device is configured to detect the change in the second connection quality between the third playback device and the network device comprise program instructions that are executable by the at least one processor such that the first playback device is configured to: receive an indication from the third playback device that the second connection quality has changed.

(Feature 11) A non-transitory computer-readable medium, wherein the non-transitory computer-readable medium is provisioned with program instructions that, when executed by at least one processor, cause a first playback device to: (i) identify a first version and a second version of audio content; (ii) identify a first connection quality between a second playback device and a network device and a second connection quality between a third playback device and the network device, wherein the second playback device and the third playback device are members of a synchrony group with the first playback device for playback of audio content; (iii) determine that the first connection quality meets a threshold criteria and the second connection quality does not meet the threshold criteria; (iv) play back one of the first version or the second version of the audio content; (v) based on the determination that the first connection quality meets the threshold criteria and the second connection quality does not meet the threshold criteria: (1) cause the second playback device to play back the first version of the audio content in synchrony with the playback of the one of the first version or the second version of the audio content by the first playback device; and (2) cause the third playback device to play back the second version of the audio content in synchrony with the playback of the one of the first version or the second version of the audio content by the first playback device; (vi) while the third playback device is playing back the second version of the audio content, detect a change in the second connection quality between the third playback device and the network device; and (vii) based on the detected change in the second connection quality, cause the third playback device to transition from playing back the second version of the audio content to playing back the first version of the audio content in synchrony with the playback of the one of the first version or the second version of the audio content by the first playback device.

(Feature 12) The non-transitory computer-readable medium of feature 11, wherein the first, second, and third playback devices are configured to communicate with the network device over a wireless local area network (WLAN).

(Feature 13) The non-transitory computer-readable medium of feature 11, wherein the program instructions that, when executed by at least one processor, cause the first playback device to detect the change in the second connection quality between the third playback device and the network device comprise program instructions that, when executed by at least one processor, cause the first playback device to: detect at least one of: a change in network latency or a change in network bandwidth.

(Feature 14) The non-transitory computer-readable medium of feature 11, wherein the program instructions that are executable by the at least one processor such that the first playback device is configured to detect the change in the second connection quality between the third playback device and the network device comprise program instructions that are executable by the at least one processor such that the first playback device is configured to: detect an improvement in the in the second connection quality between the third playback device and the network device, and wherein the first version of the audio content comprises a higher bit rate than the second version of the audio content.

(Feature 15) The non-transitory computer-readable medium of feature 11, wherein the non-transitory computer-readable medium is also provisioned with program instructions that, when executed by at least one processor, cause the first playback device to: (i) detect a change in the first connection quality between the second playback device and the network device; (ii) based on the detected change, determine that the first connection quality no longer meets the threshold criteria; (iii) based on the determination: (1) identify a third version of the audio content; and (2) cause the second playback device to transition from playing back the first version of the audio content to playing back the third version of the audio content in synchrony with the playback of the first version of the audio content by the first and the third playback devices; and (iv) continue playing back the first version of the audio content in synchrony with the third playback device.

(Feature 16) The non-transitory computer-readable medium of feature 15, wherein the program instructions that, when executed by at least one processor, cause the first playback device to detect the change in the first connection quality between the second playback device and the network device comprise program instructions that, when executed by at least one processor, cause the first playback device to: detect a reduction in the first connection quality, and wherein the third version of the audio content comprises a bit rate that is (i) lower than the first version of the audio content and (ii) higher than the second version of the audio content.

(Feature 17) The non-transitory computer-readable medium of feature 11, wherein the program instructions that, when executed by at least one processor, cause the first playback device to identify the first connection quality between the second playback device and the network device and the second connection quality between the third playback device and the network device further comprise program instructions that, when executed by at least one processor, cause the first playback device to: identify, for each of the second playback device and the third playback device that are members of the synchrony group with the first playback device for playback of audio content, a respective capability to produce audio content; and wherein the respective capability of the second playback device (i) matches a respective capability of the first playback device and (ii) is different from the respective capability of the third playback device.

(Feature 18) The non-transitory computer-readable medium of feature 11, wherein: (1) the program instructions that, when executed by at least one processor, cause the first playback device to play back one of the first version or the second version of the audio content comprise program instructions that, when executed by at least one processor, cause the first playback device to: play back the first version of the audio content; and (2) the non-transitory computer-readable medium is also provisioned with program instructions that, when executed by at least one processor, cause the first playback device to: (i) determine that at least one additional playback device has joined the synchrony group; (ii) determine that a number of total playback devices in the synchrony group exceeds a threshold amount; and (iii) based on the determination that the number of total playback devices in the synchrony group exceeds the threshold amount: (1) cause the second and the third playback devices to transition from playing back the first version of the audio content to playing back the second version of audio content, wherein the second version of the audio content comprises a lower bit rate than the first version of the audio content; (2) cause the at least one additional playback device to play back the second version of the audio content in synchrony with the second and the third playback devices; and (3) transition from playing back the first version of the audio content to playing back the second version of audio content in synchrony with the second, the third, and the at least one additional playback devices.

(Feature 19) The non-transitory computer-readable medium of feature 11, wherein the program instructions that, when executed by at least one processor, cause the first playback device to detect the change in the second connection quality between the third playback device and the network device comprise program instructions that, when executed by at least one processor, cause the first playback device to: receive an indication from the third playback device that the second connection quality has changed.

(Feature 20) A method carried out by a first playback device, the method comprising: (i) identifying a first version and a second version of audio content; (ii) identifying a first connection quality between a second playback device and a network device and a second connection quality between a third playback device and the network device, wherein the second playback device and the third playback device are members of a synchrony group with the first playback device for playback of audio content; (iii) determining that the first connection quality meets a threshold criteria and the second connection quality does not meet the threshold criteria; (iv) playing back one of the first version or the second version of the audio content; (v) based on determining that the first connection quality meets the threshold criteria and the second connection quality does not meet the threshold criteria: (1) causing the second playback device to play back the first version of the audio content in synchrony with the playback of the one of the first version or the second version of the audio content by the first playback device; and (2) causing the third playback device to play back the second version of the audio content in synchrony with the playback of the one of the first version or the second version of the audio content by the first playback device; (vi) while the third playback device is playing back the second version of the audio content, detecting a change in the second connection quality between the third playback device and the network device; and (vii) based on the detected change in the second connection quality, causing the third playback device to transition from playing back the second version of the audio content to playing back the first version of the audio content in synchrony with the playback of the one of the first version or the second version of the audio content by the first playback device.

(Feature 21) A first playback device comprising: at least one processor; non-transitory computer-readable medium; and program instructions stored on the non-transitory computer-readable medium that are executable by the at least one processor such that the first playback device is configured to: (i) identify a first version and a second version of audio content; (ii) identify a connection quality between a second playback device and a network device, wherein the second playback device is a member of a synchrony group with the first playback device for playback of audio content; (iii) determine that the connection quality does not meet a threshold criteria; (iv) play back the first version of the audio content; (v) based on the determination that the connection quality does not meet the threshold criteria, cause the second playback device to play back the second version of the audio content in synchrony with the playback of the first version of the audio content by the first playback device; (vi) while the second playback device is playing back the second version of the audio content, detect a change in the connection quality of the connection between the second playback device and the network device; and (vi) based on the detected change in the connection quality, cause the second playback device to transition from playing back the second version of the audio content to playing back the first version of the audio content in synchrony with the playback of the first version of the audio content by the first playback device.

(Feature 22) A first playback device comprising: at least one processor; non-transitory computer-readable medium; and program instructions stored on the non-transitory computer-readable medium that are executable by the at least one processor such that the first playback device is configured to: (1) operate as part of a synchrony group that comprises the first playback device and a second playback device; (2) obtain a first version of audio content that is encoded according to a first encoding format; (3) determine that the first version of the audio content is unsuitable for playback by the second playback device; (4) based on the determination, (i) decode the first version of the audio content and (ii) re-encode a second version of the audio content according to a second encoding format; (5) transmit the second version of the audio content to the second playback device for playback; (6) cause the second playback device to play back the second version of the audio content; and (7) play back the first version of the audio content in synchrony with the playback of the second version of the audio content by the second playback device.

(Feature 23) The first playback device of feature 22, wherein the first version of the audio content comprises a bit rate that is higher than a respective bit rate of the second version of the audio content.

(Feature 24) The first playback device of feature 22, wherein the program instructions that are executable by the at least one processor such that the playback device is configured to determine that the first version of the audio content is unsuitable for playback by the second playback device of comprise program instructions that are executable by the at least one processor such that the first playback device is configured to: (1) identify a connection quality between the second playback device and a network device; and (2) determine that the connection quality does not meet a threshold connection quality.

(Feature 25) The first playback device of feature 24, wherein the first playback device and the second playback device are configured to communicate with the network device over a wireless local area network (WLAN).

(Feature 26) The first playback device of feature 24, further comprising program instructions that are executable by the at least one processor such that the first playback device is configured to: (1) determine a change in the connection quality between the second playback device and the network device, wherein the connection quality meets the threshold connection quality based on the change; and (2) based on the determination: (i) transmit the first version of the audio content to the second playback device; and (ii) cause the second playback device to transition from playing back the second version of the audio content to playing back the first version of the audio content in synchrony with the playback of the first version of the audio content by the first playback device.

(Feature 27) The first playback device of feature 26, wherein the program instructions that are executable by the at least one processor such that the first playback device is configured to determine the change in the connection quality between the second playback device and the network device comprise program instructions that are executable by the at least one processor such that the first playback device is configured to: determine an improvement in one or both of (i) network latency or (ii) network bandwidth, and wherein the first version of the audio content comprises a bit rate that is higher than a respective bit rate of the second version of the audio content.

(Feature 28) The first playback device of feature 24, further comprising program instructions that are executable by the at least one processor such that the playback device is configured to: (1) determine a change in a third connection quality between a third playback device of the synchrony group and the network device, wherein the third connection quality does not meet the threshold connection quality based on the change; and (2) based on the determination: (i) re-encode a third version of the audio content according to a third encoding format; (ii) transmit the third version of the audio content to the third playback device; and (iii) cause the third playback device to transition from playing back either the first or second version of the audio content to playing back the third version of the audio content in synchrony with the playback of the first version of the audio content by the first playback device and the second version of the audio content by the second playback device.

(Feature 29) The first playback device of feature 28, wherein the program instructions that are executable by the at least one processor such that the first playback device is configured to determine the change in the third connection quality between the third playback device and the network device comprise program instructions that are executable by the at least one processor such that the first playback device is configured to: determine a reduction in one or both of (i) network latency or (ii) network bandwidth, and wherein the third version comprises a bit rate that is higher than a respective bit rate of the second version but lower than a respective bit rate of the first version.

(Feature 30) The first playback device of feature 22, wherein the program instructions that are executable by the at least one processor such that the playback device is configured to determine that the first version of the audio content is unsuitable for playback by the second playback device of the synchrony group comprise program instructions that are executable by the at least one processor such that the first playback device is configured to: determine that a number of audio channels in the first version of the audio content is unsuitable for playback by the second playback device.

(Feature 31) The first playback device of feature 22, wherein the program instructions that are executable by the at least one processor such that the playback device is configured to obtain the first version of the audio content comprise program instructions that are executable by the at least one processor such that the playback device is configured to: obtain the first version of the audio content from a computing device via an audio line-in input connection.

(Feature 32) The first playback device of feature 22, wherein the program instructions that are executable by the at least one processor such that the playback device is configured to obtain the first version of the audio content comprise program instructions that are executable by the at least one processor such that the playback device is configured to: obtain the first version of the audio content from a media streaming service.

(Feature 33) A non-transitory computer-readable medium, wherein the non-transitory computer-readable medium is provisioned with program instructions that, when executed by at least one processor, cause a playback device to: (1) operate as part of a synchrony group that comprises the first playback device and a second playback device; (2) obtain a first version of audio content that is encoded according to a first encoding format; (3) determine that the first version of the audio content is unsuitable for playback by the second playback device; (4) based on the determination, (i) decode the first version of the audio content and (ii) re-encode a second version of the audio content according to a second encoding format; (5) transmit the second version of the audio content to the second playback device for playback; (6) cause the second playback device to play back the second version of the audio content; and (7) play back the first version of the audio content in synchrony with the playback of the second version of the audio content by the second playback device.

(Feature 34) The non-transitory computer-readable medium of feature 33, wherein the first version of the audio content comprises a bit rate that is higher than a respective bit rate of the second version of the audio content.

(Feature 35) The non-transitory computer-readable medium of feature 33, wherein the program instructions that, when executed by the at least one processor, cause the playback device to determine that the first version of the audio content is unsuitable for playback by the second playback device comprise program instructions that, when executed by the at least one processor, cause the playback device to: (1) identify a connection quality between the second playback device and a network device; and (2) determine that the connection quality does not meet a threshold connection quality.

(Feature 36) The non-transitory computer-readable medium of feature 35, wherein the first playback device and the second playback device are configured to communicate with the network device over a wireless local area network (WLAN).

(Feature 37) The non-transitory computer-readable medium of feature 35, wherein the non-transitory computer-readable medium is also provisioned with program instructions that, when executed by at least one processor, cause the playback device to: (1) determine a change in the connection quality between the second playback device and the network device, wherein the connection quality meets the threshold connection quality based on the change; and (2) based on the determination: (i) transmit the first version of the audio content to the second playback device; and (ii) cause the second playback device to transition from playing back the second version of the audio content to playing back the first version of the audio content in synchrony with the playback of the first version of the audio content by the first playback device.

(Feature 38) The non-transitory computer-readable medium of feature 35, wherein the non-transitory computer-readable medium is also provisioned with program instructions that, when executed by at least one processor, cause the playback device to: (1) determine a change in a third connection quality between a third playback device of the synchrony group and the network device, wherein the third connection quality does not meet the threshold connection quality based on the change; and (2) based on the determination: (i) re-encode a third version of the audio content according to a third encoding format; (ii) transmit the third version of the audio content to the third playback device; and (iii) cause the third playback device to transition from playing back either the first or second version of the audio content to playing back the third version of the audio content in synchrony with the playback of the first version of the audio content by the first playback device and the second version of the audio content by the second playback device.

(Feature 39) The non-transitory computer-readable medium of feature 33, wherein the program instructions that, when executed by at least one processor, cause the playback device to determine that the first version of the audio content is unsuitable for playback by the second playback device of the synchrony group comprise program instructions that, when executed by at least one processor, cause the playback device to: determine that a number of audio channels in the first version of the audio content is unsuitable for playback by the second playback device.

(Feature 40) A method carried out by a playback device, the method comprising: (1) operating as part of a synchrony group that comprises the first playback device and a second playback device; (2) obtaining a first version of audio content that is encoded according to a first encoding format; (3) determining that the first version of the audio content is unsuitable for playback by the second playback device; (4) based on the determination, (i) decoding the first version of the audio content and (ii) re-encoding a second version of the audio content according to a second encoding format; (5) transmitting the second version of the audio content to the second playback device for playback; (6) causing the second playback device to play back the second version of the audio content; and (7) playing back the first version of the audio content in synchrony with the playback of the second version of the audio content by the second playback device.

(Feature 41) The method of feature 40, wherein the first version of the audio content comprises a bit rate that is higher than a respective bit rate of the second version of the audio content.

(Feature 42) A first playback device comprising: at least one processor; a non-transitory computer-readable medium; and program instructions stored on the non-transitory computer-readable medium that are executable by the at least one processor such that the first playback device is configured to: (i) play back a first version of given audio content obtained from a cloud-based media content service, wherein the first version of the given audio content corresponds to a first playback capability of the first playback device; (ii) while playing back the first version of the given audio content, receive an indication of a command for a second playback device to join the first playback device as part of a synchrony group for synchronous playback of audio content; (iii) obtain, based on a determination of a second playback capability of the second playback device, a second version of the given audio content from the cloud-based media content service, wherein the second version of the given audio content corresponds to the second playback capability; (iv) transition from playing back the first version of the given audio content to playing back the second version of the given audio content; and (v) coordinate with the second playback device to play back the second version of the given audio content in synchrony.

(Feature 43) The first playback device of feature 42, further comprising program instructions stored on the non-transitory computer-readable medium that are executable by the at least one processor such that the first playback device is configured to: before obtaining, based on the determination of the second playback capability of the second playback device, the second version of the given audio content from the cloud-based media content service: determine the second playback capability of the second playback device.

(Feature 44) The first playback device of feature 43, wherein the program instructions stored on the non-transitory computer-readable medium that are executable by the at least one processor such that the first playback device is configured to determine the second playback capability of the second playback device comprise program instructions that are executable by the at least one processor such that the first playback device is configured to: receive, from the second playback device, an indication of the second playback capability of the second playback device.

(Feature 45) The first playback device of feature 43, wherein the program instructions stored on the non-transitory computer-readable medium that are executable by the at least one processor such that the first playback device is configured to determine the second playback capability of the second playback device comprise program instructions that are executable by the at least one processor such that the first playback device is configured to: receive, via a remote computing device configured to communicate with the cloud-based media content service, an indication of the second playback capability of the second playback device.

(Feature 46) The first playback device of feature 43, wherein the program instructions stored on the non-transitory computer-readable medium that are executable by the at least one processor such that the first playback device is configured to determine the playback capability of the second playback device further comprise program instructions that are executable by the at least one processor such that the first playback device is configured to: determine, based on a comparison between the first playback capability and the second playback capability, that the first playback device is to serve as a group coordinator for the synchrony group.

(Feature 47) The first playback device of feature 42, wherein the first version of the given audio content is encrypted audio content, and wherein the program instructions stored on the non-transitory computer-readable medium that are executable by the at least one processor such that the first playback device is configured to determine the second playback capability of the second playback device comprise program instructions that are executable by the at least one processor such that the first playback device is configured to: determine that the second playback device is not capable of decrypting encrypted audio content.

(Feature 48) The first playback device of feature 47, wherein the second version of the given audio content is (i) a lower-quality version of the given audio content and (ii) not encrypted.

(Feature 49) The first playback device of feature 42, wherein the program instructions stored on the non-transitory computer-readable medium that are executable by the at least one processor such that the first playback device is configured to coordinate with the second playback device to play back the second version of the given audio content in synchrony further comprise program instructions that are executable by the at least one processor such that the first playback device is configured to: transmit, to the second playback device, (i) the second version of the given audio content and (ii) playback timing information.

(Feature 50) The first playback device of feature 42, wherein the program instructions stored on the non-transitory computer-readable medium that are executable by the at least one processor such that the first playback device is configured to play back the first version of the given audio content obtained from the cloud-based media content service further comprise program instructions that are executable by the at least one processor such that the first playback device is configured to: receive the first version of the given audio content from a remote computing device that is configured to communicate with the cloud-based media content service.

(Feature 51) The first playback device of feature 42, wherein: (1) the program instructions stored on the non-transitory computer-readable medium that are executable by the at least one processor such that the first playback device is configured to play back the first version of given audio content obtained from the cloud-based media content service further comprise program instructions that are executable by the at least one processor such that the first playback device is configured to: (i) request the first version of the given audio content; (ii) receive a first URI for retrieving the first version of the given audio content from the cloud-based media content service; and (iii) use the first URI to retrieve the first version of the given audio content from the cloud-based media content service; and (2) the program instructions stored on the non-transitory computer-readable medium that are executable by the at least one processor such that the first playback device is configured to obtain the second version of the given audio content from the cloud-based media content service comprise program instructions that are executable by the at least one processor such that the first playback device is configured to: (i) request the second version the given audio content; (ii) receive a second URI for retrieving the second version of the given audio content from the cloud-based media content service; and (iii) use the second URI to retrieve the second version of the given audio content from the cloud-based media content service.

(Feature 52) The first playback device of feature 42, wherein: (1) the program instructions stored on the non-transitory computer-readable medium that are executable by the at least one processor such that the first playback device is configured to play back the first version of given audio content obtained from the cloud-based media content service further comprise program instructions that are executable by the at least one processor such that the first playback device is configured to: request the first version the given audio content; receive a manifest comprising a plurality of URIs for retrieving a respective plurality of versions of the given audio content from the cloud-based media content service, the manifest comprising (i) a first URI for retrieving the first version of the given audio content and (ii) a second URI for retrieving the second version of the given audio content; and use the first URI to retrieve the first version of the given audio content from the cloud-based media content service; and (2) the program instructions stored on the non-transitory computer-readable medium that are executable by the at least one processor such that the first playback device is configured to obtain the second version of the given audio content from the cloud-based media content service comprise program instructions that are executable by the at least one processor such that the first playback device is configured to: use the second URI to retrieve the second version of the given audio content from the cloud-based media content service.

(Feature 53) The first playback device of feature 42, wherein the program instructions stored on the non-transitory computer-readable medium that are executable by the at least one processor such that the first playback device is configured to transition from playing back the first version of the given audio content to playing back the second version of the given audio content comprise program instructions that are executable by the at least one processor such that the first playback device is configured to: transition to playing back the second version of the given audio content after reaching a given audio track boundary in the first version of the given audio content.

(Feature 54) The first playback device of feature 42, wherein the program instructions stored on the non-transitory computer-readable medium that are executable by the at least one processor such that the first playback device is configured to transition from playing back the first version of the given audio content to playing back the second version of the given audio content comprise program instructions that are executable by the at least one processor such that the first playback device is configured to: while (i) downloading the first version of the given audio content to a first buffer using a first Uniform Resource Identifier ("URI") and (ii) playing back the first version of the given audio content from the first buffer, begin downloading the second version of the given audio content to a second buffer using a second URI; and transition from playing back the first version of the given audio content from the first buffer to playing back the second version of the given audio content from the second buffer.

(Feature 55) The first playback device of feature 42, further comprising program instructions stored on the non-transitory computer-readable medium that are executable by the at least one processor such that the first playback device is configured to: before receiving the indication of the command for the second playback device to join the first playback device as part of the synchrony group: (i) receive an indication of a command for a third playback device to join the first playback device as part of the synchrony group; (ii) determine a third playback capability of the third playback device; (iii) based on the third playback capability of the third playback device, determine that the first playback device is to serve as a group coordinator of the synchrony group; and (iv) coordinate with the third playback device to play back the first version of the given audio content in synchrony with the first playback device.

(Feature 56) A non-transitory computer-readable medium, wherein the non-transitory computer-readable medium is provisioned with program instructions that, when executed by at least one processor cause a first playback device to: (i) play back a first version of given audio content obtained from a cloud-based media content service, wherein the first version of the given audio content corresponds to a first playback capability of the first playback device; (ii) while playing back the first version of the given audio content, receive an indication of a command for a second playback device to join the first playback device as part of a synchrony group for synchronous playback of audio content; (iii) obtain, based on a determination of a second playback capability of the second playback device, a second version of the given audio content from the cloud-based media content service, wherein the second version of the given audio content corresponds to the second playback capability; (iv) transition from playing back the first version of the given audio content to playing back the second version of the given audio content; and (v) coordinate with the second playback device to play back the second version of the given audio content in synchrony.

(Feature 57) The non-transitory computer-readable medium of feature 56, wherein the non-transitory computer-readable medium is also provisioned with program instructions that, when executed by the at least one processor cause the first playback device to: before obtaining, based on the determination of the second playback capability of the second playback device, the second version of the given audio content from the cloud-based media content service: determine the second playback capability of the second playback device.

(Feature 58) The non-transitory computer-readable medium of feature 57, wherein the program instructions stored on the non-transitory computer-readable medium that, when executed by the at least one processor cause the first playback device to determine the second playback capability of the second playback device comprise program instructions that, when executed by the at least one processor cause the first playback device to: receive, from the second playback device, an indication of the second playback capability of the second playback device.

(Feature 59) The non-transitory computer-readable medium of feature 57, wherein the program instructions stored on the non-transitory computer-readable medium that, when executed by the at least one processor cause the first playback device to determine the second playback capability of the second playback device comprise program instructions that, when executed by the at least one processor cause the first playback device to: receive, via a remote computing device configured to communicate with the cloud-based media content service, an indication of the second playback capability of the second playback device.

(Feature 60) A method carried out by a first playback device, the method comprising: (i) playing back a first version of given audio content obtained from a cloud-based media content service, wherein the first version of the given audio content corresponds to a first playback capability of the first playback device; (ii) while playing back the first version of the given audio content, receiving an indication of a command for a second playback device to join the first playback device as part of a synchrony group for synchronous playback of audio content; (iii) obtaining, based on a determination of a second playback capability of the second playback device, a second version of the given audio content from the cloud-based media content service, wherein the second version of the given audio content corresponds to the second playback capability; (iv) transitioning from playing back the first version of the given audio content to playing back the second version of the given audio content; and (v) coordinating with the second playback device to play back the second version of the given audio content in synchrony.

(Feature 61) The method of feature 60, further comprising: before obtaining, based on the determination of the second playback capability of the second playback device, the second version of the given audio content from the cloud-based media content service: determining the second playback capability of the second playback device.

(Feature 62) A computing device comprising: a user interface; at least one processor; a non-transitory computer-readable medium; and program instructions stored on the non-transitory computer-readable medium that are executable by the at least one processor such that the computing device is configured to: (1) display, via the user interface, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determine that the quality level of the current version of the media content being played back does not match the highest-available quality level and thereby cause the content quality indicator to represent the second state; (3) receive, via the user interface, an input indicating a request to access a set of information about the quality level of the current version of the media content being played back; and (4) based on the input indicating the request, display, via the user interface, the set of information, wherein the set of information includes at least one factor contributing to the quality level of the current version of the media content being played back.

(Feature 63) The computing device of feature 62, wherein the at least one factor contributing to the quality level of the current version of the media content being played back comprises at least one of (i) a network characteristic, (ii) a characteristic of the playback device, (iii) a characteristic of a synchrony group that includes the playback device, (iv) a characteristic of a media playback system that includes the playback device and the computing device, or (v) a characteristic of a media content service from which the media content was retrieved.

(Feature 64) The computing device of feature 62, wherein the set of information further includes a set of one or more instructions for adjusting the at least one factor contributing to the quality level of the current version of the media content being played back.

(Feature 65) The computing device of feature 62, wherein the program instructions stored on the non-transitory computer-readable medium that are executable by the at least one processor such that the computing device is configured to receive the input indicating the request to access the set of information about the quality level of the current version of the media content being played back comprise program instructions stored on the non-transitory computer-readable medium that are executable by the at least one processor such that the computing device is configured to: receive an input indicating a user selection of the content quality indicator.

(Feature 66) The computing device of feature 62, wherein the quality level of the current version of the media content is a first quality level, the computing device further comprising program instructions stored on the non-transitory computer-readable medium that are executable by the at least one processor such that the computing device is configured to: (1) determine that the playback device has transitioned to playing back a different version of the media content that comprises a second quality level that matches the highest-available quality level; and (2) based on determining that the playback device has transitioned to playing back the different version of the media content that comprises the second quality level that matches the highest-available quality level, update the content quality indicator to represent the first state instead of the second state.

(Feature 67) The computing device of feature 62, wherein the highest-available quality level of media content comprises a highest tier of media content quality offered by a media content service from which the media content was retrieved.

(Feature 68) The computing device of feature 62, wherein the highest-available quality level of media content comprises a bit depth of 24 bits and a sample rate between 96 kilohertz and 192 kilohertz.

(Feature 69) The computing device of feature 62, wherein the representation of the highest-available quality level of media content comprise one or both of (i) a textual depiction including alphanumeric characters that correspond to the highest-available quality level or (ii) a logo corresponding to the highest-available quality level.

(Feature 70) The computing device of feature 69, wherein the textual depiction is one of "HD," "HiFi," "Dolby Atmos," or "Dolby Digital."

(Feature 71) The computing device of feature 62, wherein: (1) the first state indicating that the quality level of the current version of media content being played back by the playback device matches the highest-available quality level comprises a highlighted visual indication of the content quality indicator; and (2) the second state indicating that the quality level of the current version of media content being played back by the playback device does not match the highest-available quality level comprises an un-highlighted visual indication of the content quality indicator.

(Feature 72) The computing device of feature 62, wherein: (1) the first state indicating that the quality level of the current version of media content being played back by the playback device matches the highest-available quality level comprises a bolded visual indication of the content quality indicator; and (2) the second state indicating that the quality level of the current version of media content being played back by the playback device does not match the highest-available quality level comprises a grayed out visual indication of the content quality indicator.

(Feature 73) A non-transitory computer-readable medium, wherein the non-transitory computer-readable medium is provisioned with program instructions that, when executed by at least one processor, cause a computing device to: (1) display, via a user interface of the computing device, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determine that the quality level of the current version of the media content being played back does not match the highest-available quality level and thereby cause the content quality indicator to represent the second state; (3) receive, via the user interface, an input indicating a request to access a set of information about the quality level of the current version of the media content being played back; and (4) based on the input indicating the request, display, via the user interface, the set of information, wherein the set of information includes at least one factor contributing to the quality level of the current version of the media content being played back.

(Feature 74) The non-transitory computer-readable medium of feature 73, wherein the at least one factor contributing to the quality level of the current version of the media content being played back comprises at least one of (i) a network characteristic, (ii) a characteristic of the playback device, (iii) a characteristic of a synchrony group that includes the playback device, (iv) a characteristic of a media playback system that includes the playback device and the computing device, or (v) a characteristic of a media content service from which the media content was retrieved.

(Feature 75) The non-transitory computer-readable medium of feature 73, wherein the set of information further includes a set of one or more instructions for adjusting the at least one factor contributing to the quality level of the current version of the media content being played back.

(Feature 76) The non-transitory computer-readable medium of feature 73, wherein the program instructions that, when executed by at least one processor, cause the computing device to receive the input indicating the request to access the set of information about the quality level of the current version of the media content being played back comprise program instructions that, when executed by at least one processor, cause the computing device to: receive an input indicating a user selection of the content quality indicator.

(Feature 77) The non-transitory computer-readable medium of feature 73, wherein the quality level of the current version of the media content is a first quality level, and wherein the non-transitory computer-readable medium is also provisioned with program instructions that, when executed by at least one processor, cause the computing device to: (1) determine that the playback device has transitioned to playing back a different version of the media content that comprises a second quality level that matches the highest-available quality level; and (2) based on determining that the playback device has transitioned to playing back the different version of the media content that comprises the second quality level that matches the highest-available quality level, update the content quality indicator to represent the first state instead of the second state.

(Feature 78) The non-transitory computer-readable medium of feature 73, wherein the highest-available quality level of media content comprises a highest tier of media content quality offered by a media content service from which the media content was retrieved.

(Feature 79) The non-transitory computer-readable medium of feature 73, wherein the highest-available quality level of media content comprises a bit depth of 24 bits and a sample rate between 96 kilohertz and 192 kilohertz.

(Feature 80) The non-transitory computer-readable medium of feature 73, wherein the representation of the highest-available quality level of media content comprise one or both of (i) a textual depiction including alphanumeric characters that correspond to the highest-available quality level or (ii) a logo corresponding to the highest-available quality level.

(Feature 81) A method carried out by a computing device, the method comprising: (1) displaying, via a user interface of the computing device, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determining that the quality level of the current version of the media content being played back does not match the highest-available quality level and thereby cause the content quality indicator to represent the second state; (3) receiving, via the user interface, an input indicating a request to access a set of information about the quality level of the current version of the media content being played back; and (4) based on the input indicating the request, displaying, via the user interface, the set of information, wherein the set of information includes at least one factor contributing to the quality level of the current version of the media content being played back.

(Feature 82) A computing device comprising: a user interface; at least one processor; a non-transitory computer-readable medium; and program instructions stored on the non-transitory computer-readable medium that are executable by the at least one processor such that the computing device is configured to: (1) display, via the user interface, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determine that the quality level of the current version of the media content being played back does not match the highest-available quality level and thereby cause the content quality indicator to represent the second state; (3) receive, via the user interface, an input indicating a request to access a set of information about the quality level of the current version of the media content being played back; and (4) based on the input indicating the request, display, via the user interface, the set of information, wherein the set of information includes at least one factor contributing to the quality level of the current version of the media content being played back.

(Feature 83) The computing device of feature 82, (1) wherein the playback device is a second playback device that is part of a synchrony group with a first playback device for playback of media content, (2) wherein the content quality indicator is a second content quality indicator that comprises the representation of the second state, and wherein the program instructions that are executable by the at least one processor such that the computing device is configured to display, via the user interface, the second content quality indicator further comprise program instructions that are executable by the at least one processor such that the computing device is configured to: display, via the user interface, a first content quality indicator for media content being played back by the first playback device, wherein the first content quality indicator comprises the representation of the first state, (3) wherein the at least one factor comprises a respective connection quality between a network device and each of the first and second playback devices, (4) wherein the quality level is a first quality level, and wherein the computing device further comprises program instructions that are executable by the at least one processor such that the computing device is configured to: determine that (i) a connection quality between the network device and the second playback device has changed such that the connection quality meets a threshold criteria and (ii) the second playback device has transitioned from playing back the current version of the media content to playing back a different version of the media content that comprises a second quality level that matches the highest-available quality level; and based on the determination, update the second content quality indicator to represent the first state instead of the second state.

(Feature 84) The computing device of feature 83, wherein the program instructions that are executable by the at least one processor such that the computing device is configured to determine that (i) the connection quality between the network device and the second playback device has changed and (ii) the second playback device has transitioned from playing back the current version of the media content to playing back a different version comprise program instructions that are executable by the at least one processor such that the computing device is configured to: receive a communication from the first playback device indicating that (i) the first playback device detected a change in the connection quality between the network device and the second playback device and (ii) caused the second playback device to transition from playing back the current version of the media content to playing back the different version of the media content that comprises the second quality level that matches the highest-available quality level.

(Feature 85) The computing device of feature 82, (1) wherein the content quality indicator is a second content quality indicator, and wherein the playback device is a second playback device that is part of a synchrony group with a first playback device, the computing device further comprising program instructions that are executable by the at least one processor such that the computing device is configured to (1) communicate with the first playback device that is configured to: obtain a first version of the media content that (i) is encoded according to a first encoding format and (ii) corresponds to the highest-available quality level of the media content; determine that the first version of the media content is unsuitable for playback by the second playback device; based on the determination, (i) decode the first version of the media content and (ii) re-encode a second version of the media content according to a second encoding format; transmit the second version of the media content to the second playback device for playback; cause the second playback device to play back the second version of the media content; and play back the first version of the media content in synchrony with the playback of the second version of the media content by the second playback device, (2) wherein the program instructions that are executable by the at least one processor such that the computing device is configured to determine that the quality level of the current version of the media content being played back by the second playback device does not match the highest-available quality level comprise program instructions that are executable by the at least one processor such that the computing device is configured to determine that the quality level of the second version of the media content does not match the highest-available quality level, and (3) wherein the computing device further comprises program instructions that are executable by the at least one processor such that the computing device is configured to: display, via the user interface, a first content quality indicator for the first version of the media content being played back by the first playback device that comprises the representation of the first state.

(Feature 86) The computing device of feature 85, wherein the first version of the media content comprises a bit rate that is higher than a respective bit rate of the second version of the media content.

(Feature 87) The computing device of feature 82, wherein the playback device is a second playback device that is part of a synchrony group with a first playback device, and wherein the content quality indicator is a second content quality indicator, the computing device further comprising program instructions that are executable by the at least one processor such that the computing device is configured to: (1) communicate with the first playback device that is configured to: play back a first version of the media content obtained from a cloud-based media content service, wherein the first version of the media content corresponds to a first playback capability of the first playback device; while playing back the first version of the media content, receive an indication of a command provided at the computing device for the second playback device to join the synchrony group for synchronous playback of media content; obtain, based on a determination of a second playback capability of the second playback device, a second version of the media content from the cloud-based media content service, wherein the second version of the media content corresponds to the second playback capability; transition from playing back the first version of the media content to playing back the second version of the media content; and coordinate with the second playback device to play back the second version of the media content in synchrony; and (2) before displaying the second content quality indicator, and while the first playback device is playing back the first version of the media content, display, via the user interface, a first content quality indicator, for media content being played back by the first playback device, that comprises the representation of the first state, (3) wherein the program instructions that are executable by the at least one processor such that the computing device is configured to display, via the user interface, the second content quality indicator further comprise program instructions that are executable by the at least one processor such that the computing device is configured to: after the first playback device has transitioned from playing back the first version of the media content to playing back the second version of the media content in synchrony with the second playback device, update the first content quality indicator to comprise the representation of the second state; and (4) wherein the program instructions that are executable by the at least one processor such that the computing device is configured to determine that the quality level of the current version of the media content being played back does not match the highest-available quality level comprise program instructions that are executable by the at least one processor such that the computing device is configured to: determine that the quality level of the second version of the media content does not match the highest-available quality level.

(Feature 88) The computing device of feature 87, wherein the determination that the quality level of the current version of the media content being played back by the second playback device does not match the highest-available quality level is based on communicating with the first playback device.

(Feature 89) The computing device of feature 87, wherein the second version of the media content is (i) a lower-quality version than the first version of the media content and (ii) not encrypted.

(Feature 90) The computing device of feature 82, wherein the at least one factor contributing to the quality level of the current version of the media content being played back comprises at least one of (i) a network characteristic, (ii) a characteristic of the playback device, (iii) a characteristic of a synchrony group that includes the playback device, (iv) a characteristic of a media playback system that includes the playback device and the computing device, or (v) a characteristic of a media content service from which the media content was retrieved.

(Feature 91) The computing device of feature 82, wherein the set of information further includes a set of one or more instructions for adjusting the at least one factor contributing to the quality level of the current version of the media content being played back.

(Feature 92) The computing device of feature 82, wherein the program instructions stored on the non-transitory computer-readable medium that are executable by the at least one processor such that the computing device is configured to receive the input indicating the request to access the set of information about the quality level of the current version of the media content being played back comprise program instructions stored on the non-transitory computer-readable medium that are executable by the at least one processor such that the computing device is configured to: receive an input indicating a user selection of the content quality indicator.

(Feature 93) The computing device of feature 82, wherein the quality level of the current version of the media content is a first quality level, the computing device further comprising program instructions stored on the non-transitory computer-readable medium that are executable by the at least one processor such that the computing device is configured to: (1) determine that the playback device has transitioned to playing back a different version of the media content that comprises a second quality level that matches the highest-available quality level; and (2) based on determining that the playback device has transitioned to playing back the different version of the media content that comprises the second quality level that matches the highest-available quality level, update the content quality indicator to represent the first state instead of the second state.

(Feature 94) The computing device of feature 82, wherein the highest-available quality level of media content comprises a highest tier of media content quality offered by a media content service from which the media content was retrieved.

(Feature 95) The computing device of feature 82, wherein the highest-available quality level of media content comprises a bit depth of 24 bits and a sample rate between 96 kilohertz and 192 kilohertz.

(Feature 96) The computing device of feature 82, wherein the representation of the highest-available quality level of media content comprise one or both of (i) a textual depiction including alphanumeric characters that correspond to the highest-available quality level or (ii) a logo corresponding to the highest-available quality level.

(Feature 97) The computing device of feature 96, wherein the textual depiction is one of "HD," "HiFi," "Dolby Atmos," or "Dolby Digital."

(Feature 98) The computing device of feature 82, wherein: (1) the first state indicating that the quality level of the current version of media content being played back by the playback device matches the highest-available quality level comprises a highlighted visual indication of the content quality indicator; and (2) the second state indicating that the quality level of the current version of media content being played back by the playback device does not match the highest-available quality level comprises an un-highlighted visual indication of the content quality indicator.

(Feature 99) The computing device of feature 82, wherein: (1) the first state indicating that the quality level of the current version of media content being played back by the playback device matches the highest-available quality level comprises a bolded visual indication of the content quality indicator; and (2) the second state indicating that the quality level of the current version of media content being played back by the playback device does not match the highest-available quality level comprises a grayed out visual indication of the content quality indicator.

(Feature 100) A non-transitory computer-readable medium, wherein the non-transitory computer-readable medium is provisioned with program instructions that, when executed by at least one processor, cause a computing device to: (1) display, via a user interface of the computing device, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determine that the quality level of the current version of the media content being played back does not match the highest-available quality level and thereby cause the content quality indicator to represent the second state; (3) receive, via the user interface, an input indicating a request to access a set of information about the quality level of the current version of the media content being played back; and (4) based on the input indicating the request, display, via the user interface, the set of information, wherein the set of information includes at least one factor contributing to the quality level of the current version of the media content being played back.

(Feature 101) A method carried out by a computing device, the method comprising: (1) displaying, via a user interface of the computing device, a content quality indicator for media content being played back by a playback device, wherein the content quality indicator comprises: a representation of a highest-available quality level of media content; and a representation of either (i) a first state indicating that a quality level of a current version of media content being played back by the playback device matches the highest-available quality level or (ii) a second state indicating that the quality level of the current version of media content being played back by the playback device does not match the highest-available quality level; (2) determining that the quality level of the current version of the media content being played back does not match the highest-available quality level and thereby cause the content quality indicator to represent the second state; (3) receiving, via the user interface, an input indicating a request to access a set of information about the quality level of the current version of the media content being played back; and (4) based on the input indicating the request, displaying, via the user interface, the set of information, wherein the set of information includes at least one factor contributing to the quality level of the current version of the media content being played back.

(Feature 99) A method carried out by a first playback device, the method comprising: (i) playing back a first version of given audio content obtained from a cloud-based media content service, wherein the first version of the given audio content corresponds to a first playback capability of the first playback device; (ii) while playing back the first version of the given audio content, receiving an indication of a command for a second playback device to join the first playback device as part of a synchrony group for synchronous playback of audio content; (iii) obtaining, based on a determination of a second playback capability of the second playback device, a second version of the given audio content from the cloud-based media content service, wherein the second version of the given audio content corresponds to the second playback capability; (iv) transitioning from playing back the first version of the given audio content to playing back the second version of the given audio content; and (v) coordinating with the second playback device to play back the second version of the given audio content in synchrony.

(Feature 100) The method of feature 99, further comprising: before obtaining, based on the determination of the second playback capability of the second playback device, the second version of the given audio content from the cloud-based media content service: determining the second playback capability of the second playback device.

(Feature 101) The method of feature 100, wherein determining the second playback capability of the second playback device comprises at least one of: (i) receiving, from the second playback device, an indication of the second playback capability of the second playback device; and (ii) receiving, via a remote computing device configured to communicate with the cloud-based media content service, an indication of the second playback capability of the second playback device; and (iii) determining, based on a comparison between the first playback capability and the second playback capability, that the first playback device is to serve as a group coordinator for the synchrony group.

(Feature 102) The method of features 99 to 101, wherein: (i) determining the second playback capability of the second playback device comprises determining that the second playback device is not capable of decrypting encrypted audio content, (ii) the first version of the given audio content is encrypted audio; and (iii) the second version of the audio content is not encrypted.

(Feature 103) The method of feature 102, wherein the second version of the given audio content is a lower-quality version of the given audio content.

(Feature 104) The method of features 99 to 103, wherein coordinating with the second playback device to play back the second version of the given audio content in synchrony comprises: transmitting, to the second playback device the second version of the given audio content and playback timing information.

(Feature 105) The method of features 99 to 104, wherein playing back the first version of the given audio content obtained from the cloud-based media content service comprises: receiving the first version of the given audio content from a remote computing device that is configured to communicate with the cloud-based media content service.

(Feature 106) The method of features 99 to 105, wherein: (i) playing back the first version of given audio content obtained from the cloud-based media content service comprises: (1) requesting the first version of the given audio content; (2) receiving a first URI for retrieving the first version of the given audio content from the cloud-based media content service; and (3) using the first URI to retrieve the first version of the given audio content from the cloud-based media content service; and (ii) wherein obtaining the second version of the given audio content from the cloud-based media content service comprises: (1) requesting the second version the given audio content; (2) receiving a second URI for retrieving the second version of the given audio content from the cloud-based media content service; and (3) using the second URI to retrieve the second version of the given audio content from the cloud-based media content service.

(Feature 107) The method of features 99 to 106, wherein: playing back the first version of given audio content obtained from the cloud-based media content service comprises: (1) requesting the first version the given audio content; (2) receiving a manifest comprising a plurality of URIs for retrieving a respective plurality of versions of the given audio content from the cloud-based media content service, the manifest comprising (i) a first URI for retrieving the first version of the given audio content and (ii) a second URI for retrieving the second version of the given audio content; and (3) using the first URI to retrieve the first version of the given audio content from the cloud-based media content service; and wherein obtaining the second version of the given audio content from the cloud-based media content service comprises using the second URI to retrieve the second version of the given audio content from the cloud-based media content service.

(Feature 108) The method of features 99 to 107, wherein the step of transitioning from playing back the first version of the given audio content to playing back the second version of the given audio content is performed after reaching a given audio track boundary in the first version of the given audio content.

(Feature 109) The method of features 99 to 108, wherein transitioning from playing back the first version of the given audio content to playing back the second version of the given audio content comprises: (1) while (i) downloading the first version of the given audio content to a first buffer using a first Uniform Resource Identifier ("URI") and (ii) playing back the first version of the given audio content from the first buffer, beginning downloading the second version of the given audio content to a second buffer using a second URI; and (2) transitioning from playing back the first version of the given audio content from the first buffer to playing back the second version of the given audio content from the second buffer.

(Feature 110) The method of features 99 to 109, further comprising: before receiving the indication of the command for the second playback device to join the first playback device as part of the synchrony group: (i) receiving an indication of a command for a third playback device to join the first playback device as part of the synchrony group; (ii) based on a third playback capability of the third playback device, determining that the first playback device is to serve as a group coordinator of the synchrony group; and (iii) coordinating with the third playback device to play back the first version of the given audio content in synchrony with the first playback device.

(Feature 111) A non-transitory computer-readable medium, wherein the non-transitory computer-readable medium is provisioned with program instructions that, when executed by at least one processor cause a first playback device to perform the method of one of features 99 to 110.

(Feature 112) A first playback device comprising: at least one processor; a non-transitory computer-readable medium; and program instructions stored on the non-transitory computer-readable medium that are executable by the at least one processor such that the first playback device is configured to perform the method of one of features 99 to 110.

(Feature 113) A method carried out by a first playback device, the method comprising: while the first playback device is in a synchrony group with at least a second playback device, playing back a first version of audio content in synchrony with the second playback device; in response to identifying that a quality of a connection between the second playback device and a network device is below a threshold criterion, causing the second playback device to play back a second version of the audio content in synchrony with the first version of the audio content playing back by the first playback device; and after causing the second playback device to play back the second version of the audio content and in response to detecting a change in the quality of the connection between the second playback device and the network device such that the quality of the connection meets the threshold criterion, causing the second playback device to play back the first version of the audio content in synchrony with the first version of the audio content being played back by the first playback device.

(Feature 114) The method of feature 113, wherein the first and second playback devices are configured to communicate with the network device over a wireless local area network (WLAN).

(Feature 115) The method of features 113 or 114, wherein causing a playback device to play back a version of audio content comprises transmitting the version of audio content to the playback device for playback.

(Feature 116) The method of any of features 113 to 115, wherein detecting the change in the quality of the connection comprises at least one of: detecting a change in network latency; detecting a change in network bandwidth; and receiving an indication from the second playback device that the quality of the connection has changed.

(Feature 117) The method of any of features 113 to 116, wherein the first version of the audio content comprises a higher bit rate than the second version of the audio content.

(Feature 118) The method of any of features 113 to 117, wherein the synchrony group further comprises a third playback device, the method further comprising: based on a connection quality between the third playback device and a network device, causing the third playback device to play back a third version of the audio content in synchrony with the audio content being played back by the first and second playback devices.

(Feature 119) The method of any of features 113 to 118, wherein the versions of audio content have different bit rates, and wherein the method comprises causing playback of a version of the audio content that has a lower bit rate when the quality of the connection between the playback device and the network device does not meet a quality of connection criterion.

(Feature 120) The method of any of features 113 to 119, wherein the versions of audio content have different bit rates, and wherein the method comprises causing playback of a version of the audio content that has a higher bit rate when it is detected that the quality of the connection between the playback device and the network device has changed such that it meets a quality of connection criterion.

(Feature 121) The method of any of features 113 to 120, further comprising: when at least one additional playback device has joined the synchrony group such that a number of total playback devices in the synchrony group exceeds a threshold amount: causing each of the playback devices of the synchrony group, including the at least one additional playback device, to play back the second version of audio content, wherein the second version of audio content has a lower bit rate than the first version of audio content.

(Feature 122) The method of any of features 113 to 121, further comprising: while operating as part of the synchrony group, obtaining audio content that is encoded according to a first encoding format; decoding the audio content for playback by the first playback device; re-encoding the audio content according to a second encoding format; and transmitting the re-encoded audio content to the second playback device for playback, wherein the re-encoded audio content is the second version of audio content to be played back by the second playback device.

(Feature 123) The method of feature 122 alone or in combination with any of features 113 to 121, further comprising: when a quality of connection between a third playback device of the synchrony group and the network device does not meet the threshold connection quality: re-encoding the audio content according to a third encoding format; transmitting the re-encoded audio content to the third playback device; and causing the third playback device to play back the re-encoded audio content according to the third encoding format in synchrony with the first and second playback devices.

(Feature 124) The method of any of features 113 to 123, further comprising: causing the second playback device to play the second version of audio content when the first version of the audio content comprises a number of audio channels that is unsuitable for playback by the second playback device.

(Feature 125) The method of any of features 113 to 124, further comprising: obtaining, by the first playback device, the first version of the audio content from one of: a computing device via an audio line-in input connection; and a media streaming service.

(Feature 126) The method of any of features 113 to 125, the method for the first playback device and a computing device, and the method further comprising: displaying, via a user interface of the computing device, a content quality indicator for media content being played back by at least one playback device, wherein the content quality indicator indicates whether a quality level of a version of media content being played back by the at least one playback device matches the highest-available quality level; and when the quality level of the version of media content being played back by the playback device does not match the highest-available quality level and a user input is received via the user interface indicating a request to access a set of information about the quality level of the current version of the media content being played back, displaying a set of information including at least one factor contributing to the quality level of the current version of the media content being played back.

(Feature 127) The method of feature 126, wherein the at least one factor contributing to the quality level of the current version of the media content being played back comprises at least one of (i) a network characteristic, (ii) a characteristic of the playback device, (iii) a characteristic of a synchrony group that includes the playback device, (iv) a characteristic of a media playback system that includes the playback device and the computing device, or (v) a characteristic of a media content service from which the media content was retrieved.

(Feature 128) The method of features 126 or 127, wherein the set of information further includes a set of one or more instructions for adjusting the at least one factor contributing to the quality level of the current version of the media content being played back.

(Feature 129) The method of one of features 126 to 128, wherein the user input indicating the request to access the set of information corresponds to a user selection of the content quality indicator.

(Feature 130) The method of one of features 126 to 129, further comprising: when the playback device has transitioned to playing back a different version of the media content that that matches the highest-available quality level, updating the content quality indicator to indicate that the playback device is playing back a version of the media content of the highest-available quality.

(Feature 131) The method of one of features 126 to 130, wherein the highest-available quality level of media content comprises a highest tier of media content quality offered by a media content service from which the media content was retrieved.

(Feature 132) The method of one of features 126 to 131, wherein the highest-available quality level of media content comprises a bit depth of 24 bits and a sample rate between 96 kilohertz and 192 kilohertz.

(Feature 133) The method of one of features 126 to 132, further comprising: displaying a representation of the highest-available quality level of media content comprising one or both of (i) a textual depiction including alphanumeric characters that correspond to the highest-available quality level or (ii) a logo corresponding to the highest-available quality level.

(Feature 134) The method of feature 133, wherein the textual depiction is one of "HD," "HiFi," "Dolby Atmos," or "Dolby Digital."

(Feature 135) The method of one of features 126 to 134, wherein: when the quality level of the current version of media content being played back by the playback device matches the highest-available quality level, the content quality indicator comprises a highlighted visual indication of the content quality indicator; and when the quality level of the current version of media content being played back by the playback device does not match the highest-available quality level, the content quality indicator comprises an un-highlighted visual indication of the content quality indicator.

(Feature 136) The method of one of features 126 to 135, wherein: when the quality level of the current version of media content being played back by the playback device matches the highest-available quality level, the content quality indicator comprises a bolded visual indication of the content quality indicator; and when the quality level of the current version of media content being played back by the playback device does not match the highest-available quality level, the content quality indicator comprises an un-greyed out visual indication of the content quality indicator.

(Feature 137) A first playback device configured to perform the method of one of claims 113 to 125.

(Feature 138) A system comprising a playback device and a computing device, the system configured for performing the method of one of features 113 to 136.

The invention claimed is:
1. A computing device comprising:
a user interface;
at least one processor;
a non-transitory computer-readable medium; and
program instructions stored on the non-transitory computer-readable medium that are executable by the at least one processor such that the computing device is configured to:
 display, via the user interface, a content quality indicator for media content being played back by a playback device, wherein the content quality indicator comprises:
  a representation of a highest-available quality level of media content; and
  a representation of either (i) a first state indicating that a quality level of a current version of media content being played back by the playback device matches the highest-available quality level or (ii) a second state indicating that the quality level of the current version of media content being played back by the playback device does not match the highest-available quality level;
 determine that the quality level of the current version of the media content being played back does not match the highest-available quality level and thereby cause the content quality indicator to represent the second state;
 receive, via the user interface, an input indicating a request to access a set of information about the quality level of the current version of the media content being played back; and
 based on the input indicating the request, display, via the user interface, the set of information, wherein the set of information includes at least one factor contributing to the quality level of the current version of the media content being played back.

2. The computing device of claim 1, wherein the at least one factor contributing to the quality level of the current version of the media content being played back comprises at least one of (i) a network characteristic, (ii) a characteristic of the playback device, (iii) a characteristic of a synchrony group that includes the playback device, (iv) a characteristic of a media playback system that includes the playback device and the computing device, or (v) a characteristic of a media content service from which the media content was retrieved.

3. The computing device of claim 1, wherein the set of information further includes a set of one or more instructions for adjusting the at least one factor contributing to the quality level of the current version of the media content being played back.

4. The computing device of claim 1, wherein the program instructions stored on the non-transitory computer-readable medium that are executable by the at least one processor such that the computing device is configured to receive the input indicating the request to access the set of information about the quality level of the current version of the media content being played back comprise program instructions stored on the non-transitory computer-readable medium that are executable by the at least one processor such that the computing device is configured to:
 receive an input indicating a user selection of the content quality indicator.

5. The computing device of claim 1, wherein the quality level of the current version of the media content is a first quality level, the computing device further comprising program instructions stored on the non-transitory computer-readable medium that are executable by the at least one processor such that the computing device is configured to:
 determine that the playback device has transitioned to playing back a different version of the media content that comprises a second quality level that matches the highest-available quality level; and
 based on determining that the playback device has transitioned to playing back the different version of the media content that comprises the second quality level that matches the highest-available quality level, update the content quality indicator to represent the first state instead of the second state.

6. The computing device of claim 1, wherein the highest-available quality level of media content comprises a highest tier of media content quality offered by a media content service from which the media content was retrieved.

7. The computing device of claim 1, wherein the highest-available quality level of media content comprises a bit depth of 24 bits and a sample rate between 96 kilohertz and 192 kilohertz.

8. The computing device of claim 1, wherein the representation of the highest-available quality level of media content comprise one or both of (i) a textual depiction including alphanumeric characters that correspond to the highest-available quality level or (ii) a logo corresponding to the highest-available quality level.

9. The computing device of claim 8, wherein the textual depiction is one of "HD," "HiFi," "Dolby Atmos," or "Dolby Digital".

10. The computing device of claim 1, wherein:
the first state indicating that the quality level of the current version of media content being played back by the playback device matches the highest-available quality level comprises a highlighted visual indication of the content quality indicator; and
the second state indicating that the quality level of the current version of media content being played back by the playback device does not match the highest-available quality level comprises an un-highlighted visual indication of the content quality indicator.

11. The computing device of claim 1, wherein:
the first state indicating that the quality level of the current version of media content being played back by the playback device matches the highest-available quality level comprises a bolded visual indication of the content quality indicator; and the second state indicating that the quality level of the current version of media content being played back by the playback device does not match the highest-available quality level comprises a grayed out visual indication of the content quality indicator.

12. A non-transitory computer-readable medium, wherein the non-transitory computer-readable medium is provisioned with program instructions that, when executed by at least one processor, cause a computing device to:

display, via a user interface of the computing device, a content quality indicator for media content being played back by a playback device, wherein the content quality indicator comprises:
- a representation of a highest-available quality level of media content; and
- a representation of either (i) a first state indicating that a quality level of a current version of media content being played back by the playback device matches the highest-available quality level or (ii) a second state indicating that the quality level of the current version of media content being played back by the playback device does not match the highest-available quality level;

determine that the quality level of the current version of the media content being played back does not match the highest-available quality level and thereby cause the content quality indicator to represent the second state;

receive, via the user interface, an input indicating a request to access a set of information about the quality level of the current version of the media content being played back; and based on the input indicating the request, display, via the user interface, the set of information, wherein the set of information includes at least one factor contributing to the quality level of the current version of the media content being played back.

13. The non-transitory computer-readable medium of claim 12, wherein the at least one factor contributing to the quality level of the current version of the media content being played back comprises at least one of (i) a network characteristic, (ii) a characteristic of the playback device, (iii) a characteristic of a synchrony group that includes the playback device, (iv) a characteristic of a media playback system that includes the playback device and the computing device, or (v) a characteristic of a media content service from which the media content was retrieved.

14. The non-transitory computer-readable medium of claim 12, wherein the set of information further includes a set of one or more instructions for adjusting the at least one factor contributing to the quality level of the current version of the media content being played back.

15. The non-transitory computer-readable medium of claim 12, wherein the program instructions that, when executed by at least one processor, cause the computing device to receive the input indicating the request to access the set of information about the quality level of the current version of the media content being played back comprise program instructions that, when executed by at least one processor, cause the computing device to:
receive an input indicating a user selection of the content quality indicator.

16. The non-transitory computer-readable medium of claim 12, wherein the quality level of the current version of the media content is a first quality level, and wherein the non-transitory computer-readable medium is also provisioned with program instructions that, when executed by at least one processor, cause the computing device to:

determine that the playback device has transitioned to playing back a different version of the media content that comprises a second quality level that matches the highest-available quality level; and based on determining that the playback device has transitioned to playing back the different version of the media content that comprises the second quality level that matches the highest-available quality level, update the content quality indicator to represent the first state instead of the second state.

17. The non-transitory computer-readable medium of claim 12, wherein the highest-available quality level of media content comprises a highest tier of media content quality offered by a media content service from which the media content was retrieved.

18. The non-transitory computer-readable medium of claim 12, wherein the highest-available quality level of media content comprises a bit depth of 24 bits and a sample rate between 96 kilohertz and 192 kilohertz.

19. The non-transitory computer-readable medium of claim 12, wherein the representation of the highest-available quality level of media content comprise one or both of (i) a textual depiction including alphanumeric characters that correspond to the highest-available quality level or (ii) a logo corresponding to the highest-available quality level.

20. A method carried out by a computing device, the method comprising:

displaying, via a user interface of the computing device, a content quality indicator for media content being played back by a playback device, wherein the content quality indicator comprises:
- a representation of a highest-available quality level of media content; and
- a representation of either (i) a first state indicating that a quality level of a current version of media content being played back by the playback device matches the highest-available quality level or (ii) a second state indicating that the quality level of the current version of media content being played back by the playback device does not match the highest-available quality level;

determining that the quality level of the current version of the media content being played back does not match the highest-available quality level and thereby cause the content quality indicator to represent the second state;

receiving, via the user interface, an input indicating a request to access a set of information about the quality level of the current version of the media content being played back; and based on the input indicating the request, displaying, via the user interface, the set of information, wherein the set of information includes at least one factor contributing to the quality level of the current version of the media content being played back.

* * * * *